(12) United States Patent
Wang et al.

(10) Patent No.: US 12,039,663 B2
(45) Date of Patent: Jul. 16, 2024

(54) 3D SURFACE STRUCTURE ESTIMATION USING NEURAL NETWORKS FOR AUTONOMOUS SYSTEMS AND APPLICATIONS

(71) Applicant: NVIDIA Corporation, Santa Clara, CA (US)

(72) Inventors: Kang Wang, Bellevue, WA (US); Yue Wu, Mountain View, CA (US); Minwoo Park, Saratoga, CA (US); Gang Pan, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 84 days.

(21) Appl. No.: 17/452,751

(22) Filed: Oct. 28, 2021

(65) Prior Publication Data

US 2023/0136860 A1    May 4, 2023

(51) Int. Cl.
*G06T 17/05* (2011.01)
*B60W 30/09* (2012.01)
(Continued)

(52) U.S. Cl.
CPC .............. *G06T 17/05* (2013.01); *B60W 30/09* (2013.01); *B60W 30/143* (2013.01);
(Continued)

(58) Field of Classification Search
CPC ....... G06F 18/214; G06T 17/05; G06V 20/58; B60W 30/09; B60W 30/143; B60W 40/06;
(Continued)

(56) References Cited

U.S. PATENT DOCUMENTS 7,187,809 B2   3/2007  Zhao et al.
9,129,418 B2   9/2015  Schormans et al.
(Continued)

FOREIGN PATENT DOCUMENTS

CN    112102472 A    12/2020
JP    2012-245355 A  12/2012

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Jacinta M Crawford
(74) *Attorney, Agent, or Firm* — Shook, Hardy & Bacon L.L.P.

(57) ABSTRACT

In various examples, to support training a deep neural network (DNN) to predict a dense representation of a 3D surface structure of interest, a training dataset is generated using a parametric mathematical modeling. A variety of synthetic 3D road surfaces may be generated by modeling a 3D road surface using varied parameters to simulate changes in road direction and lateral surface slope. In an example embodiment, a synthetic 3D road surface may be created by modeling a longitudinal 3D curve and expanding the longitudinal 3D curve to a 3D surface, and the resulting synthetic 3D surface may be sampled to form a synthetic ground truth projection image (e.g., a 2D height map). To generate corresponding input training data, a known pattern that represents which pixels may remain unobserved during 3D structure estimation may be generated and applied to a (Continued)

ground truth projection image to simulate a corresponding sparse projection image.

21 Claims, 22 Drawing Sheets

(51) Int. Cl.
| | |
|---|---|
| *B60W 30/14* | (2006.01) |
| *B60W 40/06* | (2012.01) |
| *B60W 50/06* | (2006.01) |
| *B60W 60/00* | (2020.01) |
| *G06F 18/214* | (2023.01) |
| *G06V 20/05* | (2022.01) |
| *G06V 20/58* | (2022.01) |

(52) U.S. Cl.
CPC ............ *B60W 40/06* (2013.01); *B60W 50/06* (2013.01); *B60W 60/001* (2020.02); *G06F 18/214* (2023.01); *G06V 20/05* (2022.01); *B60W 2420/42* (2013.01); *B60W 2420/52* (2013.01); *B60W 2552/15* (2020.02)

(58) Field of Classification Search
CPC ............... B60W 50/06; B60W 60/001; B60W 2552/15; B60W 2420/42; B60W 2420/52
USPC ........................................................ 345/419
See application file for complete search history.

(56) References Cited

U.S. PATENT DOCUMENTS

| | | | |
|---|---|---|---|
| 10,486,485 | B1 | 11/2019 | Levinson et al. |
| 10,816,978 | B1 | 10/2020 | Schwalb |
| 10,885,698 | B2 | 1/2021 | Muthler et al. |
| 10,929,711 | B1 | 2/2021 | Pfeiffer et al. |
| 10,997,433 | B2 | 5/2021 | Xu et al. |
| 11,151,744 | B1 | 10/2021 | Konolige et al. |
| 11,170,299 | B2 | 11/2021 | Kwon et al. |
| 11,182,916 | B2 | 11/2021 | Yang et al. |
| 11,256,958 | B1 | 2/2022 | Subbiah et al. |
| 11,308,338 | B2 | 4/2022 | Yang et al. |
| 11,436,837 | B2 | 9/2022 | Pham et al. |
| 11,508,049 | B2 | 11/2022 | Seo et al. |
| 11,520,345 | B2 | 12/2022 | Onofrio et al. |
| 11,579,629 | B2 | 2/2023 | Wu et al. |
| 11,604,944 | B2 | 3/2023 | Park et al. |
| 11,613,201 | B2 | 3/2023 | Li et al. |
| 11,636,668 | B2 | 4/2023 | Jampani et al. |
| 11,648,945 | B2 | 5/2023 | Sajjadi et al. |
| 11,651,215 | B2 | 5/2023 | Park et al. |
| 11,657,532 | B2 | 5/2023 | Park et al. |
| 11,688,181 | B2 | 6/2023 | Park et al. |
| 11,727,056 | B2 | 8/2023 | Raichelgauz et al. |
| 11,801,861 | B2 | 10/2023 | Choe et al. |
| 2006/0022997 | A1 | 2/2006 | Spampinato et al. |
| 2006/0025888 | A1 | 2/2006 | Gutmann et al. |
| 2012/0293498 | A1 | 11/2012 | Schormans et al. |
| 2015/0248916 | A1 | 9/2015 | Kopf et al. |
| 2016/0093101 | A1 | 3/2016 | Benedek et al. |
| 2017/0076438 | A1 | 3/2017 | Kottenstette et al. |
| 2017/0236013 | A1 | 8/2017 | Clayton et al. |
| 2018/0025235 | A1 | 1/2018 | Fridman |
| 2018/0194286 | A1 | 7/2018 | Stein |
| 2018/0205941 | A1 | 7/2018 | Kopf et al. |
| 2018/0293713 | A1 | 10/2018 | Vogels et al. |
| 2018/0322646 | A1 | 11/2018 | Matthies et al. |
| 2018/0345496 | A1 | 12/2018 | Li et al. |
| 2019/0102668 | A1 | 4/2019 | Yao et al. |
| 2019/0147245 | A1 | 5/2019 | Qi et al. |
| 2019/0179979 | A1 | 6/2019 | Melick |
| 2019/0302259 | A1* | 10/2019 | Van Fleet ............... G05D 1/024 |
| 2019/0391235 | A1 | 12/2019 | Harrison |
| 2020/0005068 | A1 | 1/2020 | Ozog |
| 2020/0051327 | A1 | 2/2020 | Dolan et al. |
| 2020/0184718 | A1 | 6/2020 | Chiu et al. |
| 2020/0293054 | A1 | 9/2020 | George et al. |
| 2020/0293064 | A1 | 9/2020 | Wu et al. |
| 2020/0301799 | A1* | 9/2020 | Manivasagam ......... G06T 17/20 |
| 2020/0324795 | A1* | 10/2020 | Bojarski ................ G01C 21/30 |
| 2021/0082181 | A1 | 3/2021 | Shi et al. |
| 2021/0150230 | A1 | 5/2021 | Smolyanskiy et al. |
| 2021/0155248 | A1 | 5/2021 | Cox et al. |
| 2021/0192234 | A1 | 6/2021 | Chen et al. |
| 2021/0201078 | A1 | 7/2021 | Yao et al. |
| 2021/0213616 | A1 | 7/2021 | Ross et al. |
| 2021/0232851 | A1 | 7/2021 | Redford et al. |
| 2021/0241527 | A1 | 8/2021 | Sun et al. |
| 2021/0279811 | A1 | 9/2021 | Waltman et al. |
| 2021/0286923 | A1 | 9/2021 | Kristensen et al. |
| 2021/0287430 | A1 | 9/2021 | Li et al. |
| 2021/0334592 | A1 | 10/2021 | Taniai |
| 2021/0383172 | A1 | 12/2021 | Gruber et al. |
| 2021/0383269 | A1 | 12/2021 | Zhou et al. |
| 2022/0091259 | A1 | 3/2022 | Hucks et al. |
| 2022/0097726 | A1 | 3/2022 | Buchanan et al. |
| 2022/0111868 | A1 | 4/2022 | Costea et al. |
| 2022/0188997 | A1 | 6/2022 | Moriuchi et al. |
| 2022/0222889 | A1 | 7/2022 | Bhargava et al. |
| 2022/0385721 | A1 | 12/2022 | Kamaraju et al. |
| 2023/0032819 | A1 | 2/2023 | Magnusson et al. |
| 2023/0091924 | A1 | 3/2023 | Dowdall et al. |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).
"Ground Truth Data Generation for Deep Neural Network Perception in Autonomous Driving Applications", In U.S. Appl. No. 17/187,350, filed Feb. 26, 2021.
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
Besag, J., "On the Statistical Analysis of Dirty Pictures", Journal of the Royal Statistical Society: Series B, vol. 48, No. 3, pp. 259-279 (1986).
Bickson, D., "Gaussian Belief Propagation: Theory and Application", arXiv preprint arXiv:0811.2518, pp. 86 (Oct. 2008).
Chen, D-L., and Lu, Y-Y., "3D road surface reconstruction based on point clouds data assimilation algorithm", MATEC Web of Conferences, EDP Sciences, vol. 139, pp. 1-5 (2017).
Fan, R., et al., "Real-Time Stereo Vision for Road Surface 3-D Reconstruction", IEEE, pp. 1-6 (2018).
Fan, R., et al., "Road Surface 3D Reconstruction Based on Dense Subpixel Disparity Map Estimation", IEEE Transactions on Image Processing, arXiv:1807.01874, pp. 1-11 (2018).
Yu, S-J., et al., "3D reconstruction of road surfaces using an integrated multi-sensory approach", Optics and Lasers in Engineering, vol. 45, pp. 808-818 (2007).
Non-Final Office Action dated Jun. 20, 2023 in U.S. Appl. No. 17/452,747, 67 pages.
Non-Final Office Action dated Aug. 24, 2023 in U.S. Appl. No. 17/452,749, 16 pages.
Non-Final Office Action dated Oct. 6, 2023 in U.S. Appl. No. 17/452,744, 46 pages.
Final Office Action received for U.S. Appl. No. 17/452,747, mailed on Dec. 21, 2023, 59 pages.
Gonzalez, A, et al., "On-Board Object Detection Multicude modal and Multiview Random Forest of Local Experts" IEEE Transactions on Cybernetics, vol. 47, No. 11, pp. 3980-3990 (Nov. 2017).

(56) References Cited

OTHER PUBLICATIONS

Final Office Action received for U.S. Appl. No. 17/452,749, mailed on Feb. 5, 2024, 16 pages.
Notice of Allowance received for U.S. Appl. No. 17/452,752, mailed on Jan. 29, 2024, 8 pages.
Final Office Action, U.S. Appl. No. 17/452,744, Notification Date: Apr. 11, 2024, 43 pages.
Non-Final Office Action, U.S. Appl. No. 17/452,747, Notification Date: Apr. 11, 2024, 40 pages.
Non-Final Office Action, U.S. Appl. No. 17/452,749, Notification Date: May 20, 2024, 8 pages.

* cited by examiner

3D SURFACE STRUCTURE ESTIMATION USING NEURAL NETWORKS FOR AUTONOMOUS SYSTEMS AND APPLICATIONS

CROSS-REFERENCE TO RELATED APPLICATIONS

This application is related to U.S. patent application Ser. Nos. 17/452,744, 17/452,747, 17/452,749, and 17/452,752.

BACKGROUND

Designing a system to drive a vehicle autonomously, safely, and comfortably without supervision is tremendously difficult. An autonomous vehicle should at least be capable of performing as a functional equivalent of an attentive driver—who draws upon a perception and action system that has an incredible ability to identify and react to moving and static obstacles in a complex environment—to navigate along the path of the vehicle through the surrounding three-dimensional (3D) environment. Thus, the ability to detect parts of an environment is often critical for autonomous driving perception systems. This capability has become increasingly important, as the operational environment for the autonomous vehicle has begun to expand from highway environments to semi-urban and urban settings characterized by complex scenes with complex shapes.

One important component of the 3D environment is the 3D road surface, Knowledge of the 3D road surface enables autonomous vehicles to provide a comfortable and safe driving experience. For example, an autonomous vehicle may adapt the vehicle's suspension system to match the current road surface (e.g., by compensating for bumps in the road). In another example, an autonomous vehicle may navigate to avoid protuberances (e.g., dips, holes) in the road. In yet another example, an autonomous vehicle may apply an early acceleration or deceleration based on an approaching surface slope in the road. Any of these functions may serve to enhance safety, improve the longevity of the vehicle, improve energy-efficiency, and/or provide a smooth driving experience.

One way to estimate the structure of the road surface is with 3D reconstruction. Existing approaches for 3D road surface reconstruction rely on either LiDAR sensors or cameras. Conventional techniques that use LiDAR sensors emit a laser pulse and detect the reflected signal from the road surface to reconstruct 3D points on the road. However, LiDAR sensors are expensive, have limited range, and their accuracy may not suffice for certain applications in autonomous driving. Conventional techniques that use cameras rely on multi-view geometry to reconstruct 3D entities. However, conventional reconstruction techniques with cameras cannot efficiently compute dense measurements, and conventional post-processing techniques such as interpolation or plane fitting are often insufficient to provide accurate enough models of the complex road surfaces that exist in the real world. As such, there is a need for improved 3D road surface reconstruction techniques for autonomous driving applications.

SUMMARY

Embodiments of the present disclosure relate to 3D surface estimation. In some embodiments, a 3D surface structure such as the 3D surface structure of a road (3D road surface) may be observed and estimated to generate a 3D point cloud or other representation of the 3D surface structure. Since the representation may be sparse, one or more densification techniques may be applied to generate a dense representation of the 3D surface structure, which may be provided to an autonomous vehicle drive stack to enable safe and comfortable planning and control of the autonomous vehicle.

In an example embodiment, one or more cameras may be affixed to or otherwise disposed on a vehicle or other object and used to capture image(s) of a 3D environment as the vehicle or object navigates (e.g., along a road) through the 3D environment, and any suitable 3D structure estimation technique may be applied to generate a representation of a 3D surface structure of interest, such a 3D road surface. The representation of the 3D surface structure may be densified using, for example, a Markov random field and/or a deep neural network (DNN). In an example densification technique using a Markov random field, sparse and dense projection images (e.g., height maps) may be modeled with an undirected graph, and Maximum a Posteriori (MAP) inference may be used to estimate the most likely dense values given the sparse values. In an example densification technique using a DNN, a sparse projection image may be fed into a DNN to predict a corresponding dense projection image. Training data for such a DNN may be generated in various ways and used to train the DNN to predict a dense representation of 3D surface structure, given a sparse representation. Example techniques for generating training data include 1) rendering frames of virtual sensor data, segmentation masks, and depth maps; 2) parametric mathematical modeling of a 3D road surface; 3) collecting and annotating real sensor data from a single LiDAR sensor; and/or 4) collecting and annotating real sensor data accumulated from multiple LiDAR sensors.

As such, the techniques described herein may be used to observe and reconstruct a 3D surface such as a 3D road surface, and a representation of the 3D surface structure (and/or corresponding confidence values) may be provided to an autonomous vehicle drive stack to enable safe and comfortable planning and control of the autonomous vehicle. For example, an autonomous vehicle may adapt the vehicle's suspension system to match the current road surface (e.g., by compensating for bumps in the road). In another example, an autonomous vehicle may navigate to avoid protuberances (e.g., dips, holes) in the road. In yet another example, an autonomous vehicle may apply an early acceleration or deceleration based on an approaching surface slope in the road. Any of these functions may serve to enhance safety, improve the longevity of the vehicle, improve energy-efficiency, and/or provide a smooth driving experience.

This summary is provided to introduce a selection of concepts in a simplified form that are further described below in the Detailed Description. This summary is not intended to identify key features or essential features.

BRIEF DESCRIPTION OF THE DRAWINGS

The present systems and methods for 3D surface estimation are described in detail below with reference to the attached drawing figures, wherein.

DETAILED DESCRIPTION

Figure 1:
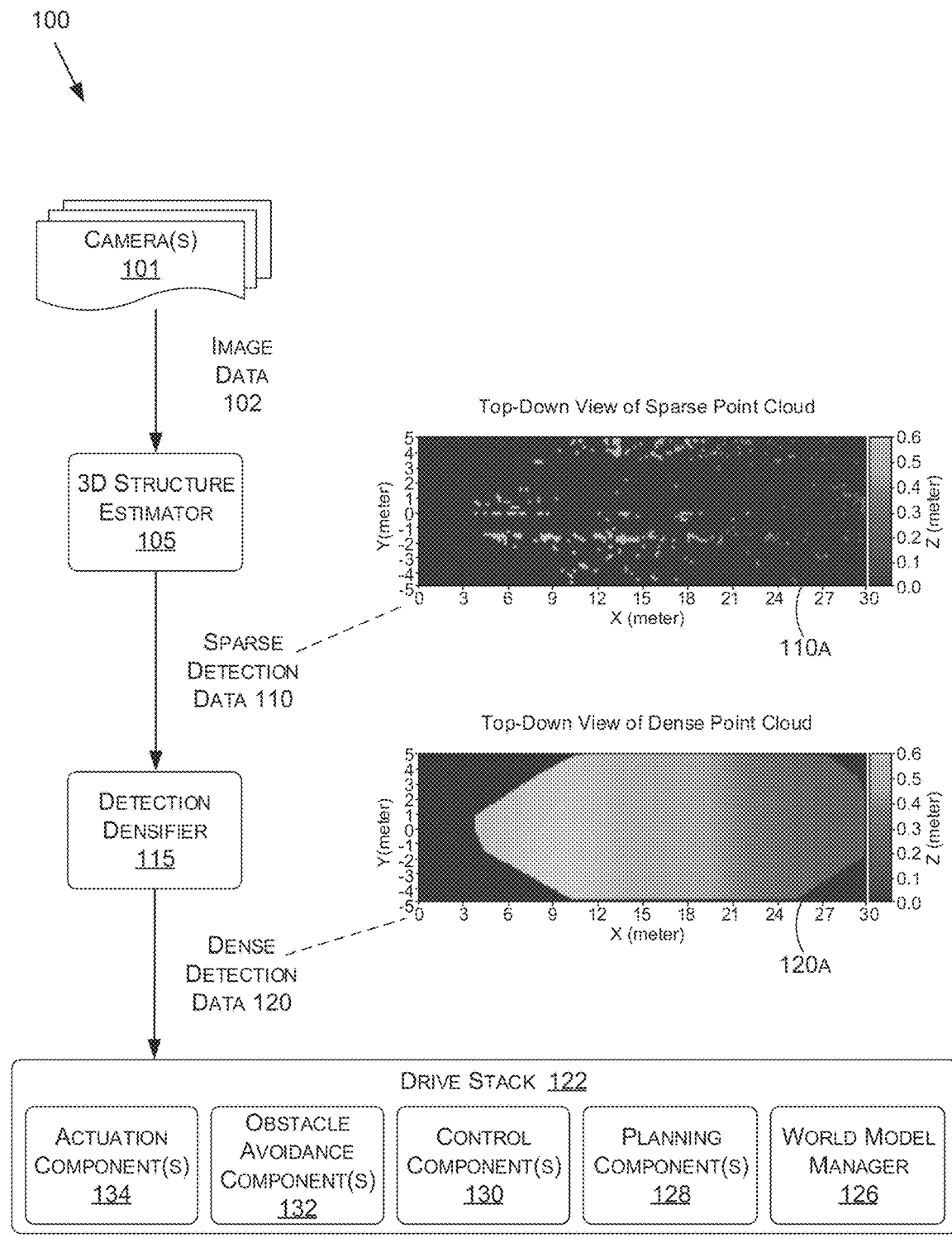
FIG. 1 is a data flow diagram illustrating an example 3D surface reconstruction pipeline, in accordance with some embodiments of the present disclosure.

Systems and methods relating to three-dimensional (3D) surface estimation are disclosed. For example, the present disclosure describes systems and methods of reconstructing a 3D surface structure of a road or other component of an environment, for use by autonomous vehicles, semi-autonomous vehicles, robots, and/or other object types. Although the present disclosure may be described with respect to an example autonomous vehicle 1700 (alternatively referred to herein as "vehicle 1700" or "ego-vehicle 1700," an example of which is described with respect to FIGS. 17A-17D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although some embodiments may be described with respect to 3D surface structure estimation for autonomous driving, this is not intended to be limiting, and the systems and methods described herein may be used in augmented reality, virtual reality, mixed reality, robotics, security and surveillance, autonomous or semi-autonomous machine applications, and/or any other technology spaces where 3D surface structure estimation may be used.

At a high level, a 3D surface structure such as the 3D surface structure of a road (3D road surface) may be observed and estimated to generate a 3D point cloud or other representation of the 3D surface structure. Since the representation may be sparse, one or more densification techniques may be applied to generate a dense representation of the 3D surface structure, which may be provided to an autonomous vehicle drive stack to enable safe and comfortable planning and control of the autonomous vehicle.

In an example technique, one or more cameras may be affixed to or otherwise disposed on a vehicle or other object and used to capture image(s) of a 3D environment as the vehicle or object navigates (e.g., along a road) through the 3D environment, and the image(s) may be used to estimate the 3D surface structure of the road. Any suitable 3D structure estimation technique may be applied. For example, Structure from Motion (SFM) may be performed to estimate the 3D structure from sequences of images, and/or stereo vision may be applied to estimate 3D structure from images captured by multiple cameras and/or from multiple perspectives. Generally, 3D structure estimation may generate a representation of detected points in the 3D environment, such as a 3D point cloud. In some embodiments, outliers are removed using a statistical or clustering technique. In some cases, free space estimation may be applied to the captured image(s) to detect the road or other drivable space, and a segmentation mask or other representation of the detected road or drivable space may be used to select 3D points on the road surface (e.g., points outside the road surface may be filtered out). The result may be a representation of the 3D surface structure of the road, such as a 3D point cloud.

Due to limitations of accuracy and computational power of the 3D structure estimation techniques, the representation of the 3D surface structure of the road may be sparse. As such, in some embodiments, the representation of the 3D surface structure may be densified using, for non-limiting examples, a Markov random field and/or a deep neural nets network (DNN) some cases, the 3D surface structure may be represented as a 2D height map. For example, a sparse 3D point cloud may be projected to form a projection image (e.g., a top-down projection image) representing sparse detections, and the projection image (e.g., 2D height map) may be densified to fill in missing values.

In an example densification technique using a Markov random field, the sparse and dense projection images may be modeled with an undirected graph, and Maximum a Posteriori (MAP) inference may be used to estimate the most likely dense values given the sparse values. For example, each pixel in the dense projection image (e.g., the dense 2D height map) may be modeled with a corresponding node having edges that connect to neighboring nodes (e.g., one edge for each neighboring pixel). Each pixel of the sparse projection image (e.g., the sparse 2D height map) may be considered a noisy observation of the dense projection image and modeled as a node having an edge that connects to a corresponding node (pixel) from the dense projection image. For example, assume the graph has nodes that form two layers of a grid, where the bottom layer corresponds to ground truth (the dense projection image), and the top layer corresponds to a noisy observation (the sparse projection image). Assuming each node in the graph corresponds to a random variable, the Markov random field for the graph may model or otherwise represent a joint probability distribution of the random variables corresponding to the nodes in the graph. Knowing the joint probability distribution and a set of observed values (from the sparse projection image), values for the dense projection image (e.g., a height estimate for each pixel of the dense 2D height map) may be estimated using any known MAP inference algorithm, such as Iterative Conditional Mode, Gaussian Belief Propagation, or others. Thus, a Markov random field may be used to densify the representation of the 3D surface structure.

In some embodiments, a deep neural network (DNN) may be used to predict values for a dense representation of the 3D surface structure. For example, a sparse 3D point cloud may be projected to form a sparse projection image (e.g., a top-down projection image) representing sparse detections, and the sparse projection image may be fed into a DNN, such as convolutional neural network (CNN), to predict a dense projection image. In some embodiments, the DNN may include a common trunk (or stream of layers) connected to one or more heads (or at least partially discrete streams of layers) that predict different outputs. For example, a regression head may regress a particular type of information about the 3D surface structure, such as a height value for each pixel. In some embodiments, a confidence head may predict a confidence map with values representing the confidence of a corresponding regressed value predicted by the regression head. As such and as explained in more detail below, the DNN may be trained to predict a dense representation of the 3D surface structure (such as a dense 2D height map) and/or a corresponding confidence map.

In some embodiments, a sparse projection image may be normalized before being input into the DNN. For example, a 2D height map may store height values that include a bias corresponding to the height of the camera that captured the images from which the 2D height map was derived. As such, in some embodiments, the mean height of the height values in the 2D height map may be calculated and subtracted from all the height values to remove the bias, which may make it easier for the DNN to learn. In embodiments where a bias is removed from the DNN input, the bias may be reintroduced (e.g., added) to a predicted output of the DNN (e.g., to values predicted by the regression head).

In some embodiments, the DNN may include multiple inputs heads (or at least partially discrete streams of layers) for separate inputs. For example, the DNN may include a first input head that accepts a sparse projection image and a second input head that accepts an RGB image, such as a perspective view image from which the sparse projection image was generated. In this way, the DNN may learn from two different views of the underlying dense road profile (e.g., top-down and perspective, 3D point cloud space and 2D image space, etc.). In such an example, the multiple input heads may be connected to a common trunk that fuses the multiple input heads. As such, the DNN may be used to perform multi-modal learning by fusing information from different sources for better prediction.

In some embodiments, the DNN may include one or more recurrent layers (e.g., Gated Recurrent Units, Long Short Term Memory) to leverage temporal information. Including one or more recurrent layers may allow the DNN to leverage information from previous time slices, resulting in better predictions and more stable densification results over time.

Training data for the DNN may be generated in various ways and used to train the DNN to predict a dense representation of 3D surface structure, given a sparse representation. Generally, real-world data and/or virtual data may be collected and used to derive training data (e.g., sparse input data and/or ground truth representations of 3D surface structure). The type of training data may depend on the implementation of the DNN. For example, input training data may include sparse representations of 3D surface structure (e.g., sparse height maps) and/or image data from some other perspective (e.g., images of a perspective view), Ground truth training data may include dense representations of 3D surface structure (e.g., dense height maps) and/or segmentation masks (e.g., identifying a desired surface such as a road or other drivable space).

Example techniques for generating training data include 1) rendering frames of virtual sensor data, segmentation masks, and depth maps; 2) parametric mathematical modeling of a 3D road surface; 3) collecting and annotating real sensor data from a single LiDAR sensor; and/or 4) collecting and annotating real sensor data accumulated from multiple LiDAR sensors.

In an example technique for generating training data, a simulation may be performed to render frames of virtual sensor data (e.g., images) representing realistic driving scenarios and to generate corresponding segmentation masks (e.g., ground truth segmentation masks identifying a desired surface such as a road or other driveable space) and depth maps. For any given rendered frame, a 3D surface structure (e.g., 3D road surface) may be estimated from the frame, as described herein, and the resulting sparse values may be projected to form a sparse projection image (e.g., a 2D height map), which may be used as input training data.

To generate a corresponding ground truth dense projection image, for any given frame rendered from the perspective of a virtual sensor, a 3D point cloud or other representation of 3D structure may be generated by unprojecting range values from the corresponding depth map into the 3D environment using the location and orientation of the virtual sensor. The segmentation mask may be used to select 3D points on the road surface (e.g., points outside the road surface may be filtered out), Additionally or alternatively, the segmentation mask may be used to select points from the depth map that are on the road surface, and the selected points may be unprojected into the 3D environment to generate the 3D points on the road surface. In some cases, the resulting representation of the 3D road surface may still be sparse. As such, in some embodiments, missing values may be interpolated using a triangulation algorithm. For example, Delaunay triangulation may be performed in 2D (e.g., by projecting the 3D points to form a projection image and performing Delaunay triangulation in the projection image) or in 3D (by computing a surface mesh of triangles surrounding the 3D point cloud), and points may be sampled from the triangles to generate a desired number of points for a ground truth dense projection image. For example, a ground truth 2D height map may be sampled from triangles generated by performing 2D Delaunay triangulation in a projected height map, or by projecting 3D points sampled from a surface mesh generated by performing 3D Delaunay triangulation. As such, the dense projection image and/or segmentation mask may be used as ground truth, paired with the input sparse projection image, and included in a training dataset.

In another example technique for generating training data, synthetic training data may be generated using parametric mathematical modeling of a 3D road surface. In an example embodiment, a synthetic 3D road surface may be generated by first sampling longitudinal values (e.g., from 0 to 300 m), then computing lateral values as a second order polynomial of the longitudinal values, using values for polynomial constants sampled to simulate changes in road direction (e.g., left curve, right turn, etc.). The height of the synthetic 3D road surface may be computed as a linear combination of Fourier bases, using different sampled values for the number of bases, weight for a particular basis, and frequency for a particular basis to simulate changes in surface height. These steps generate a longitudinal 3D curve, which may be expanded to a 3D surface by drawing a lateral 3D curve through each point on the longitudinal 3D curve using sampled values for the angle between the lateral 3D curve and the ground plane, to simulate changes in lateral surface slope. Each lateral 3D curve may be sampled to generate a dense 3D point cloud, which may be projected to form a synthetic ground truth projection image (e.g., a ground truth 2D height map).

To generate a corresponding sparse projection image for the input training data, a known pattern may be applied to the ground truth projection image to cancel out a subset of pixel values (e.g., setting those pixel values to zero) to simulate unobserved values. For example, frames of real-world data may be collected, a 3D surface structure (e.g., of a 3D road surface) may be estimated from each frame (as described herein), the estimated 3D structure (e.g., a. 3D point cloud) may be projected to form a projection image (e.g., a sparse 2D height map), and a corresponding binary map that represents which pixels of projection image are present or observed may be generated. A plurality of binary maps may be generated from real-world data, and one of the binary maps may be randomly chosen and multiplied by a ground truth projection image to generate a corresponding synthetic sparse projection image. As such, a sparse projection image may be generated for each ground truth projection image, and the pairs of synthetic sparse and ground truth projection images may be included in a training dataset.

Additionally or alternatively, training data may be generated from real-world data. For example, one or more vehicles may collect sensor data from an equipped sensor, such as one or more cameras and LiDAR sensors, while navigating through a real-world (e.g., physical) environment. To generate ground truth training data, collected LiDAR data (e.g., LiDAR point clouds) may be smoothed, outliers may be removed, and the LiDAR data may be temporally and/or spatially aligned with corresponding frames of image data. In some embodiments, to densify the collected LiDAR data, missing values may be interpolated using Delaunay triangulation, and/or LiDAR data that is triggered and/or captured from the same time slice by multiple LiDAR sensors may be accumulated in order to densify the collected data. The LiDAR data may be labeled to identify 3D points on a surface of interest (e.g., a 3D road surface), and a representation of the identified 3D points (e.g., a. 3D point cloud, a projection image) may be designated as ground truth training data. In some embodiments, a corresponding frame of image data may be classified to generate a ground truth segmentation mask identifying the desired surface.

To generate corresponding input training data, a 3D surface structure (e.g., 3D road surface) may be estimated from a frame of image data (as described herein), and a representation of the estimated 3D structure (e.g., a sparse 3D point cloud, a sparse projection image) may be designated as input training data. As such, a corresponding sparse projection image, frame of image data, dense projection image, and/or segmentation mask may be grouped together and included in a training dataset.

During training, any suitable loss function may be used to compare predicted output(s) with ground truth to update the DNN. In an example embodiment where the DNN includes a regression head that predicts a height map, a loss function may compare predicted and ground truth height maps and multiply by a ground truth segmentation mask indicating the surface to be densified, effectively canceling out updates to the DNN based on predictions that occur outside the region to be densified. In this example, the DNN may learn to predict heights maps using ground truth height maps and segmentation masks. In another embodiment where the DNN includes a regression head that predicts a height map and a confidence head that predicts a confidence map corresponding to the height map, a loss function may compare predicted and ground truth heights and compensate based on predicted confidence values. In this example, the DNN may learn to predict both height and confidence maps from ground truth height maps. As such, the DNN may learn how to perform densification by learning a mapping between sparse and dense representations of 3D structure.

As such, the techniques described herein may be used to observe and reconstruct a 3D surface such as a 3D road surface, and a representation of the 3D surface structure (and/or corresponding confidence values) may be provided to an autonomous vehicle drive stack to enable safe and comfortable planning and control of the autonomous vehicle. Generally, the techniques described herein may generate a more accurate representation of road surfaces than prior reconstruction techniques. Furthermore, the present techniques may be used to generate a representation of road surfaces with sufficient accuracy and range for certain autonomous driving applications, unlike prior based reconstruction techniques. As such, the representation of road surfaces generated using the present techniques may enable improved navigation, safety, and comfort in autonomous driving. For example, an autonomous vehicle may be better equipped to adapt the vehicle's suspension system to match the current road surface (e.g., by compensating for bumps in the road), to navigate the vehicle to avoid protuberances (e.g., dips, holes) in the road, and/or to apply an early acceleration or deceleration based on an approaching surface slope in the road. Any of these functions may serve to enhance safety, improve the longevity of the vehicle, improve energy-efficiency, and/or provide a smooth driving experience.

Example 3D

Surface Reconstruction Pipeline

With reference to FIG. 1, FIG. 1 is a data flow diagram illustrating an example 3D surface reconstruction pipeline 100 for a 3D surface reconstruction system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

At a high level, the pipeline 100 may estimate and generate a representation of an observed 3D surface structure, such as that of a 3D road surface or other environmental part, based on image data 102 of a three-dimensional (3D) environment. The image data 102 may be captured by one or more cameras 101 of an ego-object or ego-actor (e.g., autonomous vehicle 1700 of FIGS. 17A-17D, also referred to as the vehicle 1700) as the ego-object or ego-actor navigates through the 3D environment. A 3D structure estimator 105 may process the image data 102 to generate a representation of a 3D surface structure of interest (e.g., sparse detection data 110), which may comprise a 3D point cloud. Since the estimated 3D surface structure may be sparse, a detection densifier 115 may densify the sparse detection data 110 to generate a denser representation of the 3D surface structure e.g., dense detection data 120), which may comprise a two-dimensional (2D) top-down height map and/or a 3D point cloud. The dense detection data 120 may represent the observed 3D surface structure, such as a 3D road surface or other environmental part. As such, the dense detection data 120 or other representation of the observed 3D surface structure may be provided to, and used by, control component(s) of the ego-object or ego-actor software stack 122 and/or components of the autonomous vehicle 1700 of FIGS. 17A-17D such as controller(s) 1736, ADAS system 1738, and/or SOC(s) 1704) to aid the ego-object or ego-actor in performing one or more operations within the 3D environment, such as path planning, obstacle or protuberance avoidance, adapting a suspension system of the ego-object or ego-actor to match the current road surface, applying an early acceleration or deceleration based on an approaching surface slope, mapping, and/or others.

Generally, 3D surface reconstruction may be performed using image data 102 from any number and any type of camera e.g., the camera(s) 101), such as those described below with respect to the autonomous vehicle 1700 of FIGS. 17A-17D. For example, the camera(s) 101 may include one or more cameras of an ego-object or ego-actor, such as stereo camera(s) 1768, wide-view camera(s) 1770 (e.g., fisheye cameras), infrared camera(s) 1772, surround camera(s) 1774 (e.g., 360 degree cameras), and/or long-range and/or mid-range camera(s) 1798 of the autonomous vehicle 1700 of FIGS. 17A-17D—and the cameras(s) 101 may be used to generate the image data 102 of the 3D environment around the ego-object or ego-actor. In embodiments where multiple cameras are used, the multiple cameras may view a common region of the 3D environment with an overlapping portion of their respective fields of view such that the image data 102 (e.g., images) from different cameras represents the common region.

The 3D structure estimator 105 estimates the 3D structure of a particular surface (e.g., sparse detection data 110) from the image data 102 using Structure from Motion (SfM), stereo vision, and/or some other 3D surface structure estimation technique. SfM and stereo vision are ranging techniques that estimate 3D structure from multiple images. SfM estimates 3D structure from sequences of images (e.g., captured by the same camera 101), while stereo vision estimates 3D structure from multiple images captured at substantially the same time from different perspectives (e.g., by different cameras 101). In some embodiments, image de-warping and/or distortion correction may be applied to the image data 102 prior to estimating 3D structure. A segmentation mask or other classification data may be used (e.g., by overlaying the cation data on the image data 102) to select points from the estimated 3D structure that are on a desired surface, such as road surface. As such, the 3D structure estimator 105 may generate a representation of the 3D structure of a desired surface (e.g., sparse detection data 110), which may include a 3D point cloud (e.g., in 3D world coordinates).

Figure 2:
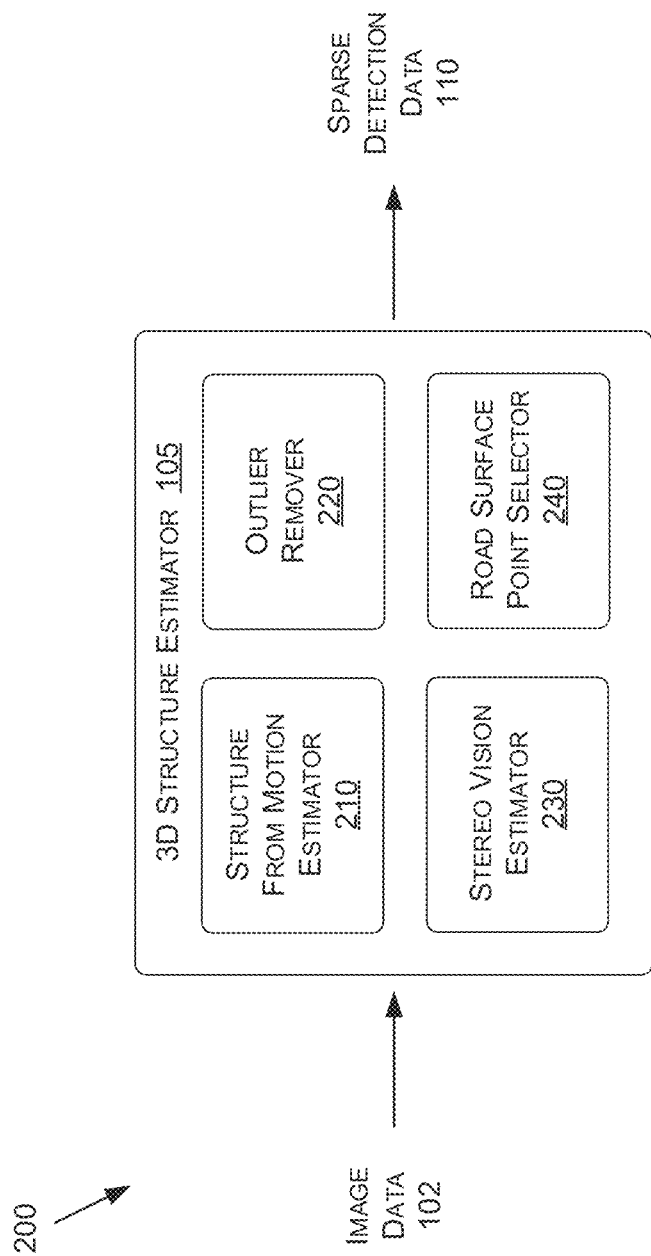
FIG. 2 is a diagram illustrating an example 3D structure estimator, in accordance with some embodiments of the present disclosure.

FIG. 2 is a diagram illustrating an example implementation of the 3D structure estimator 105, in accordance with some embodiments of the present disclosure. In FIG. 2, the 3D structure estimator 105 includes Structure from Motion estimator 210, stereo vision estimator 230, outlier remover 220, and road surface point selector 240.

The Structure from Motion estimator 210 may perform any known SIM technique to estimate 3D structure from the image data 102. For example, the Structure from Motion estimator 210 may reconstruct 3D positions of features represented in the image data 102 from feature trajectories detected over time. In some embodiments, the Structure from Motion estimator 210 may perform direct estimation of 3D positions without intermediate estimation of feature trajectories. Generally, any known SfM technique may be applied, including incremental SfM, global SfM, out-of-core SfM, and/or others. As such, the Structure from Motion estimator 210 may generate a representation of the 3D structure of features represented in the image data 102.

The stereo vision estimator 230 may estimate 3D structure by applying stereo vision (or a stereo algorithm) to image data 102 representing different perspectives. For example, the stereo vision estimator 230 may project image data 102 from multiple camera (e.g., the camera(s) 101) into a common image space or plane and compare the projected image data using any suitable metric to generate a disparity map, which may represent differences in depth (e.g., in image coordinates, which may be inversely proportional to depth). The disparity map may be projected into a 3D point cloud using the known position and orientations of the multiple cameras. As such, the stereo vision estimator 230 may generate a representation of the 3D structure of features represented in the image data 102.

In some embodiments, outlier remover 220 may evaluate the estimated 3D structure and remove outliers. For example, in some embodiments in which the estimated 3D structure takes the form of a 3D point cloud, the 3D point cloud may be projected to form a projection image, such as a top-down projection image, to produce columns of points (e.g., 0.1 meter×0.1 meter beams). Then for each column, any suitable statistical or clustering technique may be applied to identify a representative point for the column. By way of non-limiting example, a median or mean value of the points in a column may be identified as a representative point for the column. Taking the top-down projection image as an example, the median or mean height of the points in each column may be identified as the height of a representative point for the column. In some embodiments, some other clustering technique may be applied to group points from a 3D point cloud and identify representative points (e.g., cluster centers or means). As such, outlier remover 220 may update the estimated 3D structure with the identified points, and/or otherwise detect and remove outliers.

Generally, the estimated 3D structure may include 3D points of parts of the 3D environment and objects in the 3D environment that are represented in the image data 102. As such, road surface point selector 240 may identify points that belong to a particular surface of interest, such as a 3D road surface or other environment part. For example, a segmentation mask or other classification data may be generated or otherwise obtained, and the road surface point selector 240 may use the segmentation mask or other classification data to select the points.

More specifically, in some embodiments, object detection, free space estimation, and/or image segmentation may be applied (e.g., by the 3D estimator 105 or some other component) to classify, segment, and/or predict regions (e.g., pixels) of the image data 102 that are part of a desired class. For example, one more deep learning models (e.g., a convolutional neural network) may be trained to predict one or more segmentation masks and/or confidence maps representing pixels that belong to a drivable road surface or other navigable space, other environmental parts (e.g., sidewalks, buildings), animate objects, and/or other classes. In some embodiments, an individual image (e.g., an RBG image) captured by a single camera may be segmented and/or classified. In some cases, a composite image (e.g., an RBG image) may be generated by stitching together images captured by multiple cameras, and the composite image may be segmented and/or classified. As such, a segmentation mask or other classification data delineating or representing the road or drivable space (or some other desired surface) may be obtained and/or generated (e.g., from the predicted masks or confidence maps).

As such, the road surface point selector 240 may use the segmentation mask or other classification data to elect points from the estimated 3D structure that belong to the class represented by the segmentation mask or other classification data. Any suitable selection technique may be applied. In some embodiments, 3D points from the estimated 3D structure may be back-projected into the segmentation mask (e.g., using the known location and orientation of the camera 101 that captured the image data 102 from which the segmentation mask was generated), and projected points that land inside the predicted region may be selected (and/or projected points that land outside the predicted region may be removed). As such, road surface point selector 240 may generate or otherwise identify the points of the estimated 3D surface structure that belong to a desired surface, such as the 3D road surface. In embodiments that perform outlier removal, the outlier remover 220 and the road surface point selector 240 may be invoked in any order. The resulting representation of the estimated 3D surface structure (e.g., sparse detection data 110) may take any form, such as a 3D point cloud.

Although certain embodiments are described in which 3D surface reconstruction uses the image data 102 captured by camera(s) 101, in some embodiments, other sensor data may be additionally or alternatively be used. By way of non-limiting example, one or more LiDAR sensors or RADAR sensors may be used to capture sparse detection data 110 (e.g., a LiDAR or RADAR point cloud).

Returning now to FIG. 1, since the estimated 3D surface structure may be sparse, the detection densifier 115 may densify the sparse detection data 110 to generate a denser representation of the 3D surface structure (e.g., the dense detection data 120). Generally, the sparse detection data 110 may take any suitable form, such as a sparse 3D point cloud. The sparse detection data 110 may be projected to form a projection image, such as two-dimensional (2D) top-down height map $o \in N^{m \times n}$ with missing values. The notation $N^{m \times n}$ represents a projection image (e.g., an overhead image) with spatial dimensions m×n (e.g., in pixels) and with a desired ground sampling distance, where each pixel in the projection image may store a floating point value (e.g., a height value). This sparse 2D height map may be considered a partial noisy observation of the 3D surface structure. In this example, the dense detection data 120 may take the form of, or otherwise represent, a 2D top-down height map $g \in N^{m \times n}$, and the detection densifier 115 may densify the sparse detection data 110 by inferring g, given o. In some embodiments, the detection densifier 115 may perform this inference using one or more machine learning models, such as a Markov random field and/or one or more deep learning models (e.g., one or more deep neural networks (DNNs)). The resulting representation of the 3D surface structure (e.g., dense detection data 120) may take any suitable form, such as 2D height map and/or a 3D point cloud.

Figure 3:
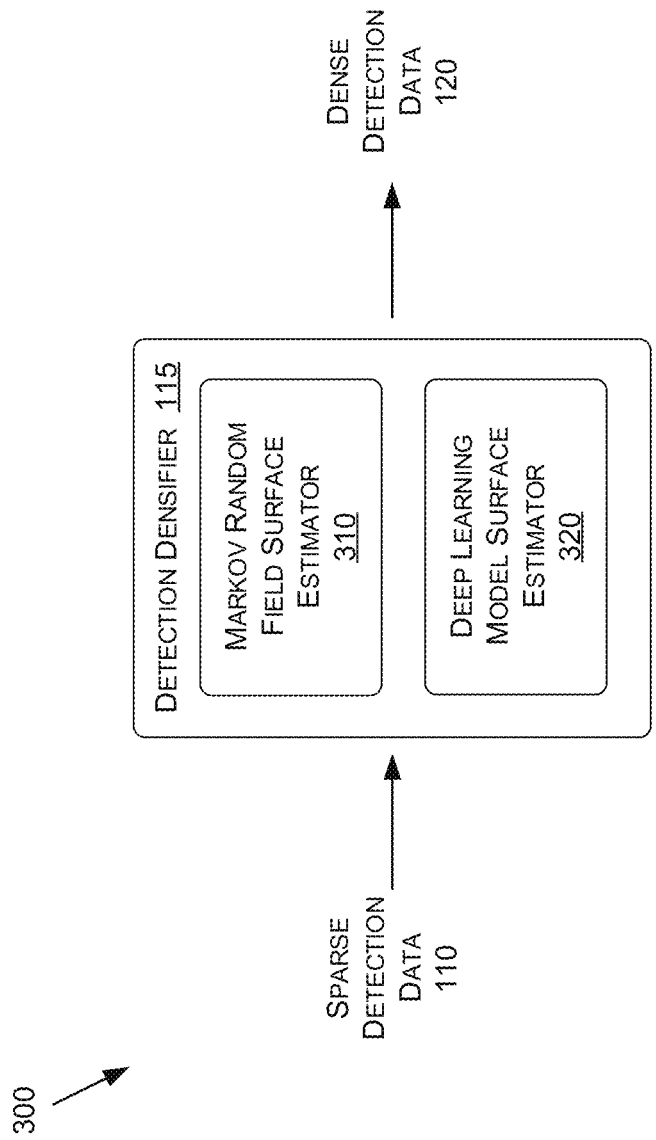
FIG. 3 is a diagram illustrating an example detection densifier, in accordance with some embodiments of the present disclosure.

FIG. 3 is a diagram illustrating an example implementation of the detection densifier 115, in accordance with some embodiments of the present disclosure. In FIG. 3, the detection densifier 115 includes Markov random field surface estimator 310 and deep learning model surface estimator 320.

In some embodiments, the Markov random field surface estimator 310 may densify the sparse detection data 110 to generate a denser representation of the 3D surface structure (e.g., the dense detection data 120). For example, the Markov random field surface estimator 310 may densify a sparse 2D top-down height map o (or other sparse projection image), by inferring a dense 2D top-down height map g (or other dense projection image), given o. More specifically, the relationship between g and o may be modeled with a probabilistic model such as a Markov random field, and the Markov random field surface estimator 310 may perform Maximum a Posteriori (MAP) inference to estimate the most likely g given the probabilistic model and a set of observed values o. In some embodiments, a Markov random field (e.g., an undirected graph) may be used as the probabilistic model for its ability to model spatial dependencies, such as those that exist in certain 3D surface structures, such as 3D road surfaces, where local regions of surface are often smooth. As such, in some embodiments, the relationship between a sparse height map o and a dense height map g may be modeled with an undirected graph.

Figure 4:
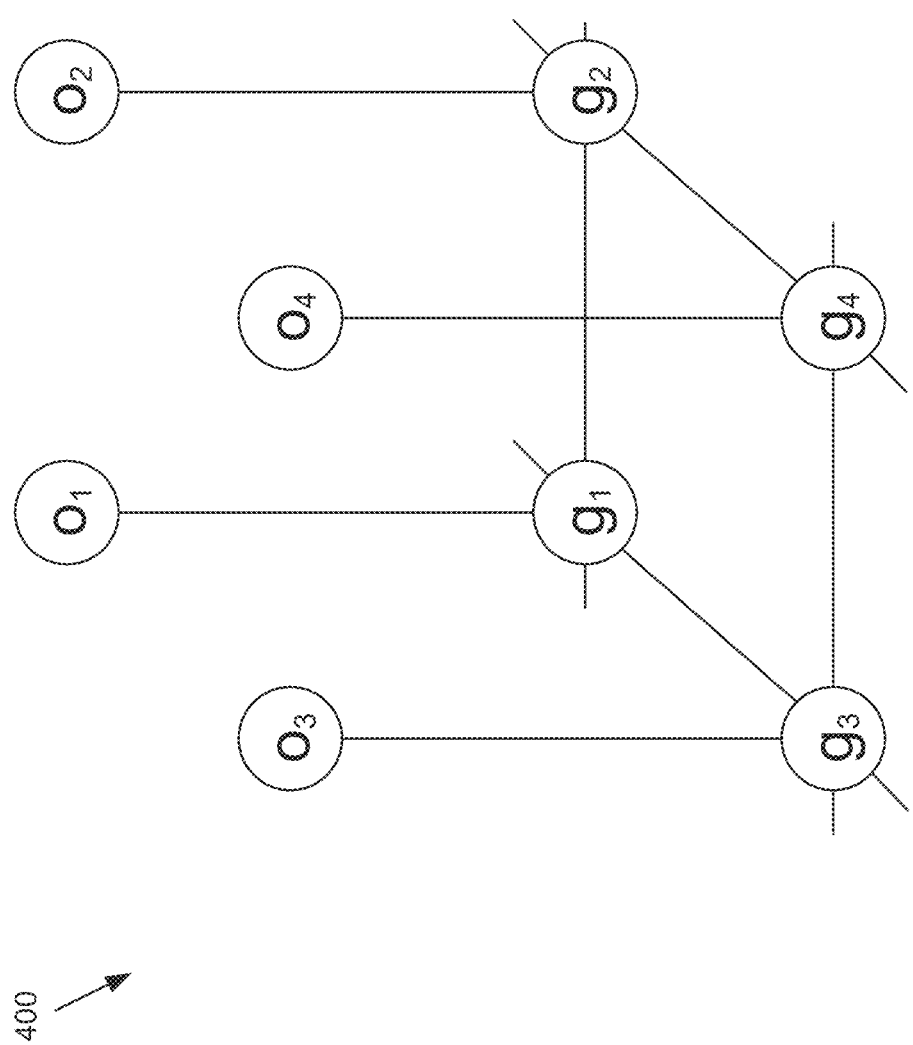
FIG. 4 is a diagram illustrating an example undirected graph that models the relationship between sparse and dense height maps, in accordance with some embodiments of the present disclosure.

FIG. 4 is a diagram illustrating an example undirected graph 400 that models the relationship between a sparse height map o and a dense height map g, in accordance with some embodiments of the present disclosure. For example, each pixel in the dense height map g may be modeled with a corresponding node (e.g., $g_1$, $g_2$, $g_3$, $g_4$, in FIG. 4) having edges that connect to neighboring nodes (e.g., one edge for each neighboring pixel). In some embodiments, nodes corresponding to interior pixels in g may have four edges (e.g., connecting to horizontally and vertically adjacent nodes), eight edges (e.g., connecting to horizontally, vertically, and diagonally adjacent nodes), or otherwise. FIG. 4 illustrates a portion of an undirected graph corresponding to interior pixels in g where each corresponding node $g_1$, $g_2$, $g_3$, $g_4$ has four edges. Nodes corresponding to edge pixels in g may have three edges (e.g., connecting to horizontally and vertically adjacent nodes), five edges (e.g., connecting to horizontally, vertically, and diagonally adjacent nodes), or otherwise. Nodes corresponding to corner pixels in g may have two edges (e.g., connecting to horizontally and vertically adjacent nodes), three edges (e.g., connecting to horizontally, vertically, and diagonally adjacent nodes), or otherwise.

Furthermore, each pixel in the sparse height map o may be considered a noisy observation of a corresponding pixel in the dense height map g. Thus, each pixel in the sparse height map o may be modeled with a node having an edge that connects to a corresponding node (representing the corresponding pixel) from the dense height map g. FIG. 4 illustrates a portion of an undirected graph with nodes $o_1$, $o_2$, $o_3$, $o_4$ (representing pixels in the sparse height map o) connected to nodes $g_1$, $g_2$, $g_3$, $g_4$ (representing pixels in the dense height map g).

Said in another way, in some embodiments, a desired surface to be modeled may be viewed from a desired perspective (e.g., top-down) and divided into a 2D grid, and an undirected graph may be formed with a 3D grid having two layers of nodes, each layer having a node for each cell or intersection point in the 2D grid. The bottom layer may correspond to ground truth (e.g., the dense height map g), and the top layer may correspond to a noisy observation (the sparse height map o). Note that the layer corresponding to a noisy observation may include a node for each cell or intersection point in the 2D grid, even though the noisy observation may be sparse. As such, some nodes corresponding to pixels in the sparse height map o may not have corresponding observations.

Having modeled the relationship between a sparse height map o and a dense height map g with a Markov random field (e.g., an undirected graph), each node in the model may be considered a random variable such that the joint probability distribution of all the random variables may be written as:

$$P(g, o) = \frac{1}{Z} \prod_{i,j} \psi(g_i, g_j) \prod_i \phi(g_i, o_i) \quad \text{(Eq. 1)}$$

where $\psi(g_i, g_j)$ is a pairwise potential term representing the height relationship between neighboring pixels in g, $\phi(g_i, o_i)$ is a unary potential term indicating the relationship between true height $g_i$ and the observed noisy height $o_i$, and Z is a normalizing constant that ensures that the component distributions sum to one.

In some embodiments, to represent special dependencies between neighboring pixels in g, the pairwise potential term may take the following form:

$$\psi(g_i, g_j) = \exp(-w_{ij}(g_i - g_j)^2), \quad \text{(Eq. 2)}$$

where $w_{ij}$ specifies the weight between nodes $(g_i, g_j)$ corresponding to neighboring pixels, as discussed in more detail below. To represent a contribution from observed pixels, o may be assumed to be a noisy version of g:

$$o_i = g_i + \text{noise, if pixel } i \text{ is observed.} \quad \text{(Eq. 3)}$$

As such, in some embodiments, the unary potential term may be given as:

$$\phi(g_i, o_i) = \exp(-c_i(g_i - o_i)^2), \quad \text{(Eq. 4)}$$

where $c_i$ specifies a weight for pixel i, and $c_i$ may be set to 0 if pixel i is not observed. Generally, any suitable weights may be selected for $w_{ij}$ and $c_i$, for example, to place more emphasis on the pairwise potential term (e.g., to emphasize relationships between neighboring pixels) or unary potential term (e.g., if there is relatively more confidence in the observed values). In some embodiments, a common weight may be selected for all pairs $w_{ij}$, a common weight may be selected for each $c_i$ corresponding to an observed pixel, a hyperparameter may be selected for each weight to form a desired ratio between $w_{ij}$ and $c_i$, and/or otherwise.

With the joint probability distribution P (g, o) and a set of observed values of the sparse height map o (or other sparse detection data 110), the Markov random field surface estimator 310 may predict a value (e.g., a height estimate) for each pixel in the dense height map g (or other dense detection data 120) using any known MAP inference algorithm, such as Iterative Conditional Mode, Gaussian Belief Propagation, or others, Generally, the Markov random field surface estimator 310 may estimate a dense representation g of a 3D surface structure from a sparse representation o (e.g., a noisy and partial observation) of the 3D surface structure. The result may be a representation of the 3D surface structure of the road, such as a 2D height map, which may be transformed into a 3D point cloud (e.g., in 3D world coordinates). In operation, the Markov random field surface estimator 310 may repetitively operate on successive instances of the sparse detection data 110 (e.g., derived from sensor data captured during successive time slices separated by some designated internal) to predict successive instances of the dense detection data 120 (e.g., successive representations of corresponding portions of the 3D surface structure of the road), for example, as the vehicle 1700 of FIGS. 17A-17D moves through the 3D environment.

Additionally or alternatively, the deep learning model surface estimator 320 may densify the representation of the 3D surface structure. For example, the deep learning model surface estimator 320 may densify the sparse detection data 110 (e.g., a sparse 2D top-down height map o) by inferring values of the dense detection data 120 (e.g., a dense 2D top-down height map g) from the sparse detection data 110 using one or more deep learning models. As such, the deep learning model surface estimator 320 may learn the relationship between the sparse detection data 110 (e.g., a representation of sparse and noisy observations, such as a projection image of a 3D point cloud) and the dense detection data 120 (e.g., a denser representation of 3D surface structure, such as projection image of a dense 3D point cloud).

Figure 5:
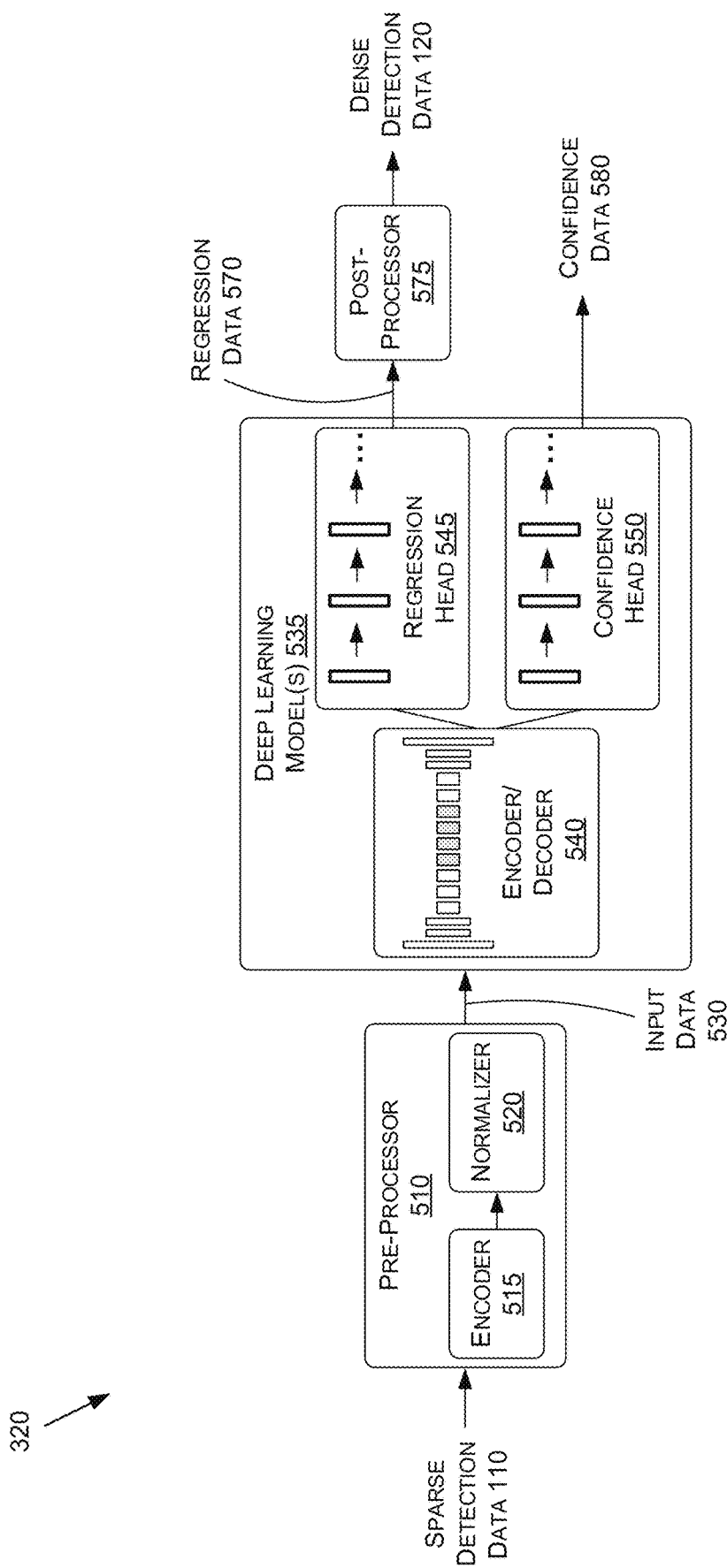
FIG. 5 is data flow diagram illustrating an example deep learning model surface estimator, in accordance with some embodiments of the present disclosure.

FIG. 5 is a data flow diagram illustrating an example implementation of the deep learning model surface estimator 320, in accordance with some embodiments of the present disclosure. At a high level, the deep learning model surface estimator 320 may include a pre-processor 510, one or more deep learning model(s) 535 configured to predict values of the dense detection data 120, and a post-processor 575. The pre-processor 510 may encode the sparse detection data 110 into input data 530 that the deep learning model(s) 535 support, and the input data 530 may be fed into the deep learning model(s) 535 to predict regression data 570 and/or confidence data 580. In some embodiments, the repression data 570 and/or the confidence data 580 predicted by the deep learning model(s) 535 to may be used as the dense detection data 120. In some embodiments, the pre-processor 510 may include a normalizer 520 that removes a bias from the input data 530, in which case, the post-processor 575 may reintroduce the bias into the regression data 570 predicted by the deep learning model(s) 535 to generate at least a portion of the dense detection data 120.

In some embodiments, the pre-processor 510 includes an encoder 515 that encodes the sparse detection data 110 into a representation that the deep learning model(s) 535 support. By way of non-limiting example, in some embodiments where the sparse detection data 110 includes a sparse 3D point cloud, the encoder 515 may project the sparse 3D point cloud to form a sparse projection image (e.g., a top-down height map). In some cases (e.g., without the normalizer 520), the resulting sparse projection image may be used as the input data 530 and fed into the deep learning model(s) 535 to predict the regression data 570 (e.g., a dense projection image such as a top-down height map) and/or the confidence data 580. In some cases, the regression data 570 and/or the confidence data 580 predicted by the deep learning model(s) 535 to may be used as the dense detection data 120.

In some cases, the sparse detection data 110 and/or encoded sparse detection data (e.g., a sparse projection image) may include a bias. As such, in some embodiments, the pre-processor 510 may include a normalizer 520 that removes the bias or otherwise normalizes the sparse detection data 110 and/or the encoded sparse detection data. For example, in some embodiments where the sparse detection data 110 includes a sparse 3D point cloud, and the encoder 515 projects the sparse 3D point cloud to form a 2D height map, the 2D height map may store height values that include a bias corresponding to the height of the camera that captured the images from which the 2D height map was derived. As such, in some embodiments, the normalizer 520 calculates the mean height of the height values (e.g., of a desired surface) in the 2D height map and subtracts the mean height from all the height values (e.g., of the desired surface) to remove the bias. The resulting 2D height map (or other normalized, encoded sparse detection data) may be used as the input data 530 and fed into the deep learning model(s) 535 to predict the regression data 570 (e.g., a dense 2D height map) and/or the confidence data 580, and the post-processor 575 may reintroduce the bias to the predicted output (e.g., by adding the bias to some or all predicted values of the regression data 570).

Turning now to the deep learning model(s) 535, in some embodiments, the deep learning model(s) 535 may be implemented using a DNN, such as a convolutional neural network (CNN). Although certain embodiments are described with the deep learning model(s) 535 being implemented using neural network(s) and specifically CNN(s), this is not intended to be limiting. For example, and without limitation, the deep learning model(s) 535 may additionally or alternatively include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, Markov random fields, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In some embodiments, the deep learning model(s) 535 may include a common trunk (or stream of layers) with one or more heads (or at least partially discrete streams of layers) for predicting different outputs based on the input data 530. For example, the deep learning model(s) 535 may include, without limitation, a feature extractor (e.g., a DNN, an encoder/decoder, etc.) including convolutional layers, pooling layers, and/or other layer types, where the output of the feature extractor is provided as input to each of a plurality of heads that predict different outputs. The different heads may receive parallel inputs, in some examples, and thus may produce different outputs from similar input data. In the example of FIG. 5, the deep learning model(s) 535 is illustrated with an example architecture that extracts features from the input data 106 and executes regression on the extracted features, More specifically, the deep learning model(s) 535 may include an encoder/decoder 540, a regression head 545, and/or a confidence head 550.

The encoder/decoder 540 may be implemented using encoder and decoder components with skip connections (e.g., similar to ResNet, Feature Pyramid Network, U-Net, etc.). For example, the encoder/decoder 540 may accept the input data 530 (e.g., a projection image, a 2D height map) and apply various convolutions, pooling, and/or other types of operations to extract features into some latent space. In FIG. 5, the encoder/decoder 540 is illustrated with an example implementation involving (from left to right) an encoding (contracting) path and a decoding (expansive) path, Along the contracting path, each resolution may include any number of layers (e.g., convolutions, dilated convolutions, inception blocks, etc.) and a downsampling operation (e.g., max pooling). Along the expansive path, each resolution may include any number of layers (e.g., deconvolutions, upsampling followed by convolution(s), and/or other types of operations). In the expansive path, each resolution of a feature map may be upsampled and concatenated (e.g., in the depth dimension) with feature maps of the same resolution from the contracting path. In this example, corresponding resolutions of the contracting and expansive paths may be connected with skip connections, which may be used to add or concatenate feature maps from corresponding resolutions. As such, the encoder/decoder 540 may extract features into some latent space, and a representation of the extracted features may be input into the regression head 545 and/or the confidence head 550.

The regression head 545 may include any number of layers (e.g., convolutions, pooling, classifiers such as softmax, and/or other types of operations, etc.) that predict a particular type of information about the 3D surface structure of interest (e.g., a height value for each pixel) from the output of the encoder/decoder 540. In some embodiments, the regression data 570 predicted by the regression head 545 may take the form of a 2D height map with each pixel storing a floating-point number that regresses the height of the portion of the 3D surface represented by the pixel.

The confidence head 550 may include any number of layers (e.g., convolutions, pooling, classifiers such as softmax, and/or other types of operations, etc.) that predict the confidence data 580 for the regression data 570, from the output of the encoder/decoder 540. For example, in some embodiments where the regression data 570 takes the form of a 2D height map$\in N^{m \times n}$, the confidence data 580 may take the form of a corresponding confidence map$\in N^{m \times n}$ with pixels that store a floating-point number that regresses a representation of the confidence of a corresponding predicted value in the 2D height map.

Figure 6:
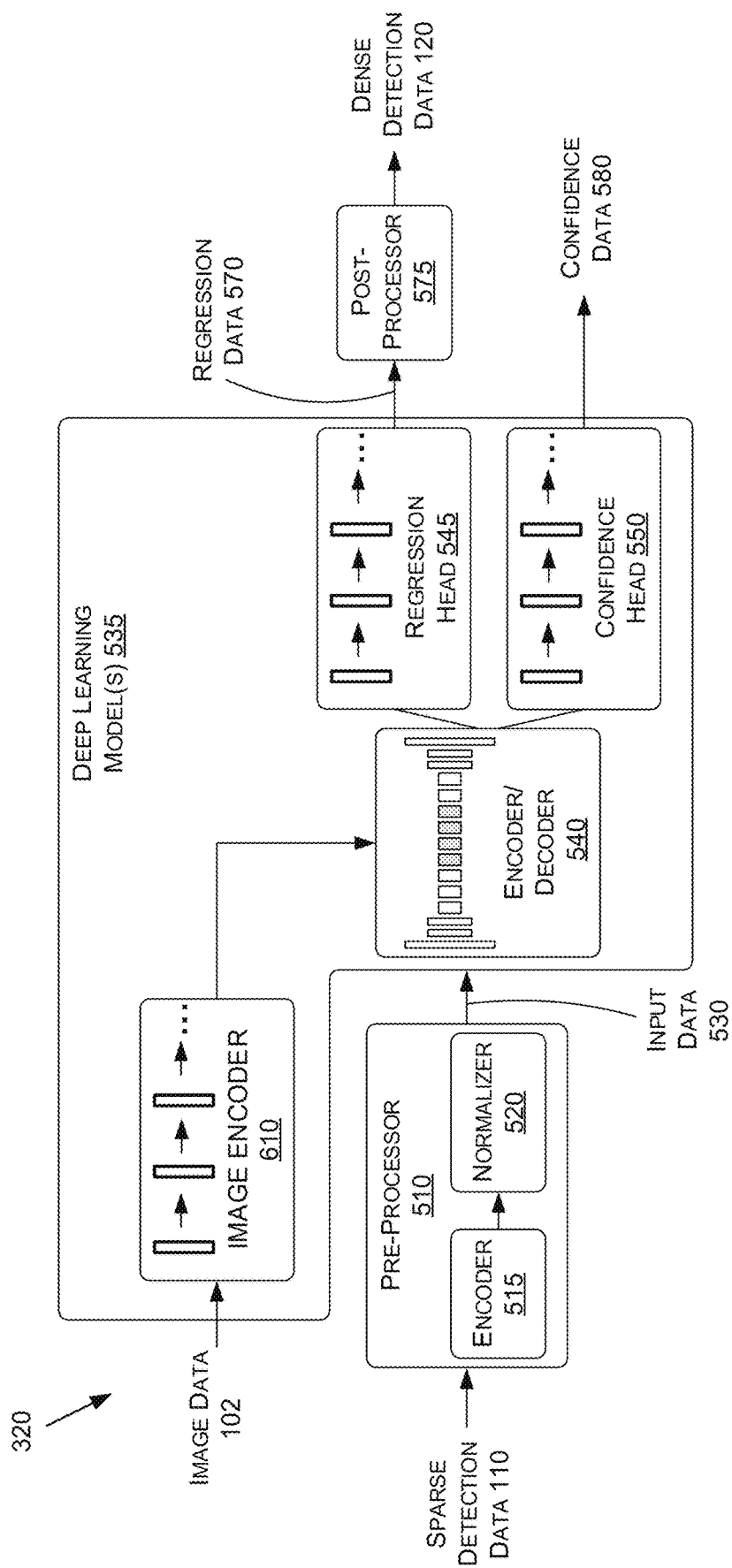
FIG. 6 is data flow diagram illustrating an example deep learning model surface estimator that includes a deep learning model(s) with multiple inputs heads, in accordance with some embodiments of the present disclosure.

As such, FIG. 5 illustrates an embodiment of the deep learning model(s) 535 that predicts regression data 570 (e.g., a 2D height map) and confidence data 580. However, any number of variations may be implemented. For example, in some embodiments, the deep learning model(s) 535 may be implemented with a single output channel corresponding to the regression head 545. In another example, in some embodiments, the deep learning model(s) 535 may include one or more recurrent layers (e.g., Gated Recurrent Units, Long Short Term Memory) to leverage temporal information. In some cases, including one or more recurrent layers may allow the deep learning model(s) 535 to leverage information from previous time slices, resulting in better predictions and more stable densification results over time. In yet another example, the deep learning model(s) 535 may be implemented with multiple inputs heads that accept different inputs, such as an input image (e.g., an RGB image) with a perspective view and a projection image with another view (e.g., a top-down height map). FIG. 6 illustrates such an example.

More specifically, FIG. 6 is a data flow diagram illustrating an example implementation of the deep learning model surface estimator 320 of FIG. 3 with a deep learning model(s) that includes multiple input heads. Generally, the implementations of the deep learning model surface estimator 320 illustrated in FIGS. 5 and 6 have similar components, except the implementation illustrated in FIG. 6 extends the deep learning model(s) 535 to include an image encoder 610. As such, whereas the implementation of the deep learning model(s) 535 illustrated in FIG. 5 includes a single input head (e.g., the encoder portion of the encoder/decoder 540) that accepts the input data 530 (e.g., a projection of a 3D point cloud), the implementation of the deep learning model(s) 535 illustrated in FIG. 6 additionally accepts the image data 102 (e.g., an RBG frame) into a second input head (e.g., the image encoder 610). Generally, the image encoder 610 (and/or any other input head) may include any number of layers (e.g., convolutions, pooling, and/or other types of operations) to extract features into some latent space, and the extracted features may be combined (e.g., concatenated) with extracted features from the encoder portion of the encoder/decoder 540 (and/or extracted features from other input heads). As such, in some embodiments such as the one illustrated in FIG. 6, the deep learning model(s) 535 may learn from two different views of an observed surface structure (e.g., top-down and perspective, 3D point cloud space and 2D image space, etc.).

As such and returning to FIG. 3, the deep learning model surface estimator 320 of FIG. 3 may be implemented using a variety of architectures for a constituent deep learning model (e.g., the deep learning model(s) 535 of FIG. 5 or 6) and/or some other machine learning model(s) to predict the dense detection data 120 from the sparse detection data 110. The result may be a representation of the 3D surface structure of the road, such as a 2D height map, which may be transformed into a 3D point cloud (e.g., in 3D world coordinates). In operation, the deep learning model surface estimator 320 may repetitively operate on successive instances of the sparse detection data 110 (e.g., derived from sensor data captured during successive time slices separated by some designated internal) to predict successive instances of the dense detection data 120 (e.g., successive representations of corresponding portions of the 3D surface structure of the road), for example, as the vehicle 1700 of FIGS. 17A-17D moves through the 3D environment.

Returning to FIG. 1, once the 3D structure of the detected surface been determined, positional values that are not already in 3D world coordinates may be converted to 3D world coordinates, associated with a corresponding class label identifying the detected surface (e.g., a road), and/or may be provided for use by the vehicle 1700 of FIGS. 17A-17D in performing one or more operations. For example, the dense detection data 120 (e.g., a 3D point cloud, a projection image, corresponding labels) may be used by control component(s) of the vehicle 1700, such as an autonomous driving software stack 122 executing on one or more components of the vehicle 1700 of FIGS. 17A-17D (e.g., the SoC(s) 1704, the CPU(s) 1718, the GPU(s) 1720, etc.), For example, the vehicle 1700 may use this information (e.g., instances of obstacles) to navigate, plan, or otherwise perform one or more operations (e.g., obstacle or protuberance avoidance, lane keeping, lane changing, merging, splitting, adapting a suspension system of the ego-object or ego-actor to match the current road surface, applying an early acceleration or deceleration based on an approaching surface slope, mapping, etc.) within the environment.

In some embodiments, the dense detection data 120 may be used by one or more layers of the autonomous driving software stack 122 (alternatively referred to herein as "drive stack 122"). The drive stack 122 may include a sensor manager (not shown), perception component(s) (e.g., corresponding to a perception layer of the drive stack 122), a world model manager 126, planning component(s) 128 (e.g., corresponding to a planning layer of the drive stack 122), control component(s) 130 (e.g., corresponding to a control layer of the drive stack 122), obstacle avoidance component(s) 132 (e.g., corresponding to an obstacle, or collision avoidance layer of the drive stack 122), actuation component(s) 134 (e.g., corresponding to an actuation layer of the drive stack 122), and/or other components corresponding to additional and/or alternative layers of the drive stack 122. The process 100 may, in some examples, be executed by the perception component(s), which may feed up the layers of the drive stack 122 to the world model manager, as described in more detail herein.

The sensor manager may manage and/or abstract sensor data from the sensors of the vehicle 1700. For example, and with reference to FIG. 17C, the sensor data may be generated (e.g., perpetually, at intervals, based on certain conditions) by RADAR sensor(s) 1760. The sensor manager may receive the sensor data from the sensors in different formats (e.g., sensors of the same type may output sensor data in different formats), and may be configured to convert the different formats to a uniform format (e.g., for each sensor of the same type). As a result, other components, features, and/or functionality of the autonomous vehicle 1700 may use the uniform format, thereby simplifying processing of the sensor data. In some examples, the sensor manager may use a uniform format to apply control back to the sensors of the vehicle 1700, such as to set frame rates or to perform gain control. The sensor manager may also update sensor packets or communications corresponding to the sensor data with timestamps to help inform processing of the sensor data by various components, features, and functionality of an autonomous vehicle control system.

A world model manager 126 may be used to generate, update, and/or define a world model. The world model manager 126 may use information generated by and received from the perception component(s) of the drive stack 122 (e.g., the locations of detected obstacles). The perception component(s) may include an obstacle perceiver, a path perceiver, a wait perceiver, a map perceiver, and/or other perception component(s). For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager 126 may continually update the world model based on newly generated and/or received inputs (e.g., data) from the obstacle perceiver, the path perceiver, the wait perceiver, the map perceiver, and/or other components of the autonomous vehicle control system.

The world model may be used to help inform planning component(s) 128, control component(s) 130, obstacle avoidance component(s) 132, and/or actuation component(s) 134 of the drive stack 122. The obstacle perceiver may perform obstacle perception that may be based on where the vehicle 1700 is allowed to drive or is capable of driving (e.g., based on the location of the drivable or other navigable paths defined by avoiding detected obstacles in the environment and/or detected protuberances in the road surface), and how fast the vehicle 1700 can drive without colliding with an obstacle (e.g., an object, such as a structure, entity, vehicle, etc.) that is sensed by the sensors of the vehicle 1700.

The path perceiver may perform path perception, such as by perceiving nominal paths that are available in a particular situation. In some examples, the path perceiver may further take into account lane changes for path perception. A lane graph may represent the path or paths available to the vehicle 1700, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information. In some embodiments, the path perceiver may take into account the dense detection data 120. For example, the path perceiver may evaluate a reconstructed 3D road surface to identify protuberances and include paths that avoid the protuberances.

The wait perceiver may be responsible to determining constraints on the vehicle 1700 as a result of rules, conventions, and/or practical considerations. For example, the rules, conventions, and/or practical considerations may be in relation to a 3D road surface, traffic lights, multi-way stops, yields, merges, toll booths, gates, police or other emergency personnel, road workers, stopped buses or other vehicles, one-way bridge arbitrations, ferry entrances, etc. Thus, the wait perceiver may be leveraged to identify potential obstacles and implement one or more controls (e.g., slowing down, coming to a stop, etc.) that may not have been possible relying solely on the obstacle perceiver. In some embodiments, the wait perceiver may take into account the dense detection data 120. For example, the wait perceiver may evaluate a reconstructed 3D road surface to identify an approaching surface slope and determine to apply and/or apply an early, acceleration or deceleration to accommodate the approaching surface slope. Additionally or alternatively, the wait perceiver may evaluate a reconstructed 3D road surface to identify a portion of an approaching road surface and determine to adapt and/or adapt a suspension system of the vehicle 1700 such that, once the vehicle 1700 reaches a corresponding portion of the road, the suspension system matches the identified road surface.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the vehicle 1700 of static or stationary infrastructure objects and obstacles. The map perceiver may also generate information for the wait perceiver and/or the path perceiver, for example, such as to determine which light at an intersection has to be green for the vehicle 1700 to take a particular path.

Figure 17A:
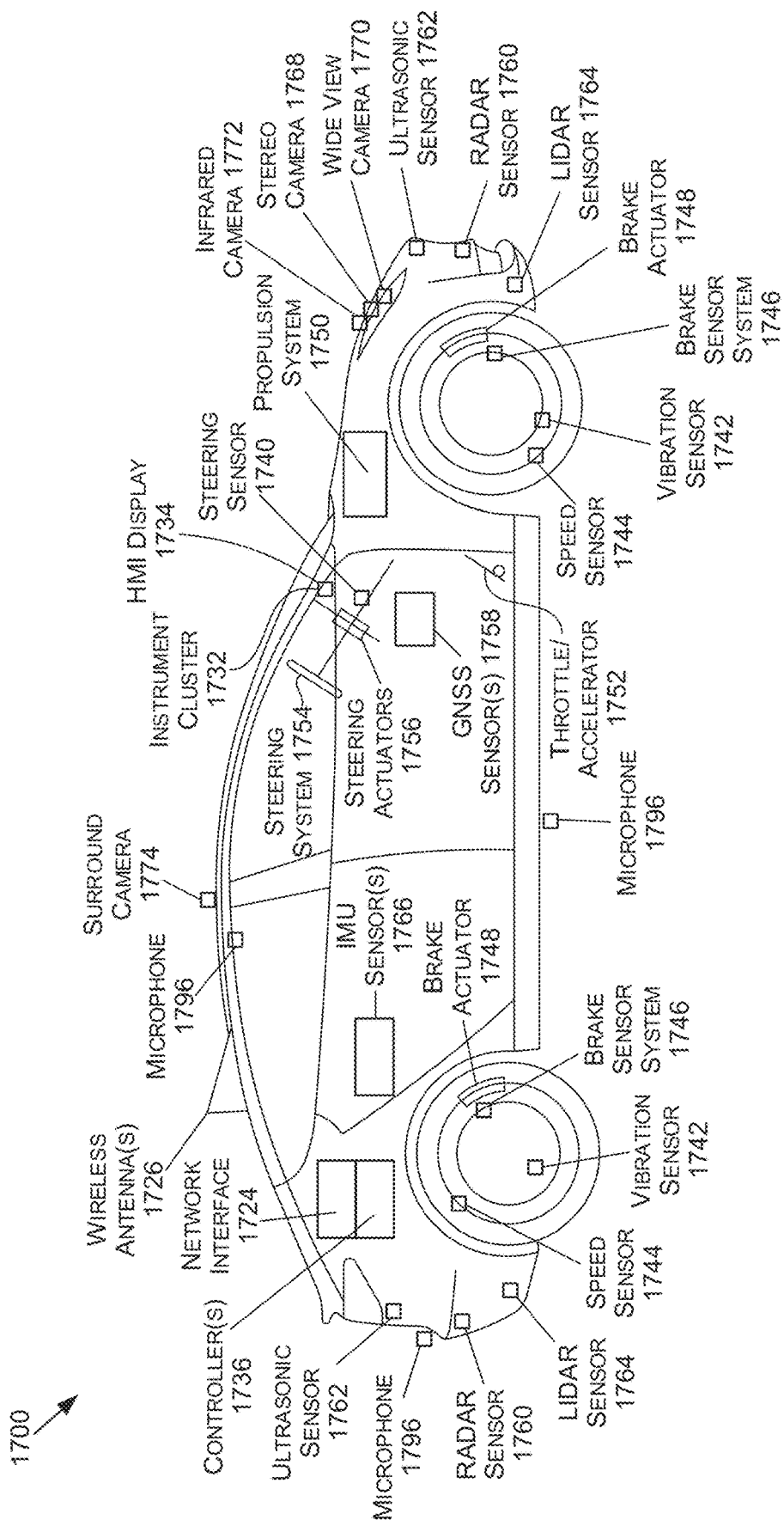
FIG. 17A is an illustration of an example autonomous vehicle, in accordance with some embodiments of the present disclosure.
Figure 17B:
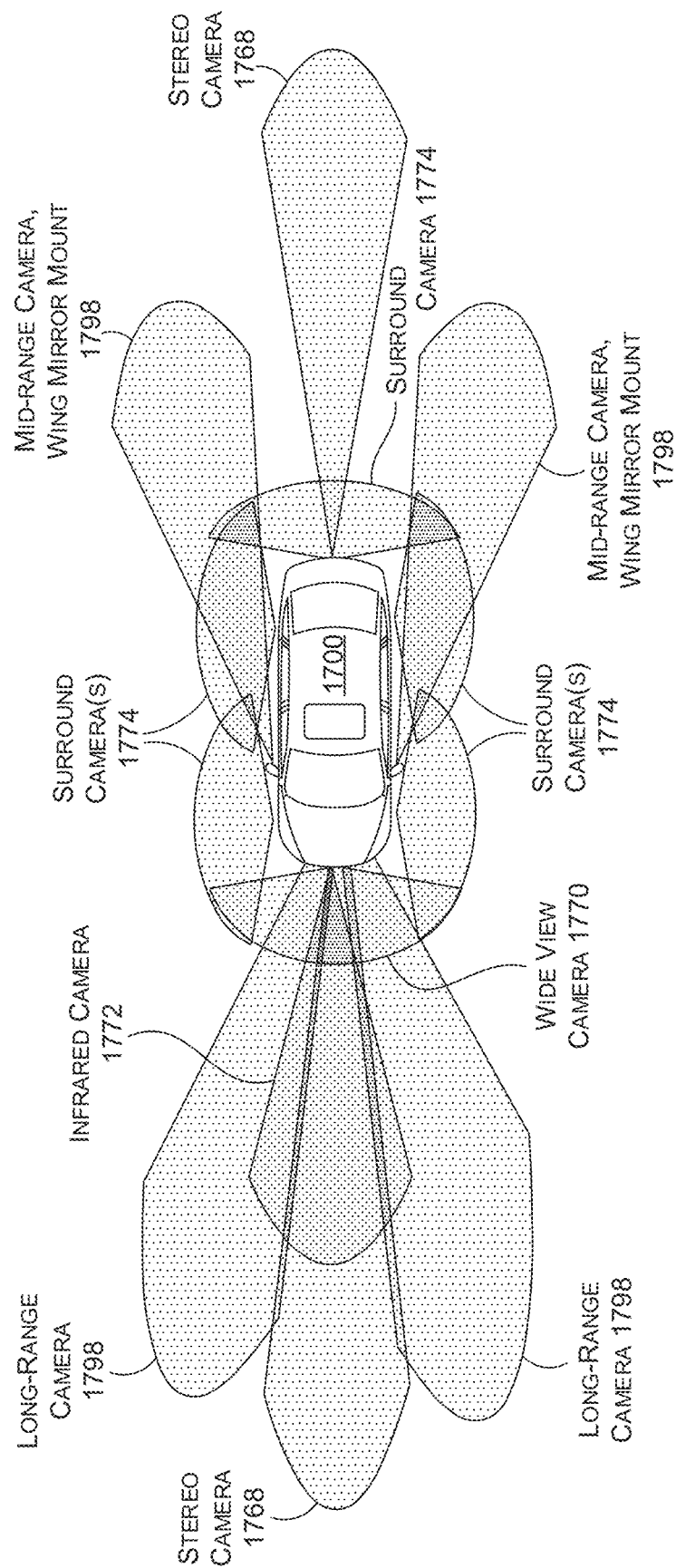
FIG. 17B is an example of camera locations and fields of view for the example autonomous vehicle of FIG. 17A, in accordance with some embodiments of the present disclosure.
Figure 17C:
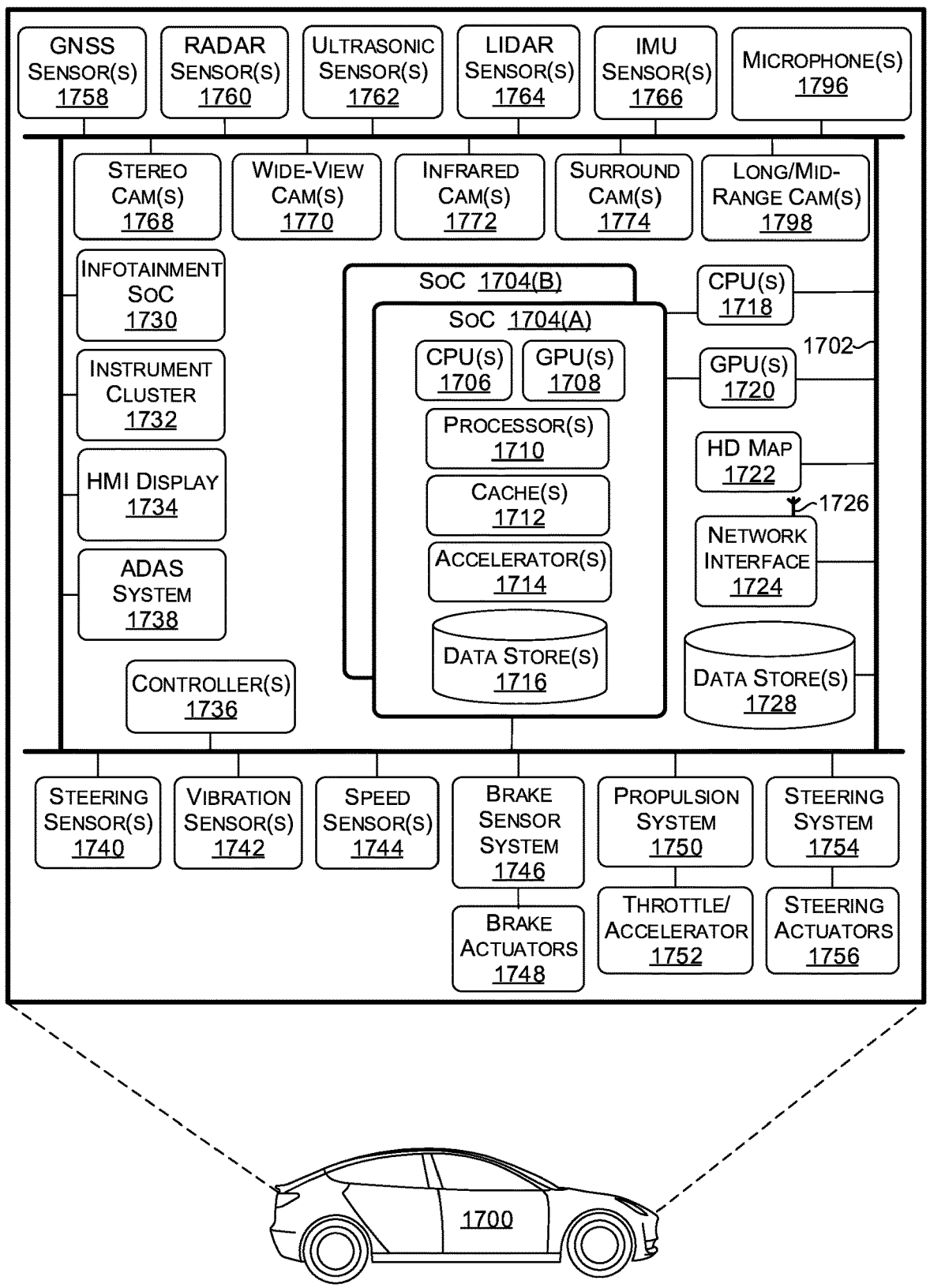
FIG. 17C is a block diagram of an example system architecture for the example autonomous vehicle of FIG. 17A, in accordance with some embodiments of the present disclosure.
Figure 17D:
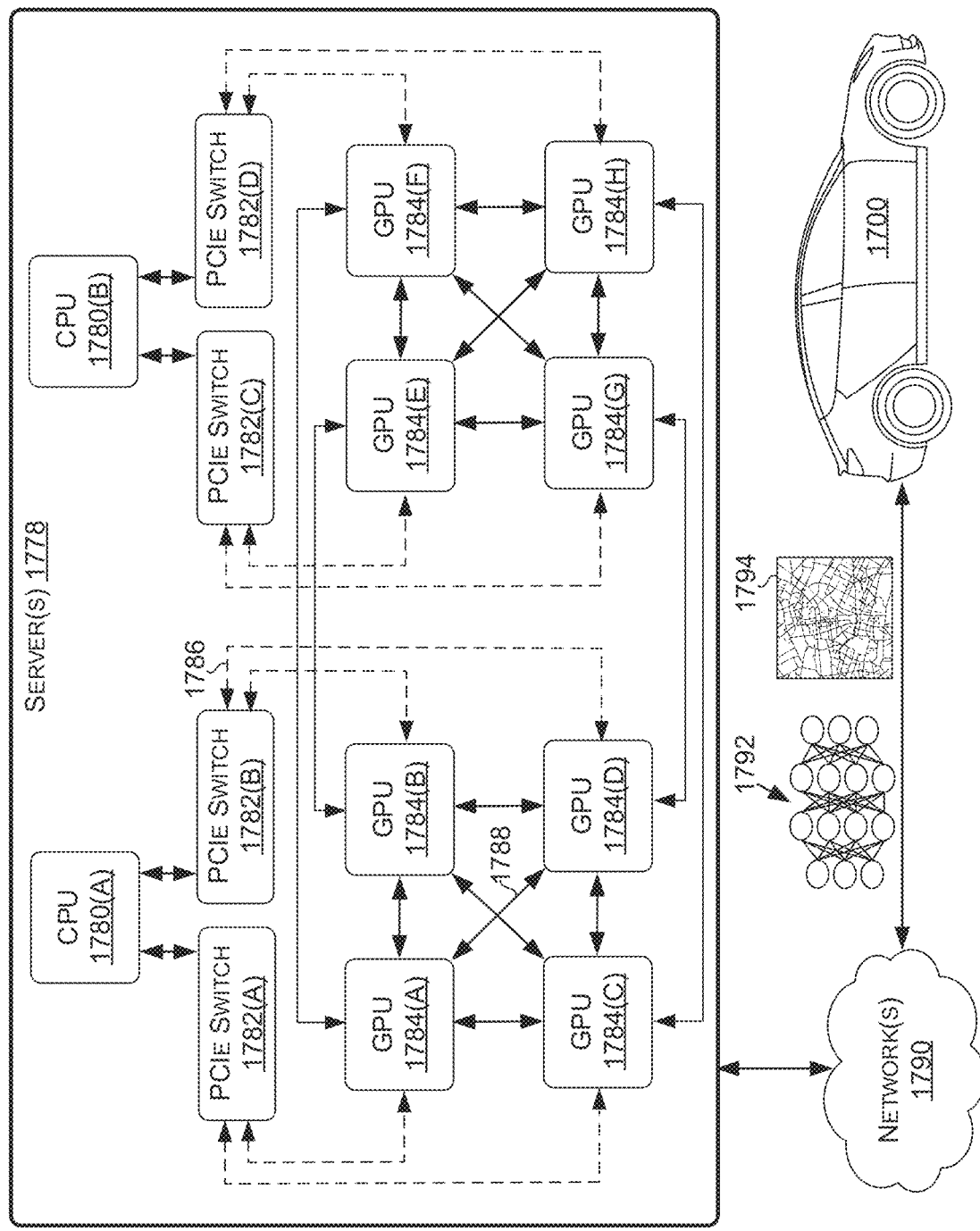
FIG. 17D is a system diagram for communication between cloud-based server(s) and the example autonomous vehicle of FIG. 17A, in accordance with some embodiments of the present disclosure.

In some examples, information from the map perceiver may be sent, transmitted, and/or provided to server(s) to a map manager of server(s) 1778 of FIG. 17D), and information from the servers) may be sent, transmitted, and/or provided to the map perceiver and/or a localization manager of the vehicle 1700. The map manager may include a cloud mapping application that is remotely located from the vehicle 1700 and accessible by the vehicle 1700 over one or more network(s). For example, the map perceiver and/or the localization manager of the vehicle 1700 may communicate with the map manager and/or one or more other components or features of the server(s) to inform the map perceiver and/or the localization manager of past and present drives or trips of the vehicle 1700, as well as past and present drives or trips of other vehicles. The map manager may provide mapping outputs (e.g., map data) that may be localized by the localization manager based on a particular location of the vehicle 1700, and the localized mapping outputs may be used by the world model manager 126 to generate and/or update the world model.

The planning component(s) 128 may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints), 3D world coordinates (e.g., Cartesian, polar, etc.) that indicate coordinates relative to an origin point on the vehicle 1700, etc. The waypoints may be representative of a specific distance into the future for the vehicle 1700, such as a number of city blocks, a number of kilometers, a number of feet, a number of inches, a number of miles, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 1700, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) 130 may follow a trajectory or path (lateral and longitudinal) that has been received from the behavior selector (e.g., based on the dense detection data 120) of the planning component(s) 128 as closely as possible and within the capabilities of the vehicle 1700. The control component(s) 130 may use tight feedback to handle unplanned events or behaviors that are not modeled and/or anything that causes discrepancies from the ideal (e.g., unexpected delay). In some examples, the control component(s) 130 may use a forward prediction model that takes control as an input variable, and produces predictions that may be compared with the desired state (e.g., compared with the desired lateral and longitudinal path requested by the planning component(s) 128). The control(s) that minimize discrepancy may be determined.

Although the planning component(s) 128 and the control component(s) 130 are illustrated separately, this is not intended to be limiting. For example, in some embodiments, the delineation between the planning component(s) 128 and the control component(s) 130 may not be precisely defined. As such, at least some of the components, features, and/or functionality attributed to the planning component(s) 128 may be associated with the control component(s) 130, and vice versa. This may also hold trite for any of the separately illustrated components of the drive stack 122.

The obstacle avoidance component(s) 132 may aid the autonomous vehicle 1700 in avoiding collisions with objects (e.g., moving and stationary objects). The obstacle avoidance component(s) 132 may include a computational mechanism at a "primal level" of obstacle avoidance, and may act as a "survival brain" or "reptile brain" for the vehicle 1700. In some examples, the obstacle avoidance component(s) 132 may be used independently of components, features, and/or functionality of the vehicle 1700 that is required to obey traffic rules and drive courteously. In such examples, the obstacle avoidance component(s) may ignore traffic laws, rules of the road, and courteous driving norms in order to ensure that collisions do not occur between the vehicle 1700 and any objects. As such, the obstacle avoidance layer may be a separate layer from the rules of the road layer, and the obstacle avoidance layer may ensure that the vehicle 1700 is only performing safe actions from an obstacle avoidance standpoint. The rules of the road layer, on the other hand, may ensure that vehicle obeys traffic laws and conventions, and observes lawful and conventional right of way (as described herein).

In some examples, the drivable or other navigable paths and/or the dense detection data 120 may be used by the obstacle avoidance component(s) 132 in determining controls or actions to take. For example, the drivable paths may provide an indication to the obstacle avoidance component(s) 132 of where the vehicle 1700 may maneuver without striking any objects, protuberances, structures, and/or the like, or at least where no static structures may exist.

In non-limiting embodiments, the obstacle avoidance component(s) 132 may be implemented as a separate, discrete feature of the vehicle 1700. For example, the obstacle avoidance component(s) 132 may operate separately (e.g., in parallel with, prior to, and/or after) the planning layer, the control layer, the actuation layer, and/or other layers of the drive stack 122.

As such, the vehicle 1700 may use this information (e.g., as the edges, or rails of the paths) to navigate, plan, or otherwise perform one or more operations (e.g. lane keeping, lane changing, merging, splitting, etc.) within the environment.

Figure 7:
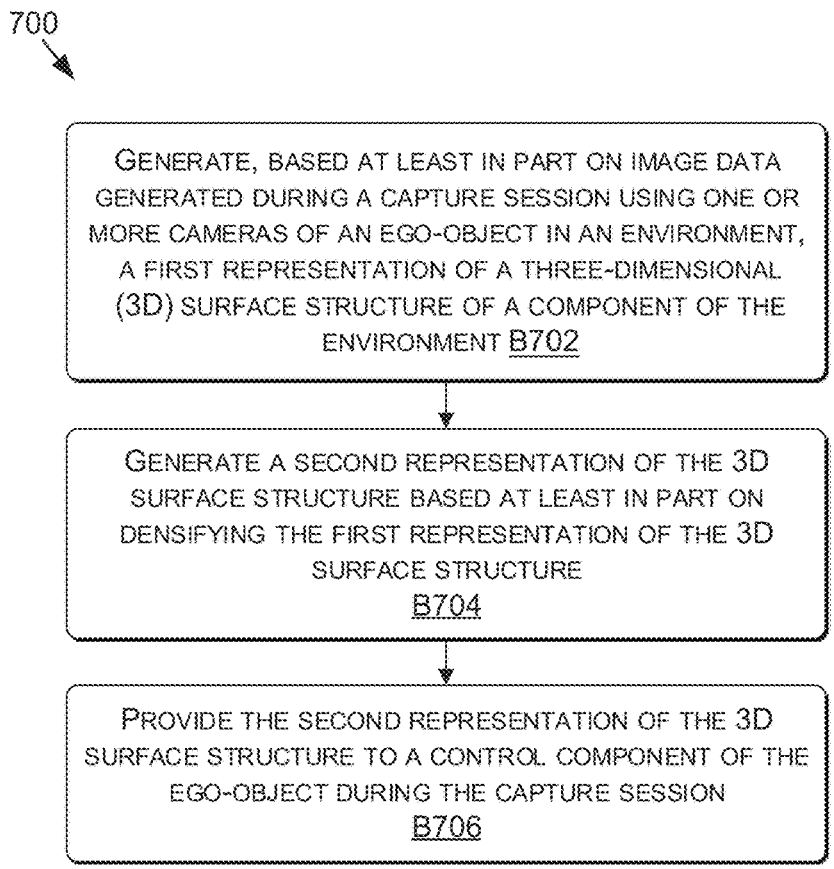
FIG. 7 is a flow diagram showing a method for generating a representation of a three-dimensional (3D) surface structure during a capture session, in accordance with some embodiments of the present disclosure.
Figure 8:
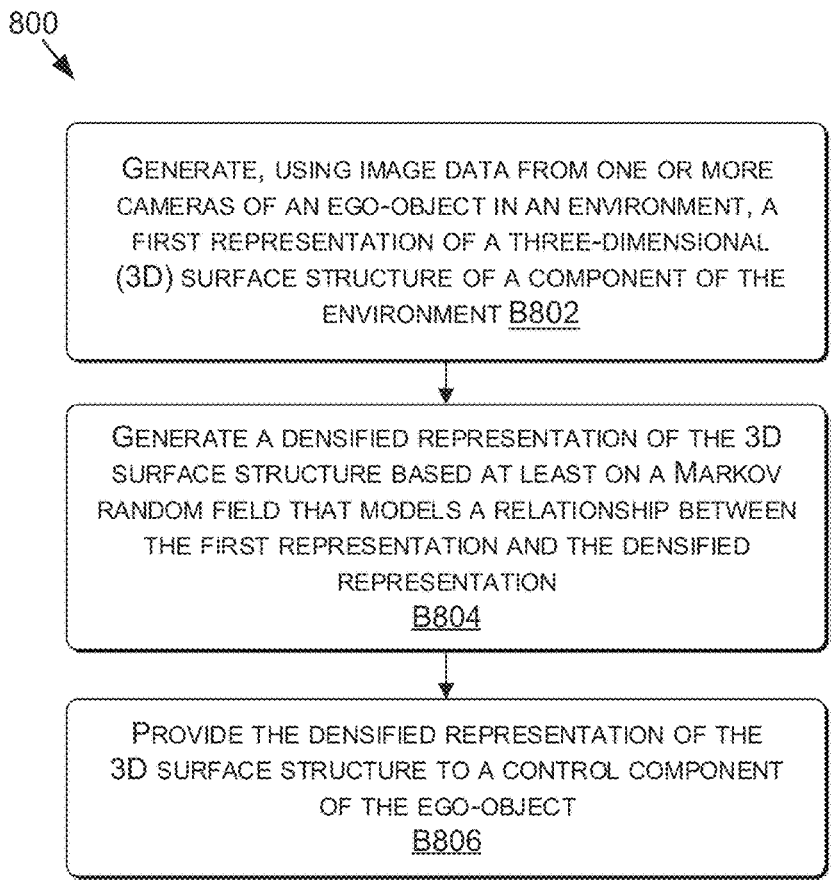
FIG. 8 is a flow diagram showing a method for generating a densified representation of a 3D surface structure based at least on a Markov random field, in accordance with some embodiments of the present disclosure.
Figure 9:
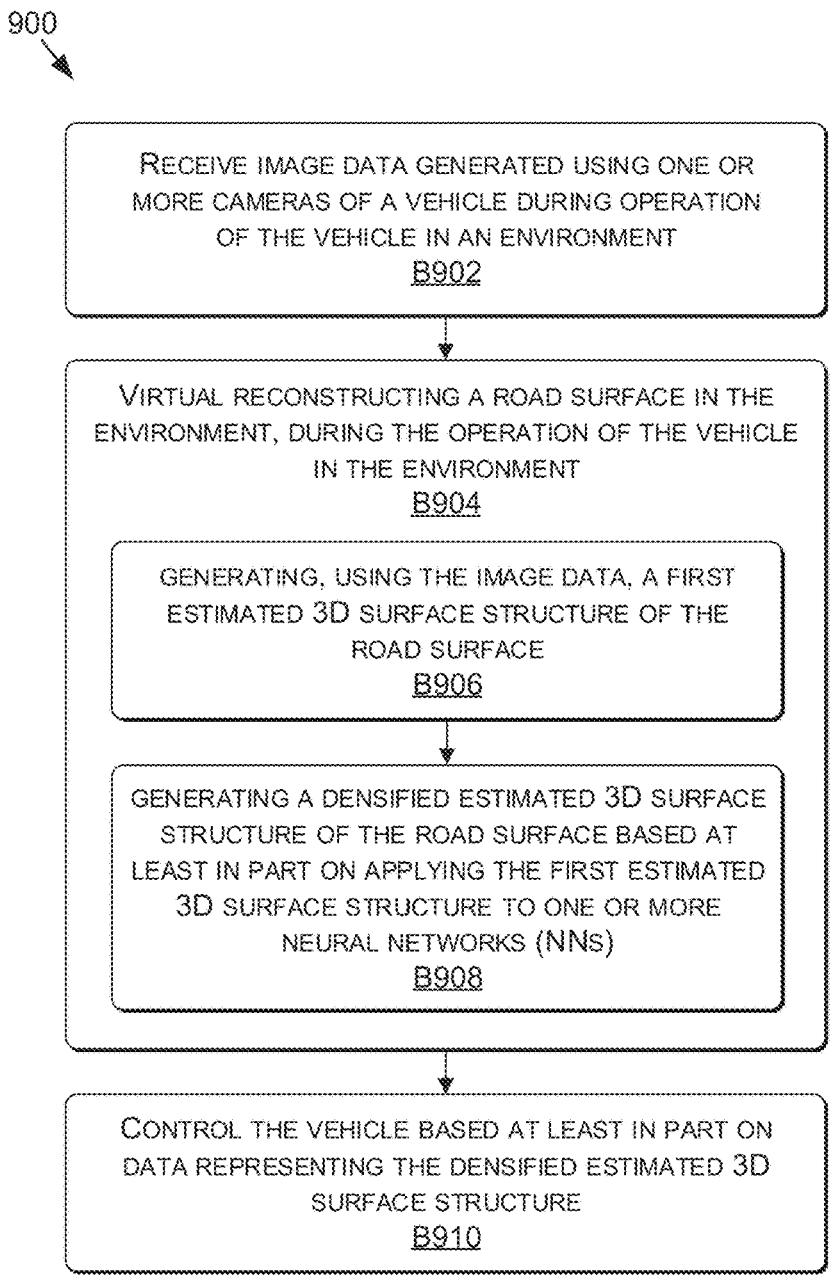
FIG. 9 is a flow diagram showing a method for controlling a vehicle based at least in part on a 3D road surface structure estimated using one or more neural networks, in accordance with some embodiments of the present disclosure.

Now referring to FIGS. 7-9, each block of methods 700-900, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 700-900 are described, by way of example, with respect to the surface reconstruction pipeline 100 of FIG. 1, However, these methods may additionally or alternatively be executed by any one system, or any combination of systems, including, but not limited to, those described herein.

FIG. 7 is a flow diagram showing a method 700 for generating a representation of a three-dimensional (3D) surface structure during a capture session, in accordance with some embodiments of the present disclosure. The method 700, at block B702, includes generating, based at least in part on image data generated during a capture session using one or more cameras of an ego-object in an environment, a first representation of a three-dimensional (3D) surface structure of a component of the environment. For example, with respect to FIG. 1, one or more cameras 101 of an ego-object may be used to capture the image data 102 as the ego-object navigates through the environment, and the 3D structure estimator 105 may process the image data 102 to estimate the 3D structure of a particular component of the environment, such as a 3D road surface or other environmental part. Any suitable 3D structure estimation technique may be used, such as Structure from Motion (SfM), stereo vision, and/or some other 3D surface structure estimation technique. In some embodiments, a segmentation mask or other classification data may be used to select points from the estimated 3D structure that are on the component of the environment of interest. The resulting representation of the 3D structure may include a 3D point cloud, a projection image, or some other representation.

The method 700, at block B704, includes generating a second representation of the 3D surface structure based at least in part on densifying the first representation of the 3D surface structure. For example, with respect to FIG. 1, the detection densifier 115 may densify the sparse detection data 110 to generate a denser representation of the 3D surface structure (e.g., dense detection data 120). Generally, the sparse detection data 110 may take any suitable form, such as a sparse 3D point cloud or a projection image of the sparse 3D point cloud (e.g., a 2D top-down height map). In some embodiments, the detection densifier 115 may densify the sparse detection data 110 using one or more machine learning models, such as a Markov random field (e.g., via the Markov random field surface estimator 310 of FIG. 3) and/or one or more deep neural networks (DNNs) (e.g., via the deep learning model surface estimator 320 of FIG. 3). The resulting representation of the 3D surface structure (dense detection data 120) may take any suitable form, such as 2D height map and/or a 3D point cloud.

The method 700, at block B706, includes providing the second representation of the 3D surface structure to a control component of the ego-object during the capture session. For example, the dense detection data 120 of FIG. 1 or other representation of the 3D surface structure may be provided to, and used by, control component(s) of the ego-object (e.g., software stack 122 FIG. 1, components of the autonomous vehicle 1700 of FIGS. 17A-17D such as controller(s) 1736, ADAS system 1738, and/or SOC(s) 1704) to aid the ego-object in performing one or more operations within the environment, such as path planning, obstacle or protuberance avoidance, adapting a suspension system of the ego-object or ego-actor to match the current road surface, applying an early acceleration or deceleration based on an approaching surface slope, mapping, and/or others.

FIG. 8 is a flow diagram showing a method 800 for generating a densified representation of a 3D surface structure based at least on a Markov random field, in accordance with some embodiments of the present disclosure. The method 800, at block B802, includes generating, using image data from one or more cameras of an ego-object in an environment, a first representation of a three-dimensional (3D) surface structure of a component of the environment. For example, with respect to FIG. 1, one or more cameras 101 of an ego-object may be used to capture the image data 102 as the ego-object navigates through the environment, and the 3D structure estimator 105 may process the mage data 102 to estimate the 3D structure of a particular surface of interest.

The method 800, at block B804, includes generating a densified representation of the 3D surface structure based at least on a Markov random field that models a relationship between the first representation and the densified representation. For example, the Markov random field surface estimator 310 of FIG. 3 may perform Maximum a Posteriori (MAP) inference to estimate the most likely densified representation (e.g., the dense detection data 120), given the Markov random field and the first representation e.g., the sparse detection data 110).

The method 800, at block B806, includes providing the densified representation of the 3D surface structure to a control component of the ego-object. For example, the dense detection data 120 of FIG. 1 or other representation of the 3D surface structure may be provided to, and used by, control component(s) of the ego-object (e.g., software stack 122 FIG. 1, components of the autonomous vehicle 1700 of FIG. 17A-17D such as controller(s) 1736, ADAS system 1738, and/or SOC(s) 1704) to aid the ego-object in performing one or more operations within the environment.

FIG. 9 is a flow diagram showing a method 900 for controlling a vehicle based at least in part on a 3D road surface structure estimated using one or more neural networks, in accordance with some embodiments of the present disclosure. The method 900, at block B902, includes receiving image data generated using one or more cameras of a vehicle during operation of the vehicle in an environment. For example, with respect to FIG. 1, one or more cameras 101 of a vehicle may be used to capture the image data 102 as the vehicle navigates through the environment.

The method 900, at block B904, includes virtually reconstructing a road surface in the environment, during the operation of the vehicle in the environment, based at least in part on blocks B906 and B908. The method 900, at block B906, includes generating, using the image data, a first estimated 3D surface structure of the road surface. For example, with respect to FIG. 1, the 3D structure estimator 105 may process the image data 102 to estimate the 3D structure of a particular surface of interest. The method 900, at block B908, includes generating a densified estimated 3D surface structure of the road surface based at least in part on applying the first estimated 3D surface structure to one or more neural networks (NNs). For example, the deep learning model surface estimator 320 of FIG. 3 or 5 may densify the sparse detection data 110 (e.g., a sparse 2D top-down height map) by inferring values of the dense detection data 120 (e.g., a dense 2D top-down height map) from the sparse detection data 110 using one or more NNs, such as one or more DNNs. By way of non-limiting example, in some embodiments where the sparse detection data 110 includes a sparse 3D point cloud, the encoder 515 of FIG. 5 may project the sparse 3D point cloud to form a sparse projection image (e.g., a top-down height map), and the sparse projection image may be fed into the deep learning model(s) 535 to predict the regression data 570 (e.g., a dense projection image such as a top-down height map) and/or the confidence data 580.

The method 900, at block B910, includes controlling the vehicle based at least in part on data representing the densified estimated 3D surface structure. For example, the dense detection data 120 of FIG. 1 or other representation of the densified estimated 3D surface structure may be provided to, and used by, control component(s) of the ego-object (e.g., software stack 122. FIG. 1, components of the autonomous vehicle 1700 of FIGS. 17A-17D such as controller(s) 1736, ADAS system 1738, and/or SOC(s) 1704) to aid the ego-object in performing one or more operations within the environment.

Generating Training Data and Training Deep Learning Model(s) A 3D Surface Reconstruction System In order to support training a deep learning model for a 3D surface reconstruction system (e.g., the deep learning model(s) 535 of FIG. 5 or 6), a training dataset (e.g., comprising sparse input data and/or ground truth representations of 3D surface structure) may be generated, compiled, and/or selected in a variety of ways. Generally, the type of training data may depend on the architecture of the deep learning model to be trained. For example, certain implementations may call for input training data comprising sparse representations of 3D surface structure (e.g., sparse height maps) and/or image data from some other perspective (e.g., images of a perspective view), and ground truth training data comprising dense representations of 3D surface structure (e.g., dense height maps) and/or segmentation masks (e.g., identifying a desired surface such as a road or other drivable space). In some embodiments, real-world data and/or virtual data may be collected and used to five training data. By way of non-limiting example, training data may be generated by rendering frames of virtual sensor data, segmentation masks, and depth maps; parametric mathematical modeling of a 3D road surface; collecting and annotating real sensor data from a single LiDAR sensor; and/or collecting and annotating real sensor data accumulated from multiple LiDAR sensors.

Generating Training Data from a Simulated Environment. In some embodiments, training data may be generated by rendering or generating frames of virtual sensor data, segmentation masks, and/or depth maps representing a simulated environment. For example, a simulation may be run to simulate a virtual world or environment (e.g., a simulated environment), and a virtual vehicle or other object may be simulated within the simulated environment. The virtual vehicle or object may include any number of sensors (e.g., virtual or simulated sensors), and virtual sensor data may be simulated for the sensors. As such, frames of virtual sensor data (e.g., virtual image data corresponding to a field(s) of view of virtual camera(s) of a virtual vehicle), and corresponding segmentation masks and depth maps, may be generated based on the simulated environment. The virtual sensor data may be used to generate (or used as) input training data, and the segmentation masks and/or depth maps may be used to generate (or used as) ground truth training data.

Figure 10:
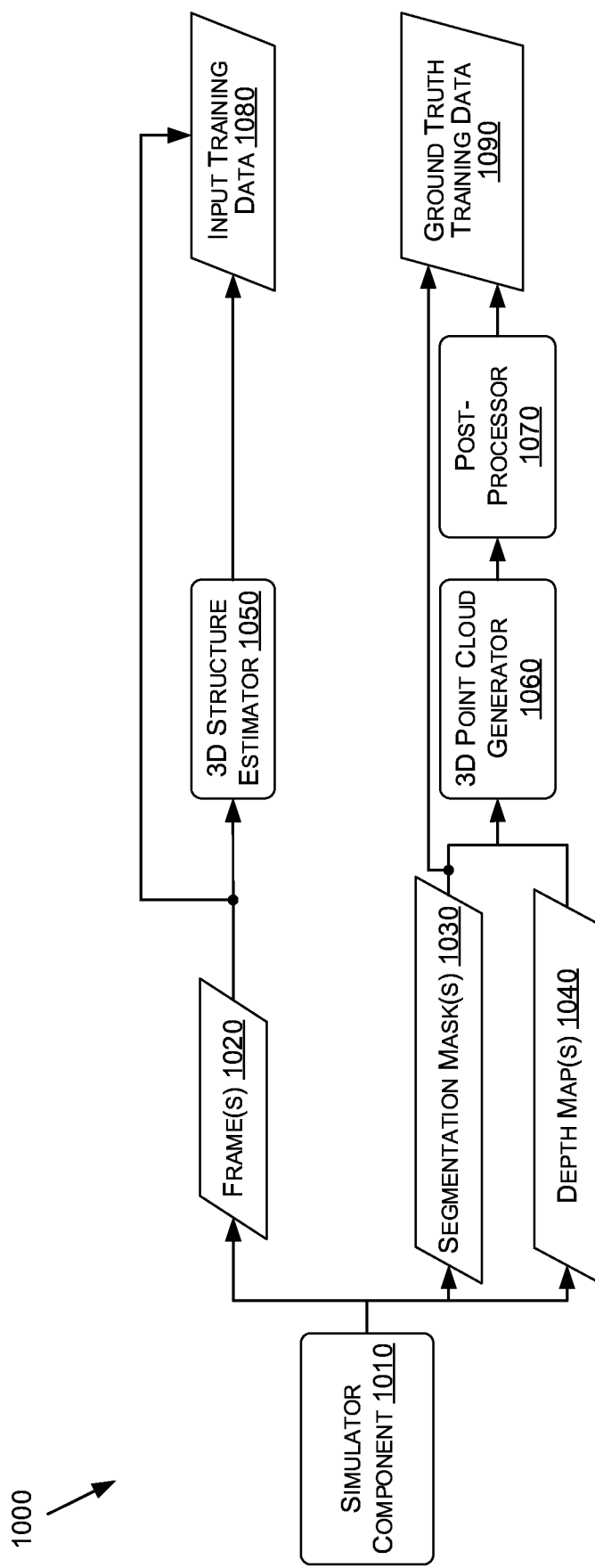
FIG. 10 is a data flow diagram illustrating an example training data generation pipeline using a simulated environment, in accordance with some embodiments of the present disclosure.

FIG. 10 is a data flow diagram illustrating an example training data generation pipeline 1000 using a simulated environment, in accordance with some embodiments of the present disclosure. The training data generation pipeline 1000 includes a simulator component 1010, which may generate a simulated environment, and frame(s) 1020 of virtual sensor data, segmentation mask(s) 1030, and/or depth map(s) 1040 representing the simulated environment. A 3D structure estimator 1050 (e.g., which may correspond to the 3D structure estimator 105 of FIG. 1) may generate a sparse representation of a 3D structure of a surface of interest (e.g., a sparse point cloud, a projection image) from the frame(s) 1020 (e.g., a rendered image), and the sparse representation of 3D structure and/or the frame(s) 1020 (e.g., a rendered image) may be used as input training data 1080. To generate ground truth training data 1090, a 3D point cloud generator 1060 may unproject range values from the depth map(s) 1040 into 3D world coordinates using the known position and orientation of the virtual camera relative to which the range values of the depth map(s) 1040 were generated, and the 3D point cloud generator 1060 may use the segmentation mask(s) 1030 to filter out 3D points on the surface of interest (e.g., a road surface). Since the resulting 3D point cloud may be sparse, a post-processor 1070 may be used to interpolate missing values and generate a dense representation of the 3D structure of the surface of interest (e.g., a point cloud, a projection image), and the dense representation of 3D structure and/or the segmentation mask(s) 1030 may be used as the ground truth training data 1090.

The simulator component 1010 may comprise a simulation system that simulates a virtual world or environment (e.g., a simulated environment). For example, the simulation system may generate a global simulation that generates a simulated environment that may include artificial intelligence (AI) vehicles or other objects (e.g., pedestrians, animals, etc.), hardware-in-the-loop (HIL) vehicles or other objects, software-in-the-loop (SIL) vehicles or other objects, and/or person-in-the-loop (PIL) vehicles or other objects. The simulated environment may be generated using rasterization, ray-tracing, using DNNs such as generative adversarial networks (GANs), another rendering technique, and/or a combination thereof. The simulated environment may include features of a driving environment, such as roads, bridges, tunnels, street signs, stop lights, crosswalks, buildings, trees and foliage, the sun, the moon, reflections, shadows, etc., in an effort to simulate a real-world environment. The global simulation may be maintained within an engine (e.g., a game engine), or other software-development environment, that may include a rendering engine (e.g., for 2D and/or 3D graphics), a physics engine (e.g., for collision detection, collision response, etc.), sound, scripting, animation, AI, networking, streaming, memory management, threading, localization support, scene graphs, cinematics, and/or other features. An example simulation system and an example global simulation are described in U.S. Non-Provisional patent application Ser. No. 16/818,551, filed on Mar. 13, 2020 and entitled "Sensor Simulation and Learning Sensor Models with Generative Machine Learning Methods," the contents of which are herein incorporated by reference in their entirety.

In some embodiments, the simulator component 1010 may generate frame(s) 1020 of virtual sensor data (e.g., image data), segmentation mask(s) 1030, and/or depth map(s) 1040 representing the simulated environment. For example, the simulator component 1010 may render images of the simulated environment from the perspective of a virtual camera disposed on a virtual vehicle or other object in the simulated environment. In some embodiments, the simulator component 1010 may use known coordinates of a simulated surface of interest (e.g., a road surface) in the simulated environment to generate segmentation mask(s) 1030 and/or depth map(s) 1040 (e.g., per-pixel depth map(s)) corresponding to the frame(s) 1020 of virtual sensor data. The frame(s) 1020 of virtual sensor data, segmentation mask(s) 1030, and/or depth map(s) 1040 (collectively, simulated or virtual data) may be grouped together, and the simulator component 1010 may generate simulated or virtual data representing successive time slices in the simulated environment, for example, as the virtual vehicle or other object navigates through the simulated environment. As such, the simulator component 1010 may generate frame(s) 1020 of virtual sensor data, segmentation mask(s) 1030, and/or depth map(s) 1040 representing realistic (e.g., driving) scenarios.

For any given frame(s) 1020, the 3D structure estimator 1050 may estimate a 3D surface structure of a surface of interest (e.g., a road surface) from the frame(s) 1020. For example, 3D structure may be estimated using the techniques described herein with respect to the 3D structure estimator 105 of FIG. 1 (e.g., using Structure from Motion, stereo vision, outlier removal, and/or surface point selection). In some embodiments, the 3D structure estimator 1050 may use the segmentation mask(s) 1030 to select points from an estimated 3D structure that belong to a class represented by the segmentation mask (e.g., points that belong to a surface of interest, such as a 3D road surface). In some embodiments, the resulting points may be projected to form a projection image (e.g., a 2D height map). The result may be a sparse representation of the 3D structure of the surface of interest (e.g., a sparse point cloud, a sparse projection image). The sparse representation of 3D structure and/or the frame(s) 1020 (e.g., a rendered image) may be designated as input training data 1080 and included in a training dataset.

In some embodiments, to generate corresponding ground truth training data 1090, the 3D point cloud generator 1060 may generate a 3D point cloud or other representation of 3D structure using the depth map(s) 1040. For example, the 3D point cloud generator 1060 may generate 3D points by unprojecting range values from the depth map(s) 1040 into 3D world coordinates of the simulated environment using the location and orientation of the virtual camera relative to which the range values of the depth map(s) 1040 were generated, and the 3D point cloud generator 1060 may select 3D points on the surface of interest using the segmentation mask(s) 1030 (e.g., by selecting 3D points that project onto a portion of the segmentation mask(s) 1030 that represents the surface of interest). Additionally or alternatively, the 3D point cloud generator 1060 may use the segmentation mask(s) 1030 to select range values from the depth map(s) 1040 for points that are on the surface of interest (e.g., by overlaying the segmentation mask(s) 1030 on the depth map(s) 1040), and the 3D point cloud generator 1060 may unproject the selected range values into the simulated environment to generate the 3D points on the surface of interest.

Since the resulting 3D points (e.g., a 3D point cloud) may be sparse, the post-processor 1070 may be used to interpolate missing values using a triangulation algorithm. For example, the post-processor 1070 may perform Delaunay triangulation in 2D and/or in 3D. In an example embodiment involving 2D triangulation, the post-processor 1070 may project the 3D points on the surface of interest to form a projection image (e.g., a 2D height map) and perform Delaunay triangulation in the projection image to generate triangles, and the post-processor 1070 may sample points from the triangles to generate a desired number of points for a ground truth dense projection image (e.g., ground truth 2D height map). In an example embodiment involving 3D triangulation, the post-processor 1070 may perform 3D Delaunay triangulation to compute a surface mesh of triangles surrounding the 3D points on the surface of interest, and sample 3D points from the triangles of the surface mesh to generate a desired number of points for a ground truth dense projection image (e.g., ground truth 2D height map). For example, the post-processor 1070 may sample 3D points from the surface mesh and project the sampled 3D points to form a ground truth projection image (e.g., ground truth 2D height map). Pixels in a ground truth projection image that do not represent sampled points may be set to zero. As such, a dense projection image or other representation of the 3D points on the surface of interest and/or the segmentation mask(s) 1030 may be designated as the ground truth training data 1090, paired with corresponding input training data 1090, and included in a training dataset.

Generating Synthetic Training Data using Parametric Modeling. In another example technique for generating training data, synthetic training data may be generated using parametric mathematical modeling of a desired surface, such as 3D road surface. For example, a variety of synthetic 3D road surfaces may be generated by modeling a 3D road surface with varied parameters to simulate changes in road direction and lateral surface slope. By way of non-limiting example, a synthetic 3D surface may be created by modeling a 3D curve on the synthetic 3D surface and expanding the 3D curve to a 3D surface. The resulting synthetic 3D surface (or its component curves) may be sampled, and sampled points may be projected to form a synthetic ground truth projection image (e.g., a 2D height map). To generate a corresponding input training data, a known pattern that represents which pixels may remain unobserved during 3D structure estimation may be generated and applied to a ground truth projection image to simulate a corresponding sparse projection image with unobserved values. As such, synthetic sparse input projection images and dense ground truth projection images may be generated and included in a training dataset.

Figure 11:
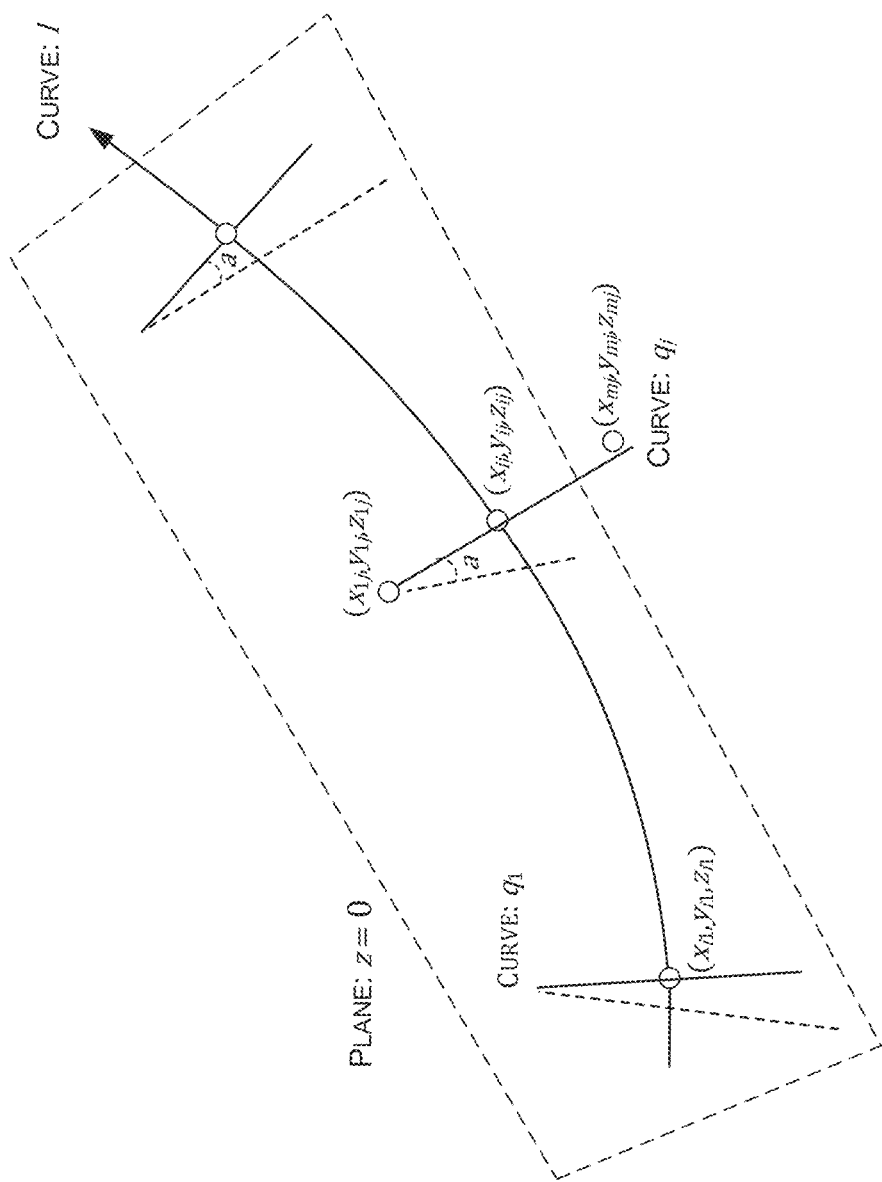
FIG. 11 is an illustration of an example parametric mathematical model of a desired surface, in accordance with some embodiments of the present disclosure.

FIG. 11 is an illustration of an example parametric mathematical model of a desired surface, in accordance with some embodiments of the present disclosure. In the example illustrated in FIG. 11, a 3D surface is modeled with longitudinal curve l and lateral curves $q_j$. In an example embodiment in which the 3D surface being modeled is a 3D road surface, parameters of parametric equations that define the longitudinal curve l and the lateral curves $q_j$ may be varied to simulate different types of 3D road surfaces.

By way of non-limiting example, a 3D curve on a synthetic 3D road surface may be generated by sampling longitudinal, lateral, and height values for the 3D curve. For example, a desired set of longitudinal values $[x_0, \ldots, x_n]$ for a synthetic 3D curve on a synthetic 3D surface may be initially sampled or otherwise chosen. For an example road surface, the longitudinal values may represent a desired perception range for a deep learning model surface estimator, such as 0 to 300 m. In some embodiments, lateral values for the synthetic 3D curve may be computed as a second order polynomial of the longitudinal values x: $y=a x^2+bx+c$. In embodiments involving synthetic 3D road surfaces, multiple synthetic 3D curves may be generated by sampling different values for polynomial constants a, b, and/or c to simulate different changes in road direction (e.g., curves, turns, etc.) for different synthetic 3D curves. In some embodiments, height values for the synthetic 3D curve may be computed as a linear combination of Fourier bases:

$$z=\Sigma_{k=1}^{K} c[k]*\cos(f[k]*x) \qquad (5)$$

where K is the number of Fourier bases, c is a weight for a particular basis k, and f is the frequency for a particular basis k. In embodiments involving synthetic 3D road surfaces, different height values may be calculated for different synthetic 3D curves using different sampled values for the number of bases K, weight c for a particular basis k, and/or frequency f for a particular basis k to simulate different changes in surface height for different synthetic 3D curves. The result may be a longitudinal 3D curve represented by curve l in the example illustrated in FIG. 11.

In some embodiments, the longitudinal 3D curve may be expanded to a 3D surface. For example, a longitudinal 3D curve may include any number of points $\{x_j, y_j\}$ for j in $[1, \ldots, n]$, and any given point on the longitudinal 3D curve (e.g., each point) may be expanded into a corresponding lateral 3D curve, represented by curves $q_j$ in the example illustrated in FIG. 11. For example, a parameter α may be defined to denote the angle between a synthetic 3D surface (e.g., the synthetic 3D road surface) and a surface (e.g., the ground plane, z=0), and different values of α may be sampled to simulate different lateral surface slopes at different points on the longitudinal 3D curve and/or for different synthetic 3D curves. For a particular 3D point $p_j=\{x_j, y_j, z_j\}$ on the longitudinal 3D curve l, the 3D point may be expanded into a lateral 3D curve $q_j$ that passes through $p_j$, perpendicular to the curve l at $p_j$, and having angle α relative to surface z=0. Any type of lateral 3D curve may be used (e.g., linear, polynomial, etc.), and any given lateral 3D curve $q_j$ may be sampled in times to expand a corresponding 3D point $p_j=\{x_j, y_j, z_j\}$ on a longitudinal 3D curve l into a set of 3D points $\{x_{ij}, y_{ij}, z_{ij}\}$, i=$[1, \ldots, m]$, where different values of m may be sampled to simulate different road widths at different points on the longitudinal 3D curve and/or for different synthetic 3D surfaces. The process may be repeated for any given point on a longitudinal 3D curve (e.g., each point) to generate a dense 3D point cloud, which may be projected to form a ground truth projection image (e.g., a ground truth 2D height map).

To generate corresponding input training data, a known pattern that represents which pixels may remain unobserved by 3D estimation may be generated and applied to the ground truth projection image to cancel out a subset of pixel values (e.g., setting those pixel values to zero) to simulate unobserved values. For example, suppose a ground truth height map is of size H×W. In this example, a pattern represented by N binary maps of size H×W may be generated by performing 3D estimation on real-world data. For example, one or more vehicles (e.g., vehicle 1700 of FIGS. 17A-D) may collect frames of sensor data (e.g., image data) from one or more sensors (e.g., cameras) of the vehicle(s) in real-world (e.g., physical) environments, as explained in more detail below. A 3D surface structure of a desired surface (e.g., 3D road surface) may be estimated from each frame of sensor data (as described herein), and the resulting representation of 3D structure (e.g., a sparse 3D point cloud) may be projected to form a sparse projection image (e.g., a sparse 2D height map), which may include both observed and unobserved values. For each of N sparse projection images of size H×W, a corresponding binary map of size H×W may be generated to represent which pixels are observed and unobserved. For example, pixels of a binary map corresponding to observed values may be set to 1, and pixels corresponding to unobserved values may be to 0. As such, an N×H×W pattern of binary maps may be generated to represent which pixels may remain unobserved by 3D estimation.

For each synthetic ground truth projection image, one of the N binary maps may be randomly sampled and applied to the synthetic ground truth projection image (e.g., using element-wise multiplication) to generate a corresponding synthetic sparse projection image. As such, pairs of synthetic input and ground truth projection images may be generated and added to a training dataset.

Generating Training Data from Real-World Sensor Data. In some embodiments, training data may be generated by collecting and annotating real-world sensor data. For example, one or more vehicles may collect frames of sensor data (e.g., image data and LiDAR data) from one or more sensors (e.g., camera(s) and LiDAR sensor(s)) of the vehicle(s) in real-world (e.g., physical) environments. In some embodiments, LIDAR data may be smoothed, subject to outlier removal, subject to triangulation to interpolate missing values, accumulated from multi LiDAR sensors, temporally and/or spatially aligned with corresponding frames of image data, and annotated to identify 3D points on a surface of interest (e.g., a 3D road surface). A representation of the identified 3D points (e.g., a 3D point cloud, a projection image) may be designated as ground truth training data. In some embodiments, object detection, free space estimation, and/or image segmentation may be applied to frames of image data to generate corresponding segmentation masks, which may be designated as ground truth training data. Corresponding frames of image data may be subject to 3D estimation, and the resulting sparse representation of the surface of interest (e.g., a 3D point cloud, a projection image) may be designated as input training data. For example, a corresponding sparse projection image, camera frame, dense projection image, and/or segmentation mask may be grouped together and included in a training dataset.

Figure 12:
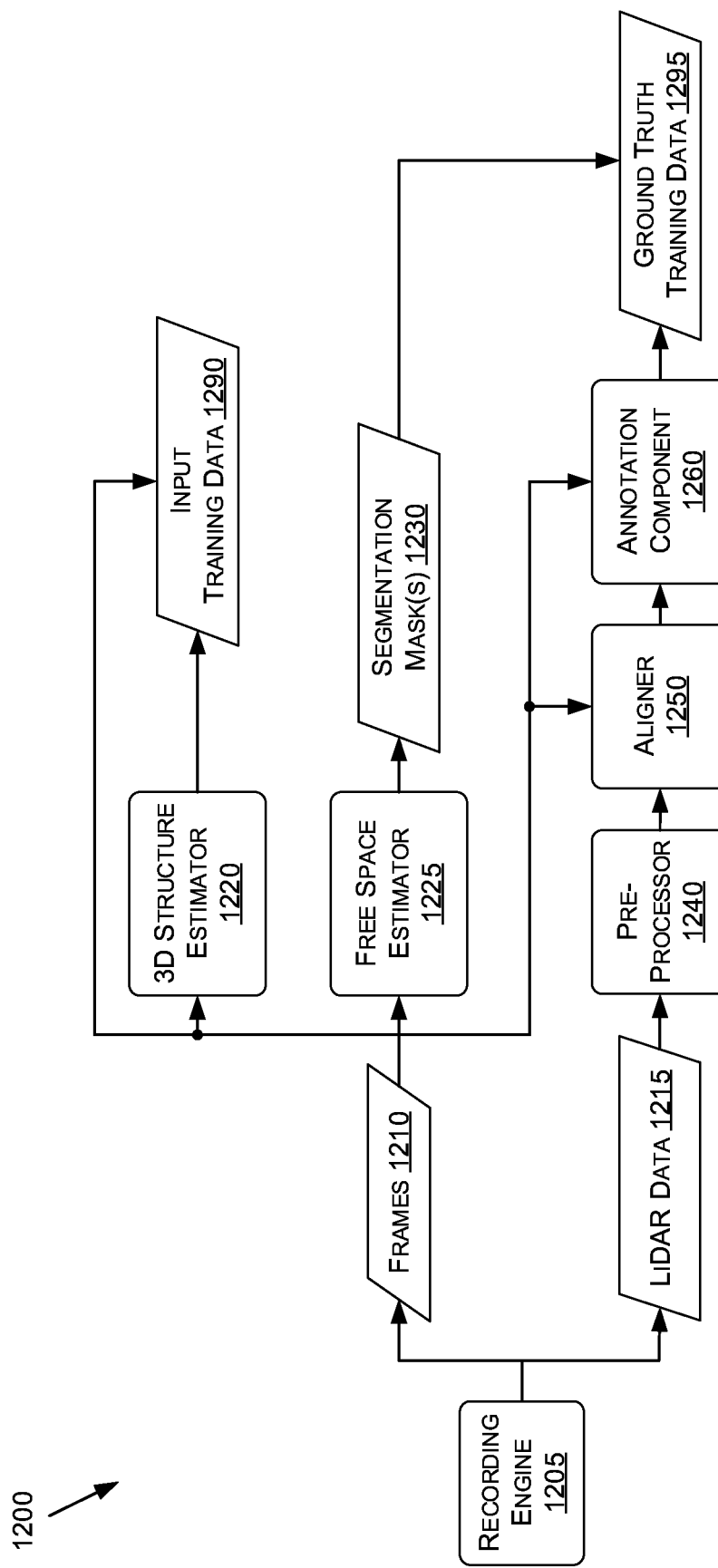
FIG. 12 is a data flow diagram illustrating an example ground truth generation pipeline using collected real-world data, in accordance with some embodiments of the present disclosure.

FIG. 12 is a data flow diagram illustrating an example ground truth generation pipeline 120 using collected real-world data, in accordance with some embodiments of the present disclosure. The example ground truth generation pipeline 1200 includes a recording engine 1205, a 3D structure estimator 1220, a free space estimator 1225, a pre-processor 1240, an aligner 1250, and an annotation component 1260.

In some embodiments, one or more data collection vehicles (e.g., vehicle 1700 of FIGS. 17A-D) may be equipped with one or more camera(s) and LiDAR sensor(s), and a recording engine 1205 associated with each data collection vehicle may record sensor data while the vehicle travels through real-world (e.g., physical) environments. Generally, a data capture vehicle may be equipped with any number and type of sensor (including, but not limited to, the sensors illustrated in FIGS. 17A-17C). For example, a number of camera(s) (e.g., stereo camera(s) 1768, wide-view cameras) 1770 (e.g., fisheye cameras), infrared camera(s) 1772, surround camera(s) 1774 (e.g., 360 degree cameras), and/or long-range and/or mid-range camera(s) 1798), LIDAR sensors 1764, and/or other sensor types may be positioned on the vehicle such that there is overlap between fields of view of the cameras and fields of view—or sensory fields—of the sensors. The spatial layout of the sensors may be calibrated, in some embodiments, through self-calibration algorithms, and the synchronization of the sensors may be controlled to exhibit time alignment of sensor captures. As such, the recording engine 1205 may capture frame(s) 1210 of image data from one or more cameras and/or LiDAR data 1215 from one or more LiDAR sensors.

Figure 13B:
FIG. 13B is an illustration of LiDAR data accumulated from multiple LiDAR scans, in accordance with some embodiments of the present disclosure.
Figure 13A:
FIG. 13A is an illustration of LiDAR data from an example LiDAR scan.

In some embodiments, the LiDAR data 1215 may be used to generate ground truth training data. In the example illustrated in FIG. 12, the pre-processor 1240 performs one or more processing operations on the LiDAR data 1215 prior to labeling. For example, in some embodiments, the pre-processor 1240 may perform temporal smoothing, which may include a state estimator such as a Kalman filter. The temporal smoothing may be applied in 3D world space relative to the data capture vehicle, in 3D world space relative to some fixed origin in world space, or in a birds-eye view in 2D world space. In some embodiments, the pre-processor 1240 may perform outlier removal on the LiDAR data 1215 (e.g., similar to the technique described herein with respect to outlier remover 220 of FIG. 2). In some cases, the resulting LiDAR may still be sparse. As such, in some embodiments, the pre-processor 1240 may interpolate missing values using a triangulation algorithm (e.g., as described herein with respect to the post-processor 1070 of FIG. 10). Additionally or alternatively, the pre-processor 1240 may accumulate LiDAR data from multiple LiDAR sensors to densify the resulting LiDAR data, By way of illustration, FIG. 13A shows an example of LiDAR data collected from a single LiDAR scan, and FIG. 13B shows an example of LiDAR data accumulated from multiple LiDAR scans (e.g., from multiple LiDAR sensors). These are just a few examples, and other types of pre-processing operations may additionally or alternatively be performed.

In some embodiments, the aligner 1250 may temporally align the LiDAR data with corresponding frame(s) 1210 of image data. Generally, sensor data may be obtained from different sensors at different frequencies for various reasons, such as differences in delay lines, differences in sampling frequencies (e.g., cameras running at 30 fps vs. LiDAR running at 10 fps), different trigger times, and other reasons. In order to facilitate grouping and/or presenting sensor data of similar world states (e.g., sensor data captured at substantially the same time), temporal alignment may be performed to synchronize the sensor data from the different sensors. For example, a particular sensor may be used as a reference sensor, and other sensors may be referred to as child sensors. For a given frame of sensor data from the reference sensor (a reference frame), an offset such as a time delta may be identified between the reference frame and the temporally closest frame of sensor data from each child sensor. The offset for each child sensor may be recorded and/or applied to the capture times or some other index for the sensor data from the child sensor. Thus, determining and/or applying per-sensor offsets may serve to temporally align the different types of sensor data (e.g., by aligning their indices). Example techniques for aligning sensor data from different types of sensors are described in U.S. Non-Provisional patent application Ser. No. 17/187,350, filed on Apr. 26, 2021 and entitled "Ground Truth Data Generation for Deep Neural Network Perception in Autonomous Driving Applications," the contents of which are herein incorporated by reference in their entirety.

Additionally or alternatively, aligner 1250 may spatially align the LiDAR data with corresponding frame(s) 1210 of image data to match different types of sensor data that represent the same object or other portion of the environment. For example, LIDAR data points may be correlated with pixels in the image space using relative orientation, location, fields-of-view, and the like between the LiDAR sensor that captured the LiDAR data point and the camera that generated the image data. Techniques for correlating sensor data from different sensors are described in U.S. Non-Provisional patent application Ser. No. 16/514,404, filed on Jul. 17, 2019 and entitled "Temporal Information Prediction in Autonomous Machine Applications," the contents of which are herein incorporated by reference in their entirety.

In some embodiments, the LiDAR data may be annotated to identify points on a 3D surface of interest (e.g., a 3D road surface). Generally, annotations may be synthetically produced (e.g., generated from computer models or renderings), real produced (e.g., designed and produced from real-world data), machine-automated (e.g., using feature analysis and learning to extract features from data and then generate labels), human annotated (e.g., a labeler, or annotation expert, inputting the annotations), and/or a combination thereof (e.g., a human identifies vertices of polylines, a machine generates polygons using polygon rasterizer).

In some embodiments, the annotation component 1260 may include a software tool (also called a labeling tool) such as a web tool. A sequence of annotation scenes (e.g., sets of aligned LiDAR data and image data captured at approximately the time) may be generated, a corresponding labeling task(s) may be encoded into the labeling tool, and annotations may be generated using the software tool. In some embodiments, the labeling tool may present the aligned LiDAR data and image data in an annotation scene to a human labeler (e.g., side-by-side), and/or information may be projected across the different types of sensor data to provide useful contextual information, such as correspondences among the different types of sensor data. The labeling tool may accept inputs specifying ground truth annotations identifying points on a surface of interest (e.g., 3D points, boundaries, enclosed regions, class labels), and the labeling tool may associate the annotations with the sensor data. An example labeling tool is described in U.S. Non-Provisional patent application Ser. No. 17/187,350, filed on Apr. 26, 2021 and entitled "Ground Truth Data Generation for Deep Neural Network Perception in Autonomous Driving Applications." As such, the annotation component 1260 may accept inputs identifying points on a surface of interest (e.g., a 3D point cloud, a projection image), and generate a representation of the identified points matching the view, size, and dimensionality of the output(s) of the deep learning model(s) to be trained may be designated as ground truth training data 1295.

In some embodiments, ground truth segmentation mask(s) ray be generated from the frame(s) 1210 of image data. For example, a free space estimator 1225 may perform free space estimation and/or image segmentation on the captured image(s) to classify, segment, and/or predict regions (e.g., pixels) of the image data that are part of a desired class (e.g., a road surface). For example, one or more machine learning models (e.g., a convolutional neural network) may be trained to predict one or more segmentation mask(s) 1230 and/or confidence maps representing pixels that belong to a drivable road surface or other navigable space, other environmental parts (e.g., sidewalks, buildings), animate objects, and/or other classes. As such, the segmentation mask(s) 1230 or other representation of a detected surface may be designated as ground truth training data 1295.

To generate corresponding input training data, for any given frame(s) 1210 of image data, the 3D structure estimator 1220 may estimate a 3D surface structure of a surface of interest (e.g., a road surface) from the frame(s) 1210 (e.g., as described above with respect to the 3D structure estimator 105 of FIG. 1 and/or the 3D structure estimator 1050 of FIG. 10). In some embodiments, the 3D structure estimator 1220 may use the segmentation mask(s) 1230 to select points from an estimated 3D structure that belong to a class represented by the segmentation mask (e.g., points that belong to a surface of interest, such as a 3D road surface). In some embodiments, the resulting points may be projected to form a projection image (e.g., a 2D height map). The result may be a sparse representation of the 3D structure of the surface of interest (e.g., a sparse point cloud, a sparse projection image). The sparse representation of 3D structure and/or the frame(s) 1210 of image data may be designated as input training data 1290.

As such, the input training data 1290 may be paired with corresponding ground truth training data 1295 (e.g., a dense projection image or other representation of the 3D points on the surface of interest and/or the segmentation masks) 1230) and included in a training dataset.

Training. In some embodiments, a training dataset for a deep learning model(s) for a 3D surface reconstruction system (e.g., the deep learning model(s) 535 of FIG. 5 or 6) may be generated, compiled, and/or selected based on the inputs and outputs of the deep learning model(s) to be trained. For example, certain implementations may call for input training comprising sparse representations of 3D surface structure (e.g., sparse height maps) and/or image data from some other perspective (e.g., images of a perspective view), and ground truth training data comprising dense representations of 3D surface structure dense height maps) and/or segmentation masks (e.g., identifying a desired surface such as a road or other drivable space). As such, a training dataset having input and ground truth training data matching the view, size, and dimensionality of the input(s) and output(s) of a desired deep learning model(s) may be obtained using techniques described herein, and the deep learning model(s) may be trained using the selected training dataset. In embodiments where the deep learning model(s) includes one or more recurrent layers (e.g., Gated Recurrent Units, Long Short Term Memory), the input training data may include multiple frames e.g., from consecutive time slices) as a single sample.

Generally, any suitable loss function may be used to update the deep learning model(s) during training. For example, one or more loss functions may be used (e.g., a regression loss function such as L1 or L2 loss may be used for regression tasks) to compare the accuracy of the output(s) of the deep learning model(s) to ground truth, and the parameters of the deep learning models) may be updated (e.g., using backward passes, backpropagation, forward passes, etc.) until the accuracy reaches an optimal or acceptable level. In some embodiments in which the deep learning models) includes multiple heads, the multiple heads may be co-trained together on the same dataset, with a common trunk. In this manner, the different heads (tasks) may help each other to learn.

In an example embodiment where the deep learning model(s) includes a regression head that predicts a height map, the deep learning models) may learn to predict heights maps using ground truth height maps and ground truth segmentation masks. For example, a regression loss function such as L1 or L2 loss may be used to compare a predicted height map with a ground truth height map, and the result may be multiplied by a ground truth segmentation mask indicating the surface to be densified, effectively canceling out updates to the deep learning model(s) based on predictions that occur outside the region to be densified.

In another embodiment where the deep learning models) includes a regression head that predicts a height map and a confidence head that predicts a confidence map corresponding to the height map, the deep learning model(s) may learn to predict both height and confidence maps from ground truth height maps. For example, a loss function that compares predicted and ground truth height, and compensates based on a predicted confidence value, may be used. An example of such a loss function may be given by:

$$L = \frac{\|y' - y\|^2}{2*c^2} + \frac{1}{2}*\log c^2 \qquad \text{Eq. (6)}$$

where p is a predicted height, y' is a corresponding ground truth height, and c is a predicted confidence value corresponding to the predicted height. In this example, if the predicted height is substantially wrong (and $\|y'-y\|$ is therefore large), minimizing this loss function encourages a large value of c. As such, in this example, a large value of c may indicate a low confidence. The log term in the example loss given by equation 6 prevents c from becoming infinitely large. As such, a loss function such as this may be used to train a deep learning model(s) to predict both a height map and a confidence map, without the need for a ground truth confidence map. As such, the deep learning model(s) may be trained to perform densification by learning a mapping between sparse and dense representations of 3D structure.

Figure 14:
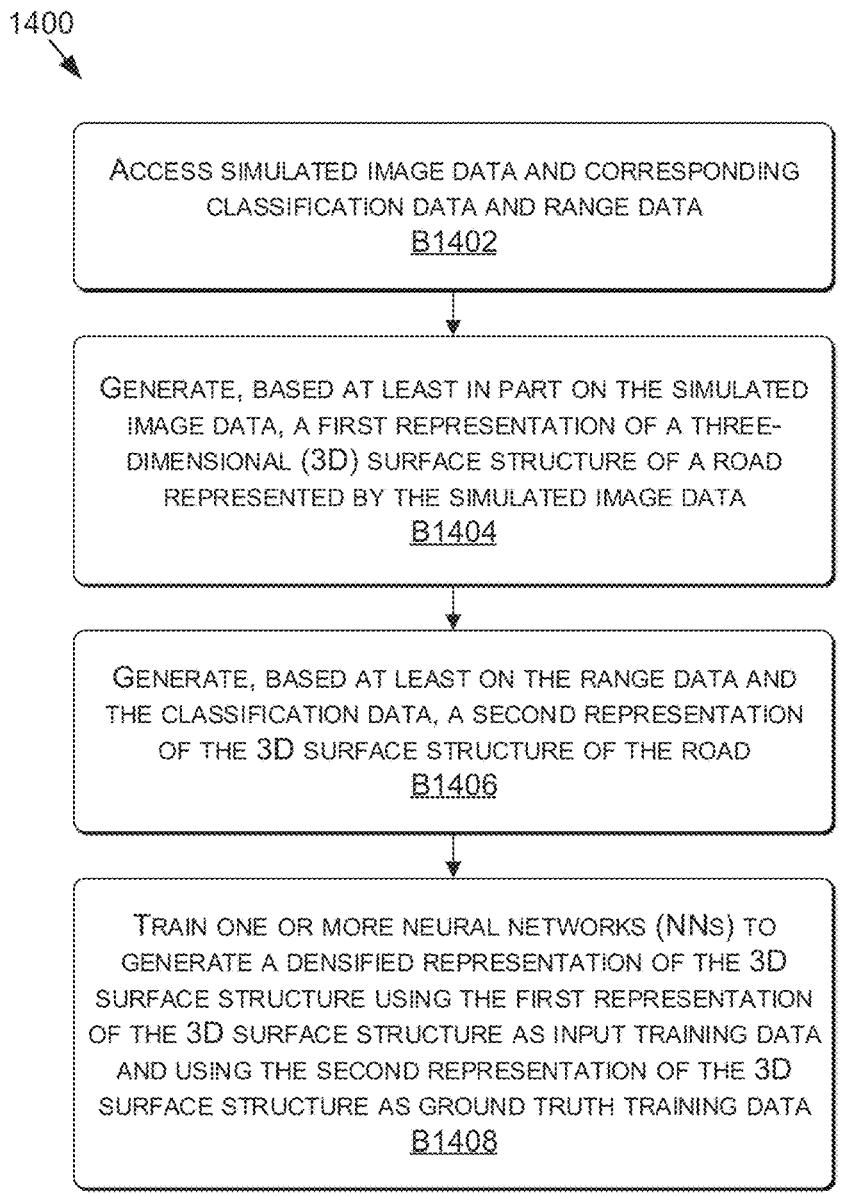
FIG. 14 is a flow diagram showing a method for training one or more neural networks (NNs) to generate a densified representation of the 3D surface structure using simulated image data, in accordance with some embodiments of the present disclosure.
Figure 15:
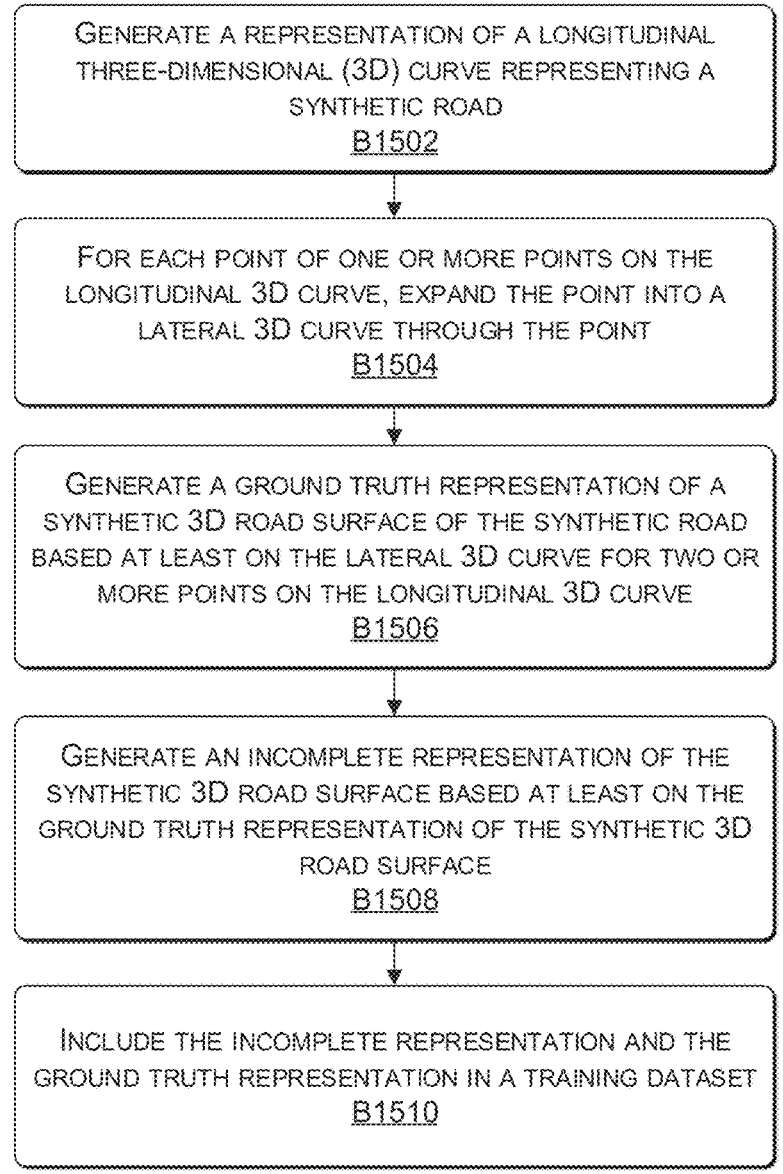
FIG. 15 is a flow diagram showing a method for generating incomplete and ground truth representations of a synthetic 3D road surface for a training dataset, in accordance with some embodiments of the present disclosure.
Figure 16:
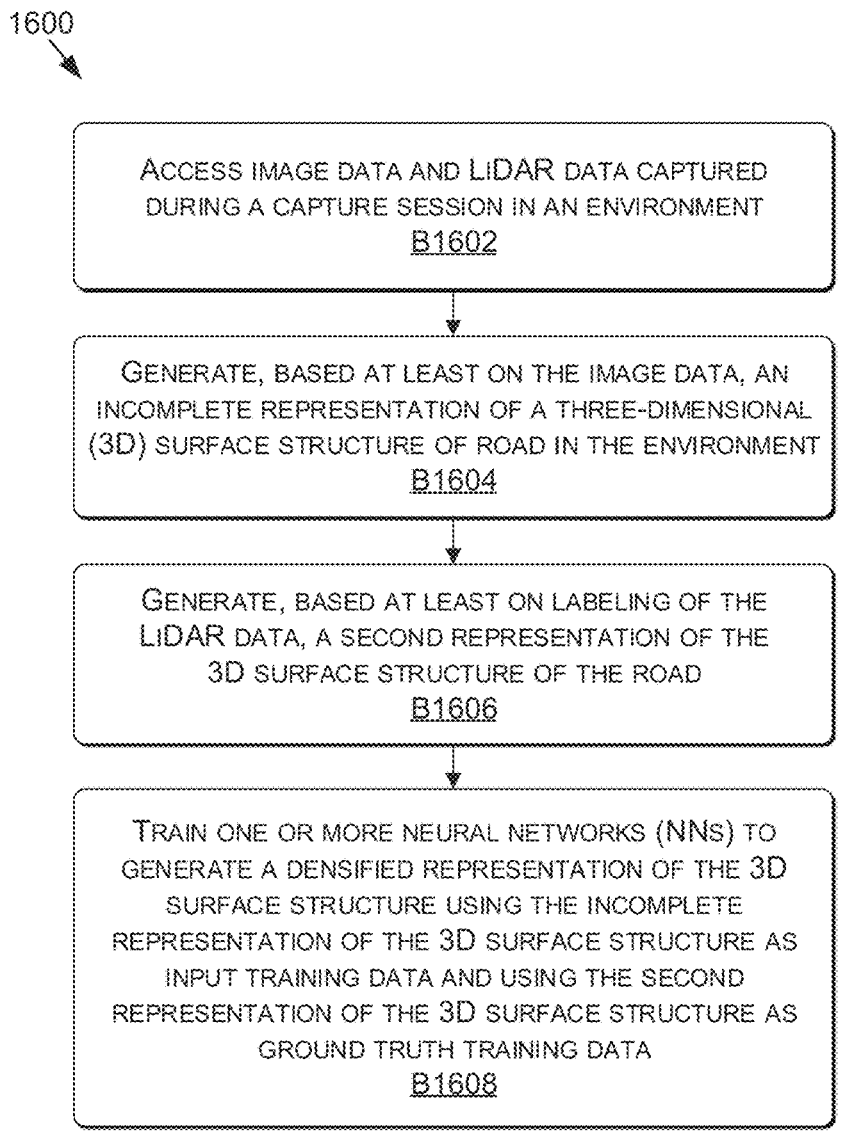
FIG. 16 is a flow diagram showing a method for training one or more neural networks (NNs) to generate a densified representation of the 3D surface structure using image data and LiDAR data captured during a capture session, in accordance with some embodiments of the present disclosure.

Now referring to FIGS. 14-16, each block of methods 1400-1600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, although the methods 1400-1600 may be described, by way of example, with respect to an example system, these methods may additionally or alternatively be executed by any one system, or any combination of systems, including, but not limited to, those described herein.

FIG. 14 is a flow diagram showing a method 1400 for training one or more neural networks (NNs) to generate a densified representation of the 3D surface structure using simulated image data, in accordance with some embodiments of the present disclosure. The method 1400, at block B1402, includes accessing simulated image data and corresponding classification data and range data. For example, the simulator component 1010 of FIG. 10 may run a simulation to simulate a virtual world or environment (e.g., a simulated environment), and a virtual vehicle or other object may be simulated within the simulated environment. The virtual vehicle or object may include any number of sensors (e.g., virtual or simulated sensors), and virtual sensor data may be simulated for the sensors. As such, frames of virtual sensor data (e.g., virtual image data corresponding to a field(s) of view of virtual camera(s) of a virtual vehicle), and corresponding segmentation masks and depth maps, may be generated based on the simulated environment.

The method 1400, at block B1404, includes generating, based at least in part on the simulated image data, a first representation of a three-dimensional (3D) surface structure of a road represented by the simulated image data. For example, the 3D structure estimator 1050 of FIG. 10 may generate a sparse representation (e.g., a sparse point cloud, a projection image) of a 3D surface structure of a road depicted in a rendered image (e.g., the frame(s) 1020) by performing 3D structure estimation on the rendered image.

The method 1400, at block B1406, includes generating, based at least on the range data and the classification data, a second representation of the 3D surface structure of the road. For example, the 3D point cloud generator 1060 of FIG. 10 may unproject range values from the depth map(s) 1040 into 3D world coordinates using the known position and orientation of the virtual camera relative to which the range values of the depth map(s) 1040 were generated, the 3D point cloud generator 1060 may use the segmentation mask(s) 1030 to filter out 3D points on the surface of interest (e.g., a road surface), and the post-processor 1070 may be used to fill in missing values.

The method 1400, at block B1408, includes training one or more neural networks (NNs) to generate a densified representation of the 3D surface structure using the first representation of the 3D surface structure as input training data and using the second representation of the 3D surface structure as ground truth training data.

FIG. 15 is a flow diagram showing a method 1500 for generating incomplete and ground truth representations of a synthetic 3D road surface for a training dataset, in accordance with some embodiments of the present disclosure. The method 1500, at block B1502, includes generating a representation of a longitudinal three-dimensional (3D) curve representing a synthetic road. For example, with respect to FIG. 11, a representation of longitudinal curve 1 may be generated with longitudinal values representing a desired perception range for a deep learning model surface estimator, lateral values computed as a second order polynomial of the longitudinal values, and height values computed as a linear combination of Fourier bases.

The method 1500, at block B1504, includes, for each point of one or more points on the longitudinal 3D curve, expanding the point into a lateral 3D curve through the point. For example, with respect to FIG. 11, any given point (e.g., each point) on the longitudinal 3D curve 1 may be expanded into a corresponding lateral 3D curve, represented by curves $q_j$. In some embodiments, a parameter $\alpha$ may be defined to denote the angle between a synthetic 3D surface (e.g., the synthetic 3D road surface) and the surface z=0 (e.g., the ground plane), and different values of $\alpha$ may be sampled to simulate different lateral surface slopes at different points on the longitudinal 3D curve and/or for different synthetic 3D curves. As such, any given point (e.g., each point) on the longitudinal 3D curve 1, the point may be expanded into a lateral 3D curve $q_j$ that passes through $p_j$, perpendicular to the curve 1 at $p_j$, and having angle $\alpha$ relative to surface z=0.

The method 1500, at block B1506, includes generating a ground truth representation of a synthetic 3D road surface of the synthetic road based at least on the lateral 3D curve for two or more points on the longitudinal 3D curve. For example, with respect to FIG. 11, any given lateral 3D curve $q_j$ may be sampled in times to expand a corresponding 3D point on the longitudinal 3D curve 1 into a set of 3D points to simulate different road widths at different points on the longitudinal 3D curve. The process may be repeated for any given point (e.g., each point) of the longitudinal 3D curve 1 to generate a dense 3D point cloud, which may be projected to form a ground truth projection image (e.g., a ground truth 2D height map).

The method 1500, at block B1508, includes generating an incomplete representation of the synthetic 3D road surface based at least on the ground truth representation of the synthetic 3D road surface. For example, a pattern represented by N binary maps of size H×W may be generated by performing 3D estimation on real-world data and encoding a representation of which pixels are observed and unobserved upon performing 3D estimation from captured images. As such, one of the N binary maps may be randomly sampled and applied to the ground truth representation of the synthetic 3D road surface (e.g., using element-wise multiplication to generate a corresponding incomplete representation of the synthetic 3D road surface.

At block B1510, the incomplete representation and the ground truth representation are included in a training dataset.

FIG. 16 is a flow diagram showing a method 1600 for training one or more neural networks (NNs) to generate a densified representation of the 3D surface structure using image data and LiDAR data captured during a capture session, in accordance with some embodiments of the present disclosure. The method 1600, at block B1602, includes accessing image data and LiDAR data captured during a capture session in an environment. For example, a data collection vehicle may be equipped with one or more cameras) and LiDAR sensor(s), and the recording engine 1205 of FIG. 12 may record sensor data while the vehicle travels through real-world (e.g., physical) environments.

The method 1600, at block B1604, includes generating, based at least on the image data, an incomplete representation of a three-dimensional (3D) surface structure of road in the environment. For example, for any given frame(s) 1210 of image data, the 3D structure estimator 1220 of FIG. 12 may estimate a 3D surface structure of a road from the frame(s) 1210 (e.g., as described above with respect to the 3D structure estimator 105 of FIG. 1 and/or the 3D structure estimator 1050 of FIG. 10). In some embodiments, the 3D structure estimator 1220 may use the segmentation mask(s) 1230 to select points from an estimated 3D structure that belong to a class represented by the segmentation mask (e.g., points that belong to a 3D road surface). In some embodiments, the resulting points may be projected to form a projection image (e.g., a 2D height map).

The method 1600, at block 1606, includes generating, based at least on labeling of the LiDAR data, a second representation of the 3D surface structure of the road. For example, with respect to FIG. 12, the pre-processor 1240 may perform one or more processing operations on the LiDAR data 1215 prior to labeling, such as temporal smoothing, outlier removal, triangulation, and/or accumulation from multiple LiDAR sensors. In some embodiments, the aligner 1250 may temporally and/or spatially align the LiDAR data with corresponding frame(s) 1210 of image data. In an example embodiment, the annotation component 1260 may present aligned LiDAR data and image data in an annotation scene to a human labeler, accept inputs specifying ground truth annotations identifying points on a surface of interest, and generate a representation of the identified points matching the view, size, and dimensionality of the output(s) of the deep learning model(s) to be trained.

The method 1600, at block B1608, includes training one or more neural networks (NNs) to generate a densified representation of the 3D surface structure using the incomplete representation of the 3D surface structure as input training data and using the second representation of the 3D surface structure as ground truth training data.

Example Autonomous Vehicle

FIG. 17A is an illustration of an example autonomous vehicle 1700, in accordance with some embodiments of the present disclosure. The autonomous vehicle 1700 (alternatively referred to herein as the "vehicle 1700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1700 may be capable of functionality in accordance with one or more of Level 3-Level 5 of the autonomous driving levels. For example, the vehicle 1700 may be capable of conditional automation (Level 3), high automation (Level 4), and/or full automation (Level 5), depending on the embodiment.

The vehicle 1700 may include components such as a chassis, a vehicle body, wheels (e.g., 2, 4, 6, 8, 18, etc.), tires, axles, and other components of a vehicle. The vehicle 1700 may, include a propulsion system 1750, such as an internal combustion engine, hybrid electric power plant, an all-electric engine, and/or another propulsion system type. The propulsion system 1750 may be connected to a drive train of the vehicle 1700, which may include a transmission, to enable the propulsion of the vehicle 1700. The propulsion system 1750 may be controlled in response to receiving signals from the throttle/accelerator 1752.

A steering system 1754, which may include a steering wheel, may be used to steer the vehicle 1700 (e.g., along a desired path or route) when the propulsion system 1750 is operating (e.g., when the vehicle is in motion). The steering system 1754 may receive signals from a steering actuator 1756. The steering wheel may be optional for full automation (Level 5) functionality.

The brake sensor system 1746 may be used to operate the vehicle brakes in response to receiving signals from the brake actuators 1748 and/or brake sensors.

Controller(s) 1736, which may include one or more system on chips (SoCs) 1704 (FIG. 17C) and/or GPU(s), may provide signals (e.g., representative of commands) to one or more components and/or systems of the vehicle 1700. For example, the controllers) may send signals to operate the vehicle brakes via one or more brake actuators 1748, to operate the steering system 1754 via one or more steering actuators 1756, to operate the propulsion system 1750 via one or more throttle/accelerators 1752. The controller(s) 1736 may include one or more onboard (e.g., integrated) computing devices (e.g., supercomputers) that process sensor signals, and output operation commands (e.g., signals representing commands) to enable autonomous driving and/or to assist a human driver in driving the vehicle 1700. The controller(s) 1736 may include a first controller 1736 for autonomous driving functions, a second controller 1736 for functional safety, functions, a third controller 1736 for artificial intelligence functionality (e.g., computer vision), a fourth controller 1736 for infotainment functionality, a fifth controller 1736 for redundancy in emergency conditions, and/or other controllers. In some examples, a single controller 1736 may handle two or more of the above functionalities, two or more controllers 1736 may handle a single functionality, and/or any combination thereof.

The controller(s) 1736 may provide the signals for controlling one or more components and/or systems of the vehicle 1700 in response to sensor data received from one or more sensors (e.g., sensor inputs). The sensor data may be received from, for example and without limitation, global navigation satellite systems sensor(s) 1758 (e.g., Global Positioning System sensor(s)), RADAR sensor(s) 1760, ultrasonic sensor(s) 1762, LIDAR sensor(s) 1764, inertial measurement unit (MU) sensor(s) 1766 (e.g., accelerometer(s), gyroscope(s), magnetic compass(es), magnetometer(s), etc.), microphone(s) 1796, stereo camera(s) 1768, wide-view cameras) 1770 (e.g., fisheye cameras), infrared camera(s) 1772, surround camera(s) 1774 (e.g., 360 degree cameras), long-range and/or mid-range camera(s) 1798, speed sensor(s) 1744 (e.g., for measuring the speed of the vehicle 1700), vibration sensor(s) 1742, steering sensor(s) 1740, brake sensor(s) (e.g., as part of the brake sensor system 1746), and/or other sensor types.

One or more of the controller(s) 1736 may receive inputs (e.g., represented by input data) from an instrument cluster 1732 of the vehicle 1700 and provide outputs (e.g., represented by output data, display data, etc.) via a human-machine interface (HMI) display 1734, an audible annunciator, a loudspeaker, and/or via other components of the vehicle 1700. The outputs may include information such as vehicle velocity, speed, time, map data (e.g., the HD map 1722 of FIG. 17C), location data (e.g., the vehicle's 1700 location, such as on a map), direction, location of other vehicles (e.g., an occupancy grid), information about objects and status of objects as perceived by the controller(s) 1736, etc. For example, the HMI display 1734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1700 further includes a network interface 1724 which may use one or more wireless antenna(s) 1726 and/or modem(s) to communicate over one or more networks. For example, the network interface 1724 may be capable of communication over LTE, WCDMA, UMTS, GSM, CDMA2000, etc. The wireless antenna(s) 1726 may also enable communication between objects in the environment (e.g., vehicles, mobile devices, etc.), using local area network(s), such as Bluetooth, Bluetooth LE, Z-Wave, Zig-Bee, etc., and/or low power wide-area network(s) (LP-WANs), such as LoRaWAN, SigFox, etc.

FIG. 17B is an example of camera locations and fields of view for the example autonomous vehicle 1700 of FIG. 17A, in accordance with some embodiments of the present disclosure. The cameras and respective fields of view are one example embodiment and are not intended to be limiting. For example, additional and/or alternative cameras may be included and/or the cameras may be located at different locations on the vehicle 1700.

The camera types for the cameras may include, but are not limited to, digital cameras that may be adapted for use with the components and/or systems of the vehicle 1700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green (RBGC) color filter array, a Foveon X3 color filter array, a Bayer sensors (RG-GB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1700 (e.g., front-facing cameras) may be used for surround view, to help identify forward facing paths and obstacles, as well aid in, with the help of one or more controllers 1736 and/or control SoCs, providing information critical to generating an occupancy grid and/or determining the preferred vehicle paths. Front-facing cameras may be used to perform many of the same ADA functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1770 that may be used to perceive objects coming into view from the periphery (e.g., pedestrians, crossing traffic or bicycles). Although only one wide-view camera is illustrated in FIG. 17B, there may any number of wide-view cameras 1770 on the vehicle 1700. In addition, long-range camera(s) 1798 (e.g., a long-view stereo camera pair) may be used for depth-based object detection, especially for objects for which a neural network has not yet been trained. The long-range camera(s) 1798 may also be used for object detection and classification, as well as basic object tracking.

One or more stereo cameras 1768 may also be included in a front-facing configuration. The stereo camera(s) 1768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1768 may be used in addition to, or alternatively from, those described herein.

Cameras with a field of view that include portions of the environment to the side of the vehicle 1700 (e.g., side-view cameras) may be used for surround view, providing information used to create and update the occupancy grid, as well as to generate side impact collision warnings. For example, surround camera(s) 1774 (e.g., four surround cameras 1774 as illustrated in FIG. 17B) may be positioned to on the vehicle 1700. The surround camera(s) 1774 may include wide-view camera(s) 1770, fisheye camera(s), 360 degree camera(s), and/or the like. Four example, four fisheye cameras may be positioned on the vehicle's front, rear, and sides. In an alternative arrangement, the vehicle may use three surround camera(s) 1774 (e.g., left, right, and rear), and may leverage one or more other camera(s) (e.g., a forward-facing camera) as a fourth surround view camera.

Cameras with a field of view that include portions of the environment to the rear of the vehicle 1700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1798, stereo camera(s) 1768), infrared camera(s) 1772, etc.), as described herein.

FIG. 17C is a block diagram of an example system architecture for the example autonomous vehicle 1700 of FIG. 17A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1700 in FIG. 17C are illustrated as being connected via bus 1702. The bus 1702 may include a Controller Area Network (CAN) data interface (alternatively referred to herein as a "CAN bus"). A CAN may be a network inside the vehicle 1700 used to aid in control of various features and functionality of the vehicle 1700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1702 is described herein as being a CAN bus, this is not intended to be limiting. For example, in addition to, or alternatively from, the CAN bus, FlexRay and/or Ethernet may be used. Additionally, although a single line is used to represent the bus 1702, this is not intended to be limiting. For example, there may be any number of busses 1702, which may include one or more CAN busses, one or more FlexRay busses, one or more Ethernet busses, and/or one or more other types of busses using a different protocol. In some examples, two or more busses 1702 may be used to perform different functions, and/or may be used for redundancy. For example, a first bus 1702 may be used for collision avoidance functionality and a second bus 1702 may be used for actuation control. In any example, each bus 1702 may communicate with any of the components of the vehicle 1700, and two or more busses 1702 may communicate with the same components. In some examples, each SoC 1704, each controller 1736, and/or each computer within the vehicle may have access to the same input data (e.g., inputs from sensors of the vehicle 1700), and may be connected to a common bus, such the CAN bus.

The vehicle 1700 may include one or more controller(s) 1736, such as those described herein with respect to FIG. 17A. The controller(s) 1736 may be used for a variety of functions. The controller(s) 1736 may be coupled to any of the various other components and systems of the vehicle 1700, and may be used for control of the vehicle 1700, artificial intelligence of the vehicle 1700, infotainment for the vehicle 1700, and/or the like.

The vehicle 1700 may include a system(s) on a chip (SoC) 1704. The SoC 1704 may include CPU(s) 1706, GPU(s) 1708, processor(s) 1710, cache(s) 1712, accelerator(s) 1714, data store(s) 1716, and/or other components and features not illustrated. The SoC(s) 1704 may be used to control the vehicle 1700 in a variety of platforms and systems. For example, the SoC(s) 1704 may be combined in a system (e.g., the system of the vehicle 1700) with an HD map 1722 which may obtain map refreshes and/or updates via a network interface 1724 from one or more servers (e.g., server(s) 1778 of FIG. 17D).

The CPU(s) 1706 may include a CPU cluster or CPU complex (alternatively referred to herein as a "CCPLEX"). The CPU(s) 1706 may include multiple cores and/or L2 caches. For example, in some embodiments, the CPU(s) 1706 may include eight cores in a coherent multi-processor configuration. In some embodiments, the CPU(s) 1706 may include four dual-core clusters where each cluster has a dedicated L2 cache (e.g., a 2 MB L2 cache). The CPU(s) 1706 (e.g., the CCPLEX) may be configured to support simultaneous cluster operation enabling any combination of the clusters of the CPU(s) 1706 to be active at any given time.

The CPU(s) 1706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1706 may further implement an enhanced algorithm for managing power states, when allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1708 may include an integrated GPU (alternatively referred to herein as an "iGPU"). The GPU(s) 1708 may be programmable and may be efficient for parallel workloads. The GPU(s) 1708, in some examples, may use an enhanced tensor instruction set. The GPU(s) 1708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1708 may include at least eight streaming microprocessors. The GPU(s) 1708 may use compute application programming interface(s) (API(s)). In addition, the GPU(s) 1708 may use one or more parallel computing platforms and/or programming models (e.g., NVIDIA's CUDA).

The GPU(s) 1708 may be power-optimized for best performance in automotive and embedded use cases. For example, the GPU(s) 1708 may be fabricated on a Fin field-effect transistor (FinFET). However, this is not intended to be limiting and the GPU(s) 1708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1708 to access the CPU(s) 1706 page tables directly. In such examples, when the GPU(s) 1708 memory management unit (MMU) experiences a miss, an address translation request may be transmitted to the CPU(s) 1706. In response, the CPU(s) 1706 may look in its page tables for the virtual-to-physical mapping for the address and transmits the translation back to the CPU(s) 1708. As such, unified memory technology may allow a single unified virtual address space for memory of both the CPU(s) 1706 and the GPU(s) 1708, thereby simplifying the GPU(s) 1708 programming and porting of applications to the GPU(s) 1708.

In addition, the GPU(s) 1708 may include an access counter that may keep track of the frequency of access of the GPU(s) 1708 to memory of other processors. The access counter may help ensure that memory pages are moved to the physical memory of the processor that is accessing the pages most frequently.

The SoC(s) 1704 may include any number of cache(s) 1712, including those described herein. For example, the cache(s) 1712 may include an L3 cache that is available to both the CPU(s) 1706 and the GPU(s) 1708 (e.g., that is connected both the CPU(s) 1706 and the GPU(s) 1708). The cache(s) 1712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1704 may include an arithmetic logic unit(s) (ALU(s)) which may be leveraged in performing processing with respect to any of the variety of tasks or operations of the vehicle 1700—such as processing DNNs. In addition, the SoC(s) 1704 may include a floating point unit(s) (FPU(s)) or other math coprocessor or numeric coprocessor types for performing mathematical operations within the system. For example, the SoC(s) 104 may include one or more FPUs integrated as execution units within a CPU(s) 1706 and/or GPU(s) 1708.

The SoC(s) 1704 may include one or more accelerators 1714 (e.g., hardware accelerators, software accelerators, or a combination thereof). For example, the SoC(s) 1704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1708 and to off-load some of the tasks of the GPU(s) 1708 (e.g., to free up more cycles of the GPU(s) 1708 for performing other tasks). As an example, the accelerator(s) 1714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DIA(s) may provide more performance per millimeter than a general-purpose GPU, and vastly exceeds the performance of a CPU. The TPU(s) may perform several functions, including a single-instance convolution function, supporting, for example, INT8, INT16, and FR16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1708, and by using an inference accelerator, for example, a designer may target either the DLA(s) or the GPU(s) 1708 for any function. For example, the designer may focus processing of CNNs and floating point operations on the DLA(s) and leave other functions to the GPU(s) 1708 and/or other accelerator(s) 1714.

The accelerator(s) 1714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous (hiving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1714 (e.g., the hardware acceleration cluster) may include a computer vision network on-chip and SRAM, for providing a high-bandwidth, low latency SRAM for the accelerator(s) 1714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1766 output that correlates with the vehicle 1700 orientation, distance, 3D location estimates of the object obtained from the neural network and/or other sensors (e.g., LIDAR sensor(s) 1764 or RADAR sensor(s) 1760), among others.

The SoC(s) 1704 may include data store(s) 1716 (e.g., memory). The data stores(s) 1716 may be on-chip memory of the SoC(s) 1704, which may store neural networks to be executed on the GPU and/or the In some examples, the data store(s) 1716 may be large enough in capacity to store multiple instances of neural networks for redundancy and safety. The data store(s) 1712 may comprise L2 or L3 cache(s) 1712. Reference to the data store(s) 1716 may include reference to the memory associated with the PVA, DLA, and/or other accelerator(s) 1714, as described herein.

The SoC(s) 1704 may include one or more processor(s) 1710 (e.g., embedded processors). The processor(s) 1710 may include a boot and power management processor that may be a dedicated processor and subsystem to handle boot power and management functions and related security enforcement. The boot and power management processor may be a part of the SoC(s) 1704 boot sequence and may provide runtime power management services. The boot power and management processor may provide clock and voltage programming, assistance in system low power state transitions, management of SoC(s) 1704 thermals and temperature sensors, and/or management of the SoC(s) 1704 power states. Each temperature sensor may be implemented as a ring-oscillator whose output frequency is proportional to temperature, and the SoC(s) 1704 may use the ring-oscillators to detect temperatures of the CPU(s) 1706, GPU(s) 1708, and/or accelerators) 1714. If temperatures are determined to exceed a threshold, the boot and power management processor may enter a temperature fault routine and put the SoC(s) 1704 into a lower power state and/or put the vehicle 1700 into a chauffeur o safe stop mode (e.g., bring the vehicle 1700 to a safe stop).

The processor(s) 1710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processors(s) 1710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1710 may further include a real-time camera engine that may include a dedicated processor subsystem for handling real-time camera management.

The processor(s) 1710 may further include a high-dynamic range signal processor that may include an image signal processor that is a hardware engine that is part of the camera processing pipeline.

The processor(s) 1710 may include a video image compositor that may be a processing block (e.g., implemented on a microprocessor) that implements video post-processing functions needed by a video playback application to produce the final image for the player window. The video image compositor may perform lens distortion correction on wide-view camera(s) 1770, surround camera(s) 1774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1708 is not required to continuously render new surfaces. Even when the GPU(s) 1708 is powered on and active doing 3D rendering, the video image compositor may be used to offload the GPU(s) 1708 to improve performance and responsiveness.

The SoC(s) 1704 may further include a mobile industry processor interface (WM) camera serial interface for receiving video and input from cameras, a high-speed interface, and/or a video input block that may be used for camera and related pixel input functions. The SoC(s) 1704 may further include an input/output controller(s) that may be controlled by software and may be used for receiving I/O signals that are uncommitted to a specific role.

The SoC(s) 1704 may further include a broad range of peripheral interfaces to enable communication with peripherals, audio codecs, power management, and/or other devices. The SoC(s) 1704 may be used to process data from cameras connected over Gigabit Multimedia Serial Link and Ethernet), sensors (e.g., LIDAR sensor(s) 1764, RADAR sensor(s) 1760, etc. that may be connected over Ethernet), data from bus 1702 (e.g., speed of vehicle 1700, steering wheel position, etc.), data from GNSS sensor(s) 1758 (e.g., connected over Ethernet or CAN bus). The SoC(s) 1704 may further include dedicated high-performance mass storage controllers that may include their own DMA engines, and that may be used to free the CPU(s) 1706 from routine data management tasks.

The SoC(s) 1704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1704 may be faster, more reliable, and even more energy-efficient and space-efficient than conventional systems. For example, the accelerators) 1714, when combined with the CPU(s) 1706, the CPU(s) 1708, and the data store(s) 1716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dCGU (e.g., the GPU(s) 1720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the and/or on the GPU(s) 1708.

In some examples, a CNN for facial recognition and vehicle owner identification may use data from camera sensors to identify the presence of an authorized driver and/or owner of the vehicle 1700. The always on sensor processing engine may be used to unlock the vehicle when the owner approaches the driver door and turn on the lights, and, in security mode, to disable the vehicle when the owner leaves the vehicle. In this way, the SoC(s) 1704 provide for security against theft and/or carjacking.

In another example, a CNN for emergency vehicle detection and identification may use data from microphones 1796 to detect and identify emergency vehicle sirens. In contrast to conventional systems, that use general classifiers to detect sirens and manually extract features, the SoC(s) 1704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1758. Thus, for example, when operating in mope the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1762, until the emergency vehicle(s) passes.

The vehicle may include a CPU(s) 1718 (e.g., discrete CPU(s), or dCPU(s)), that may be coupled to the SoC(s) 1704 via a high-speed interconnect (e.g., PCIe). The CPU(s) 1718 may include an X86 processor, for example. The CPU(s) 1718 may be used to perform any of a variety of functions, including arbitrating potentially inconsistent results between ADAS sensors and the SoC(s) 1704, and/or monitoring the status and health of the controller(s) 1736 and/or infotainment SoC 1730, for example.

The vehicle 1700 may include a GPU(s) 1720 (e.g., discrete GPU(s), or dGPU(s)), that may be coupled to the SoC(s) 1704 via a high-speed interconnect s NVLINK). The GPU(s) 1720 may provide additional artificial intelligence functionality, such as by executing redundant and/or different neural networks, and may be used to train and/or update neural networks based on input (e.g., sensor data) from sensors of the vehicle 1700.

The vehicle 1700 may further include the network interface 1724 which may include one or more wireless antennas 1726 (e.g., one or more wireless antennas for different communication protocols, such as a cellular antenna, a Bluetooth antenna, etc.). The network interface 1724 may be used to enable wireless connectivity over the Internet with the cloud (e.g., with the server(s) 1778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-tip-vehicle communication link may provide the vehicle 1700 information about vehicles in proximity to the vehicle 1700 (e.g., vehicles in front of, on the side of, and/or behind the vehicle 1700). This functionality may be part of a cooperative adaptive cruise control functionality of the vehicle 1700.

The network interface 1724 may include a SoC that provides modulation and demodulation functionality and enables the controller(s) 1736 to communicate over wireless networks. The network interface 1724 may include: a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Z-Wave, ZigBee, LoRaWAN, and/or other wireless protocols.

The vehicle 1700 may further include data store(s) 1728 which may include off-chip (e.g., off the SoC(s) 1704) storage. The data store(s) 1728 may include one or more storage elements including RAM, SRAM, DRAM, VRAM, Flash, hard disks, and/or other components and/or devices that may store at least one bit of data.

The vehicle 1700 may further include GNSS sensor(s) 1758. The GNSS sensor(s) 1758 (e.g., GPS, assisted GPS sensors, differential GPS (DGPS) sensors, etc.), to assist in mapping, perception, occupancy grid generation, and/or path planning functions. Any number of GNSS sensor(s) 1758 may be used, including, for example and without limitation, a OPS using a USB connector with an Ethernet to Serial (RS-232) bridge.

The vehicle 1700 may further include RADAR sensor(s) 1760. The RADAR sensor(s) 1760 may be used by the vehicle 1700 for long-range vehicle detection, even in darkness and/or severe weather conditions. RADAR functional safety levels may be ASIL B. The RADAR sensor(s) 1760 may use the CAN and/or the bus 1702 (e.g., to transmit data generated by the RADAR sensor(s) 1760) for control and to access object tracking data, with access to Ethernet to access raw data in some examples. A wide variety of RADAR sensor types may be used. For example, and without limitation, the RADAR sensor(s) 1760 may be suitable for front, rear, and side RADAR use. In some example, Pulse Doppler RADAR sensor(s) are used.

The RADAR sensor(s) 1760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1760 may help in distinguishing between static and moving objects, and may be used by ADAS systems for emergency brake assist and forward collision warning, Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1700 surroundings at higher speeds with minimal interference from traffic in adjacent lanes. The other two antennae may expand the field of view, making it possible to quickly detect vehicles entering or leaving the vehicle's 1700 lane.

Mid-range RADAR systems may include, as an example, a range of up to 1760 m (front) or 80 m (rear), and a field of view of up to 42 degrees (front) or 1750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1700 may further include ultrasonic sensor(s) 1762. The ultrasonic sensor(s) 1762, which may be positioned at the front, back, and/or the sides of the vehicle 1700, may be used for park assist and/or to create and update an occupancy grid. A wide variety of ultrasonic sensors) 1762 may be used, and different ultrasonic sensor(s) 1762 may be used for different ranges of detection (e.g., 2.5 m, 4 m). The ultrasonic sensor(s) 1762 may operate at functional safety levels of ASIL B.

The vehicle 1700 may include LIDAR sensor(s) 1764. The LIDAR sensor(s) 1764 may be used for object and pedestrian detection, emergency braking, collision avoidance, and/or other functions. The LIDAR sensor(s) 1764 may be functional safety level ASIL B. In some examples, the vehicle 1700 may include multiple LIDAR sensors 1764 (e.g., two, four, six, etc.) that may use Ethernet (e.g., to provide data to a Gigabit Ethernet switch).

In some examples, the LIDAR sensor(s) 1764 may be capable of providing a list of objects and their distances for a 360-degree field of view. Commercially available LIDAR sensor(s) 1764 may have an advertised range of approximately 1700 m, with an accuracy of 2 cm-3 cm, and with support for a 1700 Mbps Ethernet connection, for example. In some examples, one or more non-protruding LIDAR sensors 1764 may be used. In such examples, the LIDAR sensor(s) 1764 may be implemented as a small device that may be embedded into the front, rear, sides, and/or corners of the vehicle 1700. The LIDAR sensor(s) 1764, in such examples, may provide up to a 120-degree horizontal and 35-degree vertical field-of-view, with a 200 m range even for low-reflectivity objects. Front-mounted LIDAR sensor(s) 1764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1764 may be less susceptible to motion blur, vibration, and/or shock.

The vehicle may further include MU sensor(s) 1766. The IMU sensor(s) 1766 may be located at a center of the rear axle of the vehicle 1700, in some examples. The IMU sensor(s) 1766 may include, for example and without limitation, an accelerometer(s), a magnetometer(s), a gyroscope(s), a magnetic compass(es), and/or other sensor types. In some examples, such as in six-axis applications, the IMU sensor(s) 1766 may include accelerometers and gyroscopes, while in nine-axis applications, the IMU sensor(s) 1766 may include accelerometers, gyroscopes, and magnetometers.

In some embodiments, the IMU sensor(s) 1766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1766 may enable the vehicle 1700 to estimate heading without requiring input from a magnetic sensor by directly observing and correlating the changes in velocity from GPS to the IMU sensor(s) 1766. In some examples, the IMU sensor(s) 1766 and the GNSS sensor(s) 1758 may be combined in a single integrated unit.

The vehicle may include microphone(s) 1796 placed in and/or around the vehicle 1700. The microphone(s) 1796 may be used for emergency vehicle detection and identification, among other things.

The vehicle may further include any number of camera types, including stereo camera(s) 1768, wide-view camera(s) 1770, infrared cameras) 1772, surround camera(s) 1774, long-range and/or mid-range camera(s) 1798, and/or other camera types. The cameras may be used to capture image data around an entire periphery of the vehicle 1700. The types of cameras used depends on the embodiments and requirements for the vehicle 1700, and any combination of camera types may be used to provide the necessary coverage around the vehicle 1700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 17A and FIG. 17B.

The vehicle 1700 may further include vibration sensor(s) 1742. The vibration sensor(s) 1742 may measure vibrations of components of the vehicle, such as the axle(s). For example, changes in vibrations may indicate a change in road surfaces. In another example, when two or more vibration sensors 1742 are used, the differences between the vibrations may be used to determine friction or slippage of the road surface (e.g., when the difference in vibration is between a power-driven axle and a freely rotating axle).

The vehicle 1700 may include an ADAS system 1738. The ADAS system 1738 may include a SoC, in some examples. The ADAS system 1738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1760, LIDAR sensor(s) 1764, and/or a camera(s). The ACC systems may include longitudinal ACC and/or lateral ACC. Longitudinal ACC monitors and controls the distance to the vehicle immediately ahead of the vehicle 1700 and automatically adjust the vehicle speed to maintain a safe distance from vehicles ahead. Lateral ACC performs distance keeping, and advises the vehicle 1700 to change lanes when necessary. Lateral ACC is related to other ADAS applications such as LCA and CWS.

CACC uses information from other vehicles that may be received via the network interface 1724 and/or the wireless antenna(s) 1726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1700), while the I2V communication concept provides information about traffic further ahead. CACC systems may include either or both I2V and V2V information sources. Given the information of the vehicles ahead of the vehicle 1700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing cameras) and/or RADAR sensor(s) 1760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems, LKA systems provide steering input or braking to correct the vehicle 1700 if the vehicle 1700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1700 is backing up. Some RCTW systems include AEB to ensure that the vehicle brakes are applied to avoid a crash. RCTW systems may use one or more rear-facing RADAR sensor(s) 1760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1700, the vehicle 1700 itself must, in the case of conflicting results, decide whether to heed the result from a primary computer or a secondary computer (e.g., a first controller 1736 or a second controller 1736). For example, in some embodiments, the ADAS system 1738 may be a backup and/or secondary computer for providing perception information to a backup computer rationality module. The backup computer rationality monitor may run a redundant diverse software on hardware components to detect faults in perception and dynamic driving tasks. Outputs from the ADAS system 1738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1704.

In other examples, ADAS system 1738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1738 may be fed into the primary computer's perception block and/or the primary computer's dynamic driving task block. For example, if the ADAS system 1738 indicates a forward crash warning due to an object immediately ahead, the perception block may use this information when identifying objects. In other examples, the secondary computer may have its own neural network which is trained and thus reduces the risk of false positives, as described herein.

The vehicle 1700 may further include the infotainment SoC 1730 (e.g., an in-vehicle infotainment system (WI)). Although illustrated and described as a SoC, the infotainment system may not be a SoC, and may include two or more discrete components. The infotainment SoC 1730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1700. For example, the infotainment SoC 1730 may radios, disk players, navigation systems, video players, USB and Bluetooth connectivity, computers, in-car entertainment, Wi-Fi, steeling wheel audio controls, hands free voice control, a heads-up display (HUD), an HMI display 1734, a telematics device, a control panel (e.g., for controlling and/or interacting with various components, features, and/or systems), and/or other components. The infotainment SoC 1730 may further be used to provide information (e.g., visual and/or audible) to a user(s) of the vehicle, such as information from the AIMS system 1738, autonomous driving information such as planned vehicle maneuvers, trajectories, surrounding environment information (e.g., intersection information, vehicle information, road information, etc.), and/or other information.

The infotainment SoC 1730 may include GPU functionality. The infotainment SoC 1730 may communicate over the bus 1702 (e.g., CAN bus, Ethernet, etc.) with other devices, systems, and/or components of the vehicle 1700. In some examples, the infotainment SoC 1730 may be coupled to a supervisory MCU such that the GPU of the infotainment system may perform some self-driving functions in the event that the primary controller(s) 1736 (e.g., the primary and/or backup computers of the vehicle 1700) fail. In such an example, the infotainment SoC 1730 may put the vehicle 1700 into a chauffeur to safe stop mode, as described herein.

The vehicle 1700 may further include an instrument cluster 1732 (e.g., a digital dash, an electronic instrument cluster, a digital instrument panel, etc.). The instrument cluster 1732 may include a controller and/or supercomputer (e.g., a discrete controller or supercomputer). The instrument cluster 1732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1730 and the instrument cluster 1732. In other words, the instrument cluster 1732 may be included as part of the infotainment SoC 1730, or vice versa.

FIG. 17D is a system diagram for communication between cloud-based server(s) and the example autonomous vehicle 1700 of FIG. 17A, in accordance with some embodiments of the present disclosure. The system 1776 may include server(s) 1778, network(s) 1790, and vehicles, including the vehicle 1700. The server(s) 1778 may include a plurality of GPUs 1784(A)-1784(H) (collectively referred to herein as GPUs 1784), PCIe switches 1782(A)-1782(D) (collectively referred to herein as PCIe switches 1782), and/or CPUs 1780(A)-1780(B) (collectively referred to herein as CPUs 1780). The GPUs 1784, the CPUs 1780, and the PCIe switches may be interconnected with high-speed interconnects such as, for example and without limitation, NVLink interfaces 1788 developed by NVIDIA and/or PCIe connections 1786. In some examples, the GPUs 1784 are connected via NVLink and/or NVSwitch SoC and the GPUs 1784 and the PCIe switches 1782 are connected via PCIe interconnects. Although eight GPUs 1784, two CPUs 1780, and two PCIe switches are illustrated, this is not intended to be limiting. Depending on the embodiment, each of the server(s) 1778 may include any number of GPUs 1784, CPUs 1780, and/or PCIe switches. For example, the server(s) 1778 may each include eight, sixteen, thirty-two, and/or more GPUs 1784.

The server(s) 1778 may receive, over the network(s) 1790 and from the vehicles, image data representative of images showing unexpected or changed road conditions, such as recently commenced road-work. The servers) 1778 may transmit, over the network(s) 1790 and to the vehicles, neural networks 1792, updated neural networks 1792, and/or map information 1794, including information regarding traffic and road conditions. The updates to the map information 1794 may include updates for the HD map 1722, such as information regarding construction sites, potholes, detours, flooding, and/or other obstructions. In some examples, the neural networks 1792, the updated neural networks 1792, and/or the map information 1794 may have resulted from new training and/or experiences represented in data received from any number of vehicles in the environment, and/or based on training performed at a datacenter (e.g., using the server(s) 1778 and/or other servers).

The server(s) 1778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1790, and/or the machine learning models may be used by the server(s) 1778 to remotely monitor the vehicles.

In some examples, the server(s) 1778 may receive data from the vehicles and apply the data to up-to-date real-time neural networks for real-time intelligent inferencing. The server(s) 1778 may include deep-learning supercomputers and/or dedicated AI computers powered by GPU(s) 1784, such as a DGX and DGX Station machines developed by NVIDIA. However, in some examples, the server(s) 1778 may include deep learning infrastructure that use only CPU-powered datacenters.

The deep-learning infrastructure of the server(s) 1778 may be capable of fast, real-time inferencing, and may use that capability to evaluate and verify the health of the processors, software, and/or associated hardware in the vehicle 1700. For example, the deep-learning infrastructure may receive periodic updates from the vehicle 1700, such as a sequence of images and/or objects that the vehicle 1700 has located in that sequence of images (e.g., via computer vision and/or other machine learning object classification techniques). The deep-learning infrastructure may run its own neural network to identify the objects and compare them with the objects identified by the vehicle 1700 and, if the results do not match and the infrastructure concludes that the AI in the vehicle 1700 is malfunctioning, the server(s) 1778 may transmit a signal to the vehicle 1700 instructing a fail-safe computer of the vehicle 1700 to assume control, notify the passengers, and complete a safe parking maneuver.

For inferencing, the server(s) 1778 may include the GPU(s) 1784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 18:
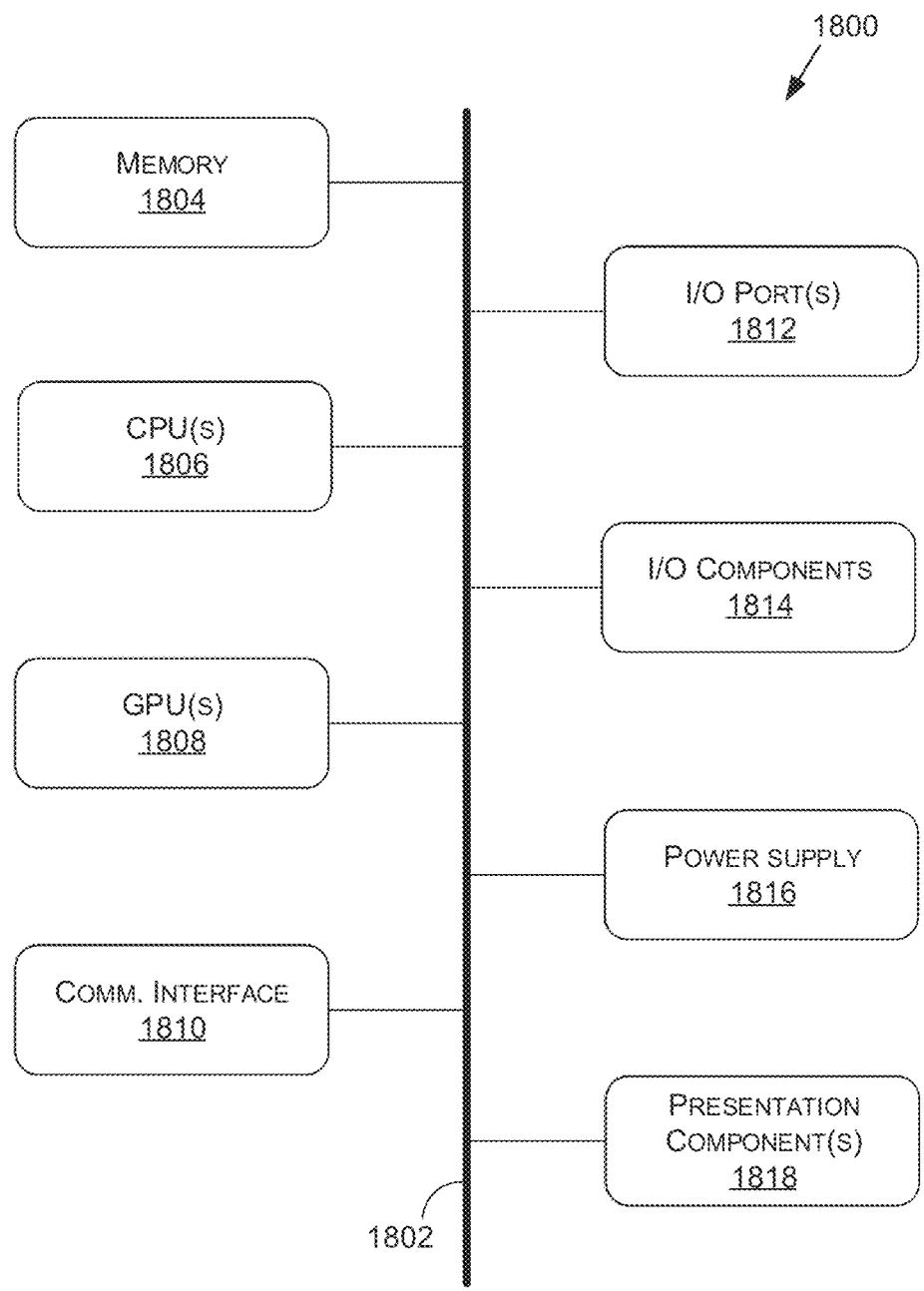
FIG. 18 is a block diagram of an example computing device suitable for use in implementing some embodiments of the present disclosure.

FIG. 18 is a block diagram of an example computing device(s) 1800 suitable for use in implementing some embodiments of the present disclosure. Computing device

1800 may include an interconnect system 1802 that directly or indirectly couples the following devices: memory 1804, one or more central processing units (CPUs) 1806, one or more graphics processing units (GPUs) 1808, a communication interface 1810, input/output (I/O) ports 1812, input/output components 1814, a power supply 1816, one or more presentation components 1818 (e.g., display(s)), and one or more logic units 1820. In at least one embodiment, the computing device(s) 1800 may comprise one or more virtual machines (VMs), and/or any of the components thereof may comprise virtual components (e.g., virtual hardware components). For non-limiting examples, one or more of the GPUs 1808 may comprise one or more vGPUs, one or more of the CPUs 1806 may comprise one or more vCPUs, and/or one or more of the logic units 1820 may comprise one or more virtual logic units. As such, a computing device(s) 1800 may include discrete components (e.g., a full GPU dedicated to the computing device 1800), virtual components (e.g., a portion of a GPU dedicated to the computing device 1800), or a combination thereof.

Although the various blocks of FIG. 18 are shown as connected via the interconnect system 1802 with lines, this is not intended to be limiting and is for clarity only. For example, in some embodiments, a presentation component 1818, such as a display device, may be considered an I/O component 1814 (e.g., if the display is a touch screen). As another example, the CPUs 1806 and/or GPUs 1808 may include memory (e.g., the memory 1804 may be representative of a storage device in addition to the memory of the GPUs 1808, the CPUs 1806, and/or other components). In other words, the computing device of FIG. 18 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 18.

The interconnect system 1802 may represent one or more links or busses, such as an address bus, a data bus, a control bus, or a combination thereof. The interconnect system 1802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1806 may be directly connected to the memory 1804. Further, the CPU 1806 may be directly connected to the GPU 1808. Where there is direct, or point-to-point connection between components, the interconnect system 1802 may include a PCIe link to carry out the connection. In these examples, a PCI bus need not be included in the computing device 1800.

The memory 1804 may include any of a variety of computer-readable media. The computer-readable media may be any available media that may be accessed by the computing device 1800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1806 may be configured to execute at least some of the computer-readable instructions to control one or more components of the computing device 1800 to perform one or more of the methods and/or processes described herein. The CPU(s) 1806 may each include one or more cores (e.g., one, two, four, eight, twenty-eight, seventy-two, etc.) that are capable of handling a multitude of software threads simultaneously. The CPU(s) 1806 may include any type of processor, and may include different types of processors depending on the type of computing device 1800 implemented (e.g., processors with fewer cores for mobile devices and processors with more cores for servers). For example, depending on the type of computing device 1800, the processor may be an Advanced RISC Machines (ARM) processor implemented using Reduced Instruction Set Computing (RISC) or an x86 processor implemented using Complex Instruction Set Computing (CISC). The computing device 1800 may include one or more CPUs 1806 in addition to one or more microprocessors or supplementary co-processors, such as math co-processors.

In addition to or alternatively from the CPU(s) 1806, the GPU(s) 1808 may be configured to execute at least some of the computer-readable instructions o control one or more components of the computing device 1800 to perform one or more of the methods and/or processes described herein. One or more of the GPU(s) 1808 may be an integrated GPU (e.g., with one or more of the CPU(s) 1806 and/or one or more of the GPU(s) 1808 may be a discrete GPU. In embodiments, one or more of the GPU(s) 1808 may be a coprocessor of one or more of the CPU(s) 1806. The GPU(s) 1808 may be used by the computing device 1800 to render graphics (e.g., 3D graphics) or perform general purpose computations. For example, the GPU(s) 1808 may be used for General-Purpose computing on GPUs (GPGPU). The GPU(s) 1808 may include hundreds or thousands of cores that are capable of handling hundreds or thousands of software threads simultaneously. The GPU(s) 1808 may generate pixel data for output images in response to rendering commands (e.g., rendering commands from the CPU(s) 1806 received via a host interface). The GPU(s) 1808 may include graphics memory, such as display memory, for storing pixel data or any other suitable data, such as GPGPU data. The display memory may be included as part of the memory 1804. The GPU(s) 1808 may include two or more GPUs operating in parallel (e.g., via a link). The link may directly connect the GPUs (e.g., using NVLINK) or may connect the CPUs through a switch (e.g., using NVSwitch). When combined together, each GPU 1808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1806 and/or the GPU(s) 1808, the logic unit(s) 1820 may be configured to execute at least some of the computer-readable instructions to control one or more components of the computing device 1800 to perform one or more of the methods and/or processes described herein. In embodiments, the CPU(s) 1806, the GPU(s) 1808, and/or the logic unit(s) 1820 may discretely or jointly perform any combination of the methods, processes and/or portions thereof. One or more of the logic units 1820 may be part of and/or integrated in one or more of the CPU(s) 1806 and/or the GPU(s) 1808 and/or one or more of the logic units 1820 may be discrete components or otherwise external to the CPU(s) 1806 and/or the GPU(s) 1808. In embodiments, one or more of the logic units 1820 may be a coprocessor of one or more of the CPU(s) 1806 and/or one or more of the GPU(s) 1808.

Examples of the logic unit(s) 1820 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1810 may include one or more receivers, transmitters, and/or transceivers that enable the computing device 1800 to communicate with other computing devices via an electronic communication network, included wired and/or wireless communications. The communication interface 1810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1812 may enable the computing device 1800 to be logically coupled to other devices including the I/O components 1814, the presentation component(s) 1818, and/or other components, some of which may be built in to (e.g., integrated in) the computing device 1800. Illustrative I/O components 1814 include a microphone, mouse, keyboard, joystick, game pad, game controller, satellite dish, scanner, printer, wireless device, etc. The I/O components 1814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1800. The computing device 1800 may be include depth cameras, such as stereoscopic camera systems, infrared camera systems, RGB camera systems, touchscreen technology, and combinations of these, for gesture detection and recognition. Additionally, the computing device 1800 may include accelerometers or gyroscopes (e.g., as part of an inertia measurement unit (IMU)) that enable detection of motion. In some examples, the output of the accelerometers or gyroscopes may be used by the computing device 1800 to render immersive augmented reality or virtual reality.

The power supply 1816 may include a hard-wired power supply, a battery power supply, or a combination thereof. The power supply 1816 may provide power to the computing device 1800 to enable the components of the computing device 1800 to operate.

The presentation component(s) 1818 may include a display (e.g., a monitor, a touch screen, a television screen, a heads-up-display (HUD), other display types, or a combination thereof), speakers, and/or other presentation components. The presentation component(s) 1818 may receive data from other components (e.g., the GPU(s) 1808, the CPU(s) 1806, etc.), and output the data (e.g., as an image, video, sound, etc.).

Example Data Center

Figure 19:
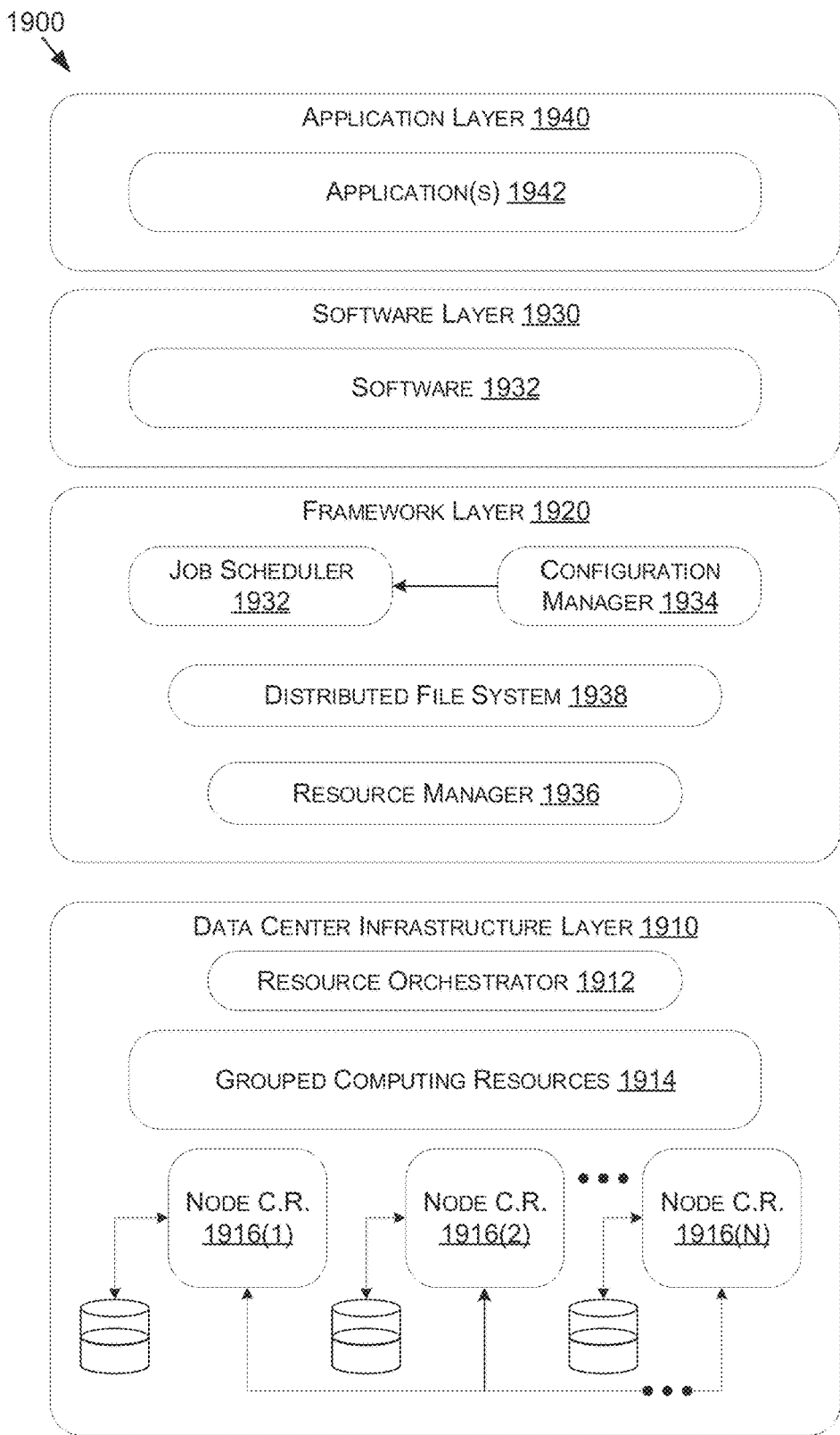
FIG. 19 is a block diagram of an example data center suitable for use in implementing some embodiments of the present disclosure.

FIG. 19 illustrates an example data center 1900 that may be used in at least one embodiments of the present disclosure. The data center 1900 may include a data center infrastructure layer 1910, a framework layer 1920, a software layer 1930, and/or an application layer 1940.

As shown in FIG. 19, the data center infrastructure layer 1910 may include a resource orchestrator 1912, grouped computing resources 1914, and node computing resources ("node C.R.s") 1916(1)-1916(N), where "N" represents any whole, positive integer. In at least one embodiment, node C.R.s 1916(1)-1916(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1916(1)-1916(N) may correspond to a server having one or more of the above-mentioned computing resources. In addition, in some embodiments, the node C.R.s 1916(1)-1916(N) may include one or more virtual components, such as vGPUs, vCPUs, and/or the like, and/or one or more of the node C.R.s 1916(1)-1916(N) may correspond to a virtual machine (VM).

In at least one embodiment, grouped computing resources 1914 may include separate groupings of node C.R.s 1916 housed within one or more racks (not shown), or many racks housed in data centers at various geographical locations (also not shown). Separate groupings of node C.R.s 1916 within grouped computing resources 1914 may include grouped compute, network, memory or storage resources that may be configured or allocated to support one or more workloads. In at least one embodiment, several node C.R.s 1916 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1922 may configure or otherwise control one or more node C.R.s 1916(1)-1916(N) and/or grouped computing resources 1914. In at least one embodiment, resource orchestrator 1922 may include a software design infrastructure ("SDI") management entity for the data center 1900. The resource orchestrator 1922 may include hardware, software, or some combination thereof.

In at least one embodiment, as shown in FIG. 19, framework layer 1920 may include a job scheduler 1932, a configuration manager 1934, a resource manager 1936, and/or a distributed file system 1938. The framework layer 1920 may include a framework to support software 1932 of software layer 1930 and/or one or more application(s) 1942 of application layer 1940. The software 1932 or application(s) 1942 may respectively include web-based service software or applications, such as those provided by Amazon Web Services, Google Cloud and Microsoft Azure. The framework layer 1920 may be, but is not limited to, a type of free and open-source software web application framework such as Apache Spark™ (hereinafter "Spark") that may utilize distributed file system 1938 for large-scale data processing (e.g., "big data"). In at least one embodiment, job scheduler 1932 may include a Spark driver to facilitate scheduling of workloads supported by various layers of data center 1900. The configuration manager 1934 may be capable of configuring different layers such as software layer 1930 and framework layer 1920 including Spark and distributed file system 1938 for supporting large-scale data processing. The resource manager 1936 may be capable of managing clustered or grouped computing resources mapped to or allocated for support of distributed file system 1938 and job scheduler 1932. In at least one embodiment, clustered or grouped computing resources may include grouped computing resource 1914 at data center infrastructure layer 1910. The resource manager 1036 may coordinate with resource orchestrator 1912 to manage these mapped or allocated computing resources.

In at least one embodiment, software 1932 included in software layer 1930 may include software used by at least portions of node C.R.s 1916(1)-1916(N), grouped computing resources 1914, and/or distributed file system 1938 of framework layer 1920. One or more types of software may include, but are not limited to, Internet web page search software, e-mail virus scan software, database software, and streaming video content software.

In at least one embodiment, application(s) 1942 included in application layer 1940 may include one or more types of applications used by at least portions of node C.R.s 1916(1)-1916(N), grouped computing resources 1914, and/or distributed file system 1938 of framework layer 1920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1934, resource manager 1936, and resource orchestrator 1912 may implement any number and type of self-modifying actions based on any amount and type of data acquired in any technically feasible fashion. Self-modifying actions may relieve a data center operator of data center 1900 from making possibly bad configuration decisions and possibly avoiding underutilized and/or poor performing portions of a data center.

The data center 1900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1900. In at least one embodiment, trained or deployed machine learning models corresponding to one or more neural networks may be used to infer or predict information using resources described above with respect to the data center 1900 by using weight parameters calculated through one or more training techniques, such as but not limited to those described herein.

In at least one embodiment, the data center 1900 may use CPUs, application-specific integrated circuits (ASICs), GPUs, FPGAs, and/or other hardware (e.g., virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1800 of FIG. 18—e.g., each device may include similar components, features, and/or functionality of the computing device(s) 1800. In addition, where backend devices (e.g., servers, NAS, etc.) are implemented, the backend devices may be included as part of a data center 1900, an example of which is described in more detail herein with respect to FIG. 19.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1800 described herein with respect to FIG. 18. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specially computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
generating a representation of a longitudinal three-dimensional (3D) curve representing a synthetic road;
for at least one point of one or more points on the longitudinal 3D curve, generating a lateral 3D curve through the at least one point;
generating a first representation of a synthetic 3D road surface of the synthetic road based at least on sampling the lateral 3D curve for two or more points on the longitudinal 3D curve; and
training one or more neural networks (NNs) to generate a densified representation of 3D road surface using an incomplete representation of the synthetic 3D road surface as input training data and using the first representation of the synthetic 3D road surface as ground truth training data.

2. The method of claim 1, wherein the generating of the first representation of the synthetic 3D road surface comprises:
sampling one or more longitudinal values of the longitudinal 3D curve;
computing one or more lateral values of the longitudinal 3D curve based at least on simulating one or more changes in road direction of the synthetic road; and
computing one or more height values of the longitudinal 3D curve based at least on simulating changes in surface height of the synthetic road.

3. The method of claim 2, further comprising computing the one or more lateral values as a second order polynomial of the one or more longitudinal values using one or more values for one or more polynomial constants sampled to simulate the changes in road direction.

4. The method of claim 2, further comprising computing the one or more height values as a linear combination of Fourier bases, using one or more sampled values for at least one of a number of the Fourier bases, a weight for a particular basis of the Fourier bases, or a frequency for the particular basis to simulate the one or more changes in surface height.

5. The method of claim 1, wherein the generating of the lateral 3D curve through the at least one point comprises sampling a value for angle between the lateral 3D curve and a ground plane to simulate one or more changes in lateral surface slope of the synthetic road.

6. The method of claim 1, further comprising generating the incomplete representation based at least on setting a subset of pixel values of the first representation to zero to simulate one or more unobserved values.

7. The method of claim 1, further comprising:
generating a plurality of binary maps representing a paterrs of unobserved values associated with estimating 3D surface structure from real-world data; and
generating the incomplete representation based at least on multiplying the first representation by one of the binary maps.

8. The method of claim 1, wherein the one or more NNs include a first output channel that regresses one or more height values of the 3D road surface and a second output channel that regresses one or more confidence values corresponding to the one or more height values, wherein the training of the one or more NNs is based at least on applying a loss function, wherein the loss function compares predicted and ground truth height values and is based on predicted confidence values.

9. The method of claim 1, further comprising using the one or more NNs to perform at least one of:
adapting a suspension system of an ego-object,
navigating the ego-object to avoid a detected protuberance, or
applying an acceleration or deceleration to the ego-Object based at least on a detected surface slope.

10. A processor comprising one or more circuits to:
generate a ground truth representation of a synthetic 3D road surface based at least on parametric mathematical modeling using sampled values to simulate a synthetic road;
generate an incomplete representation of the ground truth representation of the synthetic 3D road surface; and
train one or more neural networks (NNs) to generate a densified representation of 3D road surface using the incomplete representation as input training data and the ground truth representation as ground truth training data.

11. The processor of claim 10, the one or more circuits further to generate the ground truth representation of the synthetic 3D road surface based at least on:
sampling one or more longitudinal values of a longitudinal 3D curve representing the synthetic road;
computing one or more lateral values of the longitudinal 3D curve based at least on simulating one or more changes in road direction of the synthetic road;
computing one or more height values of the longitudinal 3D curve based at least on simulating one or more changes in surface height of the synthetic road;
for at least one point of the one or more points on the longitudinal 3D curve, generating a lateral 3D curve through the at least one point; and
generating the ground truth representation of the synthetic 3D road surface based at least on sampling the lateral 3D curve for two or more points on the longitudinal 3D curve.

12. The processor of claim 10, the one or more circuits further to generate the ground truth representation of the synthetic 3D road surface based at least on:
sampling one or more longitudinal values of a longitudinal 3D curve representing the synthetic road; and
computing one or more lateral values of the longitudinal 3D curve as a second order polynomial of the longitudinal values using one or more values for polynomial constants sampled to simulate one or more changes in road direction of the synthetic road.

13. The processor of claim 10, the one or more circuits further to generate the ground truth representation of the synthetic 3D road surface based at least on computing one or more height values as a linear combination of Fourier bases, using one or more of the sampled values for at least one of a number of the Fourier bases, a weight for a particular basis of the Fourier bases, or a frequency for the particular basis to simulate one or more changes in surface height of the synthetic road.

14. The processor of claim 10, the one or more circuits further to generate the ground truth representation of the synthetic 3D road surface based at least on generating a lateral 3D curve through at least one point of one or more points of a longitudinal 3D curve representing the synthetic road, the lateral 3D curve being generated based at least on sampling a value for angle between the lateral 3D curve and a ground plane to simulate changes in lateral surface slope of the synthetic road.

15. The processor of claim 10, the one or more circuits further to generate the incomplete representation based at least on setting a subset of pixel values of the ground truth representation to zero to simulate unobserved values.

16. The processor of claim 10, the one or more circuits further to:
generate a plurality of binary maps representing a pattern of unobserved values associated with estimating 3D surface structure from real-world data; and
generate the incomplete representation based at least on multiplying the ground truth representation by one of the binary maps.

17. The processor of claim 10, wherein the one or more NNs include a first output channel that regresses one or more height values of the 3D road surface and a second output channel that regresses one or more confidence values corresponding to the one or more height values, the one or more circuits further to train the one or more NNs based at least on applying a loss function, wherein the loss function compares predicted and ground truth height values and is based on predicted confidence values.

18. A system comprising:
one or more processing units; and
one or more memory units storing instructions that, when executed by the one or more processing units, cause the one or more processing units to execute operations comprising:
generating a representation of a longitudinal three-dimensional (3D) curve representing a synthetic road;
for at least one point of one or more points on the longitudinal 3D curve, expanding the at least one point into a lateral 3D curve through the at least one point;
generating a ground truth representation of a synthetic 3D road surface of the synthetic road based at least on the lateral 3D curve for two or more points on the longitudinal 3D curve;
generating an incomplete representation of the synthetic 3D road surface based at least on the ground truth representation of the synthetic 3D road surface; and
including the incomplete representation and the ground truth representation in a training dataset.

19. The system of claim 18, wherein the generating of the representation of the longitudinal 3D curve representing the synthetic road comprises:
sampling one or more longitudinal values of the longitudinal 3D curve;

computing one or more lateral values of the longitudinal 3D curve based at least on simulating one or more changes in road direction of the synthetic road; and computing one or more height values of the longitudinal 3D curve based at least on simulating one or more changes in surface height of the synthetic road.

20. The system of claim 18, the operations further comprising:

generating a plurality of binary maps representing a pattern of unobserved values associated with estimating 3D surface structure from real-world data; and generating the incomplete representation based at least on multiplying the ground truth representation by one of the binary maps.

21. The system of claim 18, wherein the system is comprised in at least one of:

a control system for an autonomous or semi-autonomous machine;

a perception system for an autonomous or semi-autonomous machine;

a system for performing simulation operations;

a system for performing deep learning operations;

a system implemented using an edge device;

a system implemented using a robot;

a system incorporating one or more virtual machines (VMs);

a system implemented at least partially in a data center; or a system implemented at least partially using cloud computing resources.

* * * * *